United States Patent
Yamakawa et al.

(10) Patent No.: US 11,510,256 B2
(45) Date of Patent: Nov. 22, 2022

(54) CONFIGURATION METHOD OF WI-FI DOORBELL, DOORBELL, HOUSING COMPLEX COMMUNICATION SYSTEM, AND CLIMATE INFORMATION PROVIDING SYSTEM

(71) Applicant: AIPHONE CO., LTD., Nagoya (JP)

(72) Inventors: Seiya Yamakawa, Nagoya (JP); Tetsuya Sumida, Nagoya (JP)

(73) Assignee: AIPHONE CO., LTD., Nagoya (JP)

( * ) Notice: Subject to any disclaimer, the term of this patent is extended or adjusted under 35 U.S.C. 154(b) by 140 days.

(21) Appl. No.: 16/965,293

(22) PCT Filed: Apr. 6, 2018

(86) PCT No.: PCT/JP2018/014769
§ 371 (c)(1),
(2) Date: Jul. 27, 2020

(87) PCT Pub. No.: WO2019/159384
PCT Pub. Date: Aug. 22, 2019

(65) Prior Publication Data
US 2021/0127435 A1    Apr. 29, 2021

(30) Foreign Application Priority Data

Feb. 15, 2018  (JP) .............................. JP2018-025234
Feb. 15, 2018  (JP) .............................. JP2018-025235
(Continued)

(51) Int. Cl.
*H04W 76/11*   (2018.01)
*G01W 1/04*    (2006.01)
(Continued)

(52) U.S. Cl.
CPC .............. *H04W 76/11* (2018.02); *G01W 1/04* (2013.01); *G01W 1/10* (2013.01); *G08B 3/1016* (2013.01);
(Continued)

(58) Field of Classification Search
CPC .. H04L 12/2818; H04N 7/186; G08B 3/1016; G08B 5/223
See application file for complete search history.

(56) References Cited

U.S. PATENT DOCUMENTS 8,144,183 B2   3/2012  Carter
8,872,915 B1   10/2014 Scalisi et al.
(Continued)

FOREIGN PATENT DOCUMENTS

CN   101261504 A   9/2008
CN   104735424 A   6/2015
(Continued)

OTHER PUBLICATIONS

RCA (Voxx Accessories Corp), WIFI Camera Security System User Guide, 2017, pp. 1-24.*
(Continued)

*Primary Examiner* — Chirag R Patel
(74) *Attorney, Agent, or Firm* — Procopio, Cory, Hargreaves & Savitch LLP

(57) ABSTRACT

Provided is a setting method of a Wi-Fi doorbell (2), in which a Wi-Fi doorbell (2) comprising a camera capable of reading a two-dimensional code and a mobile communication terminal (4) comprising a display unit (6) capable of displaying the two-dimensional code are used. The setting method comprises steps of causing the display unit (6) to display a two-dimensional code in which password information for enabling the Wi-Fi doorbell (2) to connect to a network (5) via a Wi-Fi router (20) is embedded reading the
(Continued)

two-dimensional code by the camera (9) of the Wi-Fi doorbell (2); and setting the Wi-Fi doorbell (2) to a state where the Wi-Fi doorbell (2) can perform communication with a remotely disposed server (3) via the Wi-Fi router (20), based on the read two-dimensional code.

3 Claims, 42 Drawing Sheets

(30) Foreign Application Priority Data

| Feb. 15, 2018 | (JP) | JP2018-025236 |
|---|---|---|
| Feb. 15, 2018 | (JP) | JP2018-025237 |
| Feb. 15, 2018 | (JP) | JP2018-025238 |
| Feb. 21, 2018 | (JP) | JP2018-028717 |
| Feb. 21, 2018 | (JP) | JP2018-028718 |
| Feb. 21, 2018 | (JP) | JP2018-028719 |

(51) Int. Cl.
| | |
|---|---|
| *G01W 1/10* | (2006.01) |
| *G08B 3/10* | (2006.01) |
| *G08B 5/22* | (2006.01) |
| *G08B 7/06* | (2006.01) |
| *H04N 7/18* | (2006.01) |
| *G01W 1/00* | (2006.01) |

(52) U.S. Cl.
CPC ............ *G08B 5/223* (2013.01); *G08B 7/06* (2013.01); *H04N 7/186* (2013.01); *G01W 2001/006* (2013.01)

(56) References Cited

U.S. PATENT DOCUMENTS

| | | | |
|---|---|---|---|
| 9,094,584 | B2 | 7/2015 | Scalisi et al. |
| 9,237,318 | B2 | 1/2016 | Kasmir et al. |
| 9,432,638 | B2 | 8/2016 | Carter |
| 9,485,478 | B2 | 11/2016 | Carter |
| 9,516,284 | B2 | 12/2016 | Carter |
| 9,721,223 | B2 * | 8/2017 | Gentile ............... G06Q 10/08 |
| 2002/0018478 | A1 | 2/2002 | Takeyama et al. |
| 2005/0211780 | A1 | 9/2005 | Tanaka |
| 2008/0218307 | A1 | 9/2008 | Schoettle |
| 2012/0044049 | A1* | 2/2012 | Vig ..................... G07C 9/37 340/5.82 |
| 2013/0223279 | A1 | 8/2013 | Tinnakomsrisuphap et al. |
| 2015/0145993 | A1* | 5/2015 | Scalisi ............. H04M 1/0291 348/143 |
| 2015/0319411 | A1 | 11/2015 | Kasmir et al. |
| 2015/0327304 | A1 | 11/2015 | Tinnakomsrisuphap et al. |
| 2016/0269691 | A1 | 9/2016 | Lee |
| 2017/0034859 | A1 | 2/2017 | Yao |
| 2020/0364991 | A1* | 11/2020 | Scalisi ............. G08B 13/19619 |

FOREIGN PATENT DOCUMENTS

| | | |
|---|---|---|
| CN | 106100890 A | 11/2016 |
| CN | 206096785 U | 4/2017 |
| JP | H06233303 A | 8/1994 |
| JP | H11161881 A | 6/1999 |
| JP | 2001016579 A | 1/2001 |
| JP | 2001186267 A | 7/2001 |
| JP | 2002027573 A | 1/2002 |
| JP | 2003219285 A | 7/2003 |
| JP | 2004260679 A | 9/2004 |
| JP | 2004287539 A | 10/2004 |
| JP | 3617937 B2 | 2/2005 |
| JP | 2005286439 A | 10/2005 |
| JP | 2006054591 A | 2/2006 |
| JP | 2007159102 A | 6/2007 |
| JP | 2007174228 A | 7/2007 |
| JP | 2007036977 A | 2/2008 |
| JP | 2008301209 A | 12/2008 |
| JP | 2010200148 A | 9/2010 |
| JP | 2007266687 A | 10/2011 |
| JP | 2012034025 A | 2/2012 |
| JP | 2007096833 A | 4/2012 |
| JP | 2012160830 A | 8/2012 |
| JP | 2015019187 A | 1/2015 |
| JP | 2015515048 A | 5/2015 |
| JP | 2015177417 A | 10/2015 |
| JP | 2016032212 A | 3/2016 |
| JP | 2016165096 A | 9/2016 |
| JP | 2016534687 A | 11/2016 |
| WO | 2016059680 A1 | 4/2016 |

OTHER PUBLICATIONS

Notification of the First Office Action for related CN App No. 201880089556.9 dated Feb. 3, 2021, 20 pgs.
International Search Report for related Int. App. No PCT/JP2018/014769 dated Jun. 26, 2019. English translation provided; 39 pages.
Extended European Search Report for related EP App No. 18906295.3 dated Dec. 14, 2020, 7 pgs.
Japanese Patent Office, Decision of Refusal, Application No. 2018-025236, dated May 10, 2022, in 17 pages.
Japanese Patent Office, Decision of Refusal, Application No. 2018-025238, dated May 10, 2022, in 14 pages.
Japanese Patent Office, Decision of Refusal, Application No. 2018-028717, dated Apr. 26, 2022, in 14 pages.
Japanese Patent Office, Decision of Refusal, Application No. 2018-028718, dated Apr. 26, 2022, in 15 pages.

* cited by examiner

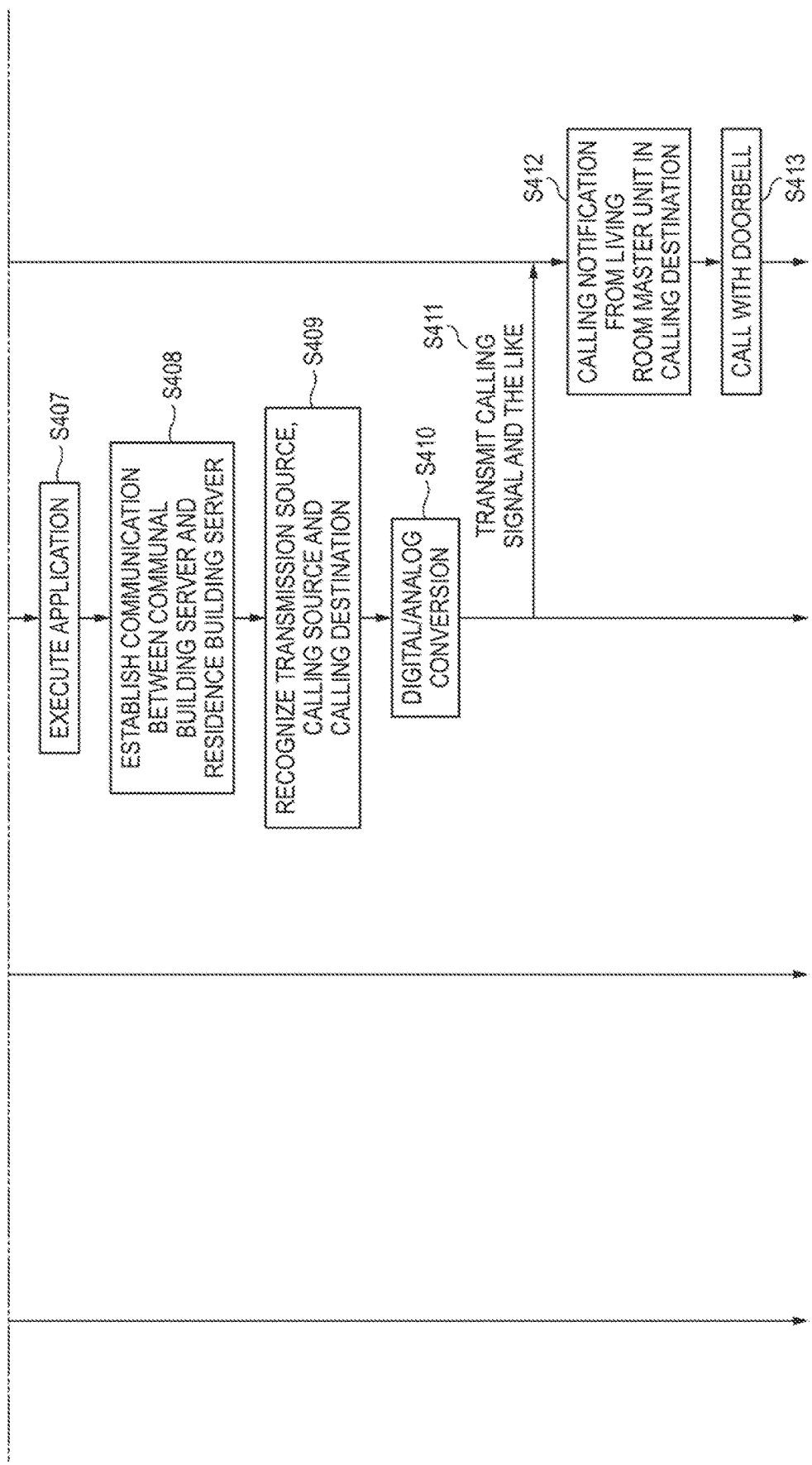

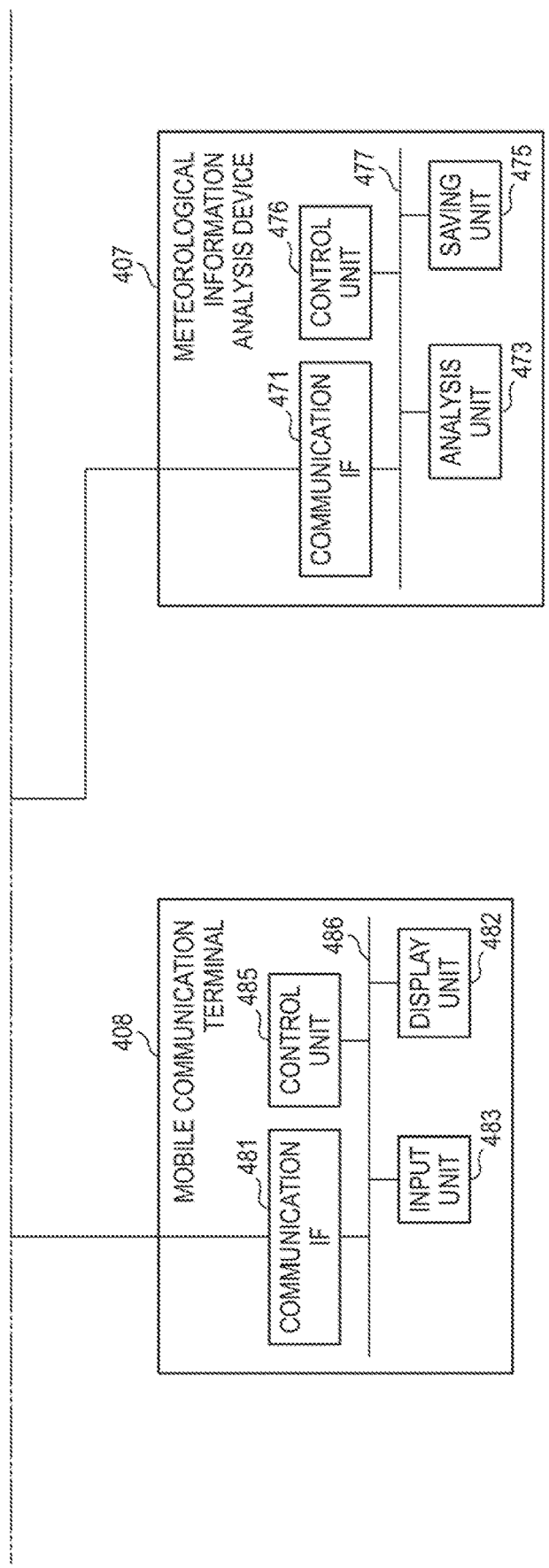
(FIG. 36 CONTINUED)

CONFIGURATION METHOD OF WI-FI DOORBELL, DOORBELL, HOUSING COMPLEX COMMUNICATION SYSTEM, AND CLIMATE INFORMATION PROVIDING SYSTEM

CROSS-REFERENCE TO RELATED APPLICATIONS

This application is a U.S. National Stage entry of PCT Application No. PCT/JP2018/014769, filed on Apr. 6, 2018, which claims priority to JP Application No. 2018-028719, filed Feb. 21, 2018, which claims priority to JP Application No. 2018-028718, filed Feb. 21, 2018, which claims priority to JP Application No. 2018-028717, filed Feb. 21, 2018, which claims priority to JP Application No. 2018-025238, filed Feb. 15, 2018, which claims priority to JP Application No. 2018-025237, filed Feb. 15, 2018, which claims priority to JP Application No. 2018-025236, filed Feb. 15, 2018, which claims priority to JP Application No. 2018-025235, filed Feb. 15, 2018, which claims priority to JP Application No. 2018-025234, filed Feb. 15, 2018. The contents of the foregoing are incorporated by reference.

TECHNICAL FIELD

The present disclosure relates to a setting method of a Wi-Fi doorbell, a doorbell, a housing complex communication system, and a meteorological information providing system.

BACKGROUND ART

Known is a method of using a doorbell capable of performing wireless communication with a remotely disposed computing device to detect a first wireless network and to form a second wireless network between the doorbell and the remotely disposed computing device, thereby causing the doorbell and the computing device to directly communicate with each other via the second wireless network (refer to PTL 1).

Also, known is a Wi-Fi doorbell including a speaker, a microphone, a camera, and an operation unit and capable of performing wireless communication with a remotely disposed computing device (refer to PTL 1 and the like).

In the related art, known is an intercom system for a housing complex consisting of a plurality of residence buildings (refer to PTL 8). In a configuration of the intercom system, each of the residence buildings is connected to a controller via an intercom line (dedicated line for intercom).

Also, known is a Wi-Fi doorbell including a speaker, a microphone, a camera, and a calling button and capable of performing wireless communication with a remotely disposed computing device (refer to PTL 1).

PTL 9 discloses a system configured to notify a user of meteorological information of each region. In the system disclosed in PTL 9, an antenna having a sensor for detecting meteorological information is installed outdoors, and a satellite broadcasting tuner capable of performing communication with the antenna and a home television is further installed. Thereby, the sensor sends meteorological information detected at a place where the sensor is installed to the satellite broadcasting tuner, and the satellite broadcasting tuner calculates the meteorological information. Then, the satellite broadcasting tuner distributes the processed meteorological information to the home television in each home, as a meteorological service such as weather forecast.

CITATION LIST

Patent Literature

[PTL 1] U.S. Pat. No. 9,094,584
[PTL 2] U.S. Pat. No. 8,872,915
[PTL 3] U.S. Pat. No. 9,237,318
[PTL 4] U.S. Pat. No. 8,144,183
[PTL 5] U.S. Pat. No. 9,432,638
[PTL 6] U.S. Pat. No. 9,485,478
[PTL 7] U.S. Pat. No. 9,516,284
[PTL 8] JP-A-2004-260679
[PTL 9] JP-A-2003-219285

SUMMARY OF INVENTION

Technical Problem

In recent years, a simple intercom system with no living room master unit is spread. In the intercom system, a doorbell and a device are configured to perform communication with each other via Wi-Fi, for example, and a calling from the doorbell is notified from the device (Wi-Fi doorbell). Most of the Wi-Fi doorbells (Wi-Fi doorbell systems) are assembled and installed by a user. For this reason, there is a user's need to more easily make the initial installation of the Wi-Fi doorbell.

An object of the present invention is to provide a setting method of a Wi-Fi doorbell by which it is possible to perform initial installation more easily.

Also, in the doorbell, whenever a calling function is activated, all the callings are notified to a resident. In particular, in a case where the doorbell and the computing device can directly perform communication with each other, like PTL 1, a resident receives the calling notification beyond necessity, which is troublesome.

An object of the present invention is to provide a doorbell capable of limiting an unnecessary calling notification.

Also, since a calling to a resident is performed by pressing a calling button, it is necessary to provide the doorbell with the calling button. The calling button is provided so as to be movable in a pressing direction when pressed. Therefore, a gap is formed around the calling button between the calling button and a case of the doorbell. For this reason, rainwater and the like may enter the doorbell through the gap, thereby damaging the doorbell.

An object of the present invention is to provide a doorbell capable of extending a service life in an outside environment.

Also, in the Wi-Fi doorbell as disclosed in PTL 1, for example, when a visitor is detected by a camera or another sensor, an image of the visitor is recorded using the camera and the recorded image is displayed on the remotely disposed computing device. In order to appropriately display the image of the visitor captured by the camera of the doorbell on the computing device, there is a room for improvement on the configuration of the doorbell.

Therefore, an object of the present invention is to provide a doorbell capable of appropriately displaying an image of a visitor or the like captured by a camera on an external device.

Also, each housing complex may be provided with not only residences and a management office but also communal facilities such as a parking lot, a gym and the like, in some cases. In the housing complex, there is a need for a system configured to collectively perform a calling control from a calling device (for example, a doorbell) installed in the communal facility, in addition to a calling control of each of the residences and the management office.

Therefore, an object of the present invention is to provide a housing complex communication system capable of smoothly performing a calling control for each of facilities in a housing complex and continuously performing communication among the facilities.

Also, each housing complex may be provided with not only residences and a management office but also communal facilities such as a parking lot, a gym and the like, in some cases. In the housing complex, there is a need for a system configured to collectively perform a calling control from a doorbell installed in the communal facility and capable of performing wireless communication, in addition to a calling control of each of the residences and the management office.

Therefore, an object of the present invention is to provide a housing complex communication system capable of performing a smooth calling control between a calling device provided in a housing facility of a housing complex and a doorbell installed in a communal facility.

In the system disclosed in PTL 9, as a means for acquiring the meteorological information, devices such as an antenna having a sensor configured to detect the meteorological information are used. However, since the devices are not so-called daily necessities, the user does not have the devices, in many cases. For this reason, it is necessary for the user to newly install the devices (an antenna, a satellite broadcasting tuner and the like) so as to receive the service. Also, in order to replace the devices with other devices, it is necessary to install the other devices outdoors and to stably supply power to the same.

An object of the present invention is to provide a meteorological information providing system using a device which is installed outdoors of a residence and to which power is stably supplied.

Solution to Problem

A setting method of a Wi-Fi doorbell in accordance with an aspect of the present invention is a setting method of a Wi-Fi doorbell, in which a Wi-Fi doorbell including a camera capable of reading a two-dimensional code and a mobile communication terminal including a display unit capable of displaying the two-dimensional code are used, the setting method including steps of:

causing the display unit to display a two-dimensional code in which password information for enabling the Wi-Fi doorbell to connect to a network via a Wi-Fi router is embedded, reading the two-dimensional code by the camera of the Wi-Fi doorbell, and setting the Wi-Fi doorbell to a state where the Wi-F doorbell can perform communication with a remotely disposed server via the Wi-Fi router, based on the read two-dimensional code.

According to the above configuration, the Wi-Fi doorbell and the server can perform communication with each other and an initial setting of the Wi-Fi doorbell is completed simply by reading the two-dimensional code displayed on the display unit of the mobile communication terminal with the camera of the Wi-Fi doorbell. Thereby, since a user can perform the initial setting of the Wi-Fi doorbell more conveniently, a burden on the user associated with the installation of the Wi-Fi doorbell is reduced.

According to the above configuration, it is possible to provide the setting method of a Wi-Fi doorbell by which it is possible to perform the initial installation more simply.

Also, in the setting method of a Wi-Fi doorbell in accordance with an aspect of the present invention, position information upon initial installation of the Wi-Fi doorbell is embedded in the two-dimensional code.

According to the above configuration, since the Wi-Fi doorbell has the position information upon the initial installation, even if the Wi-Fi doorbell is stolen, it is possible to easily specify whether the Wi-Fi doorbell is a stolen article. For this reason, it is possible to prevent unauthorized use and unauthorized resale of the Wi-Fi doorbell.

According to the above configuration, it is possible to provide the setting method of a Wi-Fi doorbell capable of further increasing crime prevention.

Also, in the setting method of a Wi-Fi doorbell in accordance with an aspect of the present invention, the Wi-Fi doorbell can store a specific person in the server by reading a person image by the camera of the Wi-Fi doorbell upon initial setting, and the Wi-Fi doorbell can determine whether or not to call, based on the person image stored in the server.

According to the above configuration, the user can store a face and the like of the user or a specific person such as an acquaintance of the user in the Wi-Fi doorbell upon the initial setting of the Wi-Fi doorbell. Thereby, for a person who has no problem even though the user responds to a calling, the user can smoothly admit the person indoors. In contrast, since the user is not called to a person such as a suspicious person whom the user does not want to admit indoors, the user is not called each time a visitor comes.

According to the above configuration, it is possible to provide the setting method of a Wi-Fi doorbell by which the user is not unnecessarily called.

Also, a setting method of a Wi-Fi doorbell in accordance with an aspect of the present invention is a setting method of a Wi-Fi doorbell, in which a Wi-Fi doorbell including a voice recognition unit is used, the setting method including steps of:

connecting the Wi-Fi doorbell to a Wi-Fi router, based on a voice password recognized by the voice recognition unit, the voice password being read so that the Wi-Fi doorbell can connect to a network via the Wi-Fi router, and setting the Wi-Fi doorbell to a state where the Wi-Fi doorbell can perform communication with a remotely disposed server via the Wi-Fi router.

According to the above configuration, the user can complete the initial setting of the Wi-Fi doorbell simply by reading the password for connecting the Wi-Fi doorbell and the Wi-Fi router. Thereby, since the user can perform the initial setting of the Wi-Fi doorbell more conveniently, a burden on the user associated with the installation of the Wi-Fi doorbell is reduced.

According to the above configuration, it is possible to provide the setting method of a Wi-Fi doorbell by which it is possible to perform the initial installation more simply.

Also, a setting method of a Wi-Fi doorbell in accordance with an aspect of the present invention is a setting method of a Wi-Fi doorbell, in which a Wi-Fi doorbell including a light beam detection unit is used, the setting method including steps of:

transmitting, to the Wi-Fi doorbell, password information for enabling the Wi-Fi doorbell to connect to a network via a Wi-Fi router, by optical communication, setting the Wi-Fi doorbell to a state where the Wi-Fi doorbell can connect to the network via the Wi-Fi router, based on the password information, and setting the Wi-Fi doorbell to a state where the Wi-Fi doorbell can perform communication with a remotely disposed server via the Wi-Pi router.

According to the above configuration, the user can complete the initial setting of the Wi-Fi doorbell simply by emitting a light beam from a terminal to the Wi-Fi doorbell toward the light beam detection unit of the Wi-Fi doorbell. Thereby, since the user can perform the initial setting of the Wi-Fi doorbell more conveniently, a burden on the user associated with the installation of the Wi-Fi doorbell is reduced.

According to the above configuration, it is possible to provide the setting method of a Wi-Fi doorbell by which it is possible to perform the initial installation more simply.

Also, a setting method of a Wi-Fi doorbell in accordance with an aspect of the present invention is a setting method of a Wi-Fi doorbell, in which a Wi-Fi doorbell including an ultrasonic wave detection unit is used, the setting method including steps of: transmitting, to the Wi-Fi doorbell, password information for enabling the Wi-Fi doorbell to connect to a network via a Wi-Fi router, by ultrasonic communication, setting the Wi-Fi doorbell to a state where the Wi-Fi doorbell can connect to the network via the Wi-Fi router, based on the password information, and setting the Wi-Fi doorbell to a state where the Wi-Fi doorbell can perform communication with a remotely disposed server via the Wi-Fi router.

According to the above configuration, the user can complete the initial setting of the Wi-Pi doorbell simply by emitting an ultrasonic wave from a terminal toward the ultrasonic wave detection unit of the Wi-Fi doorbell. Thereby, since the user can perform the initial setting of the Wi-Fi doorbell more conveniently, a burden on the user associated with the installation of the Wi-Fi doorbell is reduced.

According to the above configuration, it is possible to provide the setting method of a Wi-Fi doorbell by which it is possible to perform the initial installation more simply.

A doorbell in accordance with an aspect of the present invention includes:

a camera configured to capture a visitor, a calling button that is pressed by the visitor so as to call a resident a person detection sensor for detecting approach of the visitor, a voice recognition unit for recognizing a voice of the visitor, a storage unit for registering data for comparison, and an artificial intelligence unit capable of issuing a calling notification to a terminal of the resident, wherein when the calling button is pressed by the visitor or when the visitor is detected by the person detection sensor, the artificial intelligence unit compares an image captured by the camera or a voice of the visitor recognized by the voice recognition unit with the data registered in the storage unit, and wherein when the data and the image or the voice are associated with each other, a calling is notified to the terminal of the resident.

According to the above configuration, the artificial intelligence performs the comparison, based on the data registered in advance in the storage unit, and issues the calling notification to the terminal of the resident only when a degree of coincidence is equal to or greater than a predetermined threshold value. For this reason, an unnecessary calling is not notified to the resident.

According to the above configuration, it is possible to provide the doorbell capable of limiting the unnecessary calling notification.

Also, in the doorbell in accordance with an aspect of the present invention, the artificial intelligence unit can generate data for appropriately responding to the voice recognized by the voice recognition unit.

According to the above configuration even though a visitor visits while a resident is absent, the doorbell 2 determines whether the visitor is a person to whom it should respond, and then responds appropriately to the visitor.

According to the above configuration, it is possible to provide the doorbell that can deal with the absence.

Also, in the doorbell in accordance with an aspect of the present invention, when the data and the image or the voice are associated with each other as a result of the comparison of the image captured by the camera or the voice of the visitor recognized by the voice recognition unit with the data registered in the storage unit, the artificial intelligence unit notifies the terminal of the resident that the data is not associated with the image or the voice.

According to the above configuration, when the degree of coincidence is less than a predetermined threshold value as a result of the comparison of the image captured by the camera or the voice of the visitor recognized by the voice recognition unit with the data registered in the storage unit, the artificial intelligence notifies the terminal that the degree of coincidence is less than the predetermined threshold value together with the captured image of the visitor or the voice data of the visitor. For this reason, even though the calling notification is not issued, the resident can check the visitor and know that the visitor is a person who is likely not an acquaintance.

According to the above configuration, it is possible to provide the doorbell by which the resident can check all visitors while limiting the unnecessary calling notification.

Also, in the doorbell in accordance with an aspect of the present invention, the doorbell can connect to a network via a Wi-Fi router, perform communication with a mobile communication terminal associated with the resident via the network, and notify the calling to the mobile communication terminal.

According to the above configuration, for example, even when the resident is in a remote place, the resident can check the calling notification.

According to the above configuration, it is possible to provide the doorbell by which the resident can check the necessary calling notification even when the resident is in the remote place.

A doorbell in accordance with an aspect of the present invention includes:

a camera configured to capture a visitor, a calling button that is pressed by the visitor so as to call a resident, a video processing unit configured to analyze an image captured by the camera, a condition storage unit for storing a condition under which a notification to a terminal of the resident is not performed, a determination unit configured to determine whether or not to call the resident, and a calling notification unit configured to notify a calling to the resident, wherein the video processing unit analyzes the image captured by the camera when the calling button is pressed by the visitor, wherein the determination unit is configured to calculate a suspicious person frequency, based on an analysis result by the video processing unit, and to compare the suspicious person frequency and the condition stored in the condition storage unit, thereby determining whether or not to call the resident, and wherein when the determination unit determines not to call the resident, the calling notification unit does not notify the calling to the resident.

According to the above configuration, since a calling from a visitor who is likely a suspicious person is not notified to the resident, it is possible to reduce the number of unnecessary calling notifications.

According to the above configuration, it is possible to provide the doorbell capable of reducing the unnecessary calling notification.

Also, in the doorbell in accordance with an aspect of the present invention, the doorbell further includes a saving unit configured to save the image captured by the camera and the suspicious person frequency calculated by the determination unit, and the determination unit is further configured to compare the analysis result by the video processing unit and the image and suspicious person frequency saved in the saving unit, thereby determining whether or not to call the resident.

According to the above configuration, an accuracy of the determination as to whether the visitor is the suspicious person is improved, and the number of calling notifications from a visitor who is likely a suspicious person is reduced.

According to the above configuration, it is possible to provide the doorbell by which it is not necessary to respond to the calling beyond necessity.

Also, in the doorbell in accordance with an aspect of the present invention, the condition includes information about a visitor for whom the calling is permitted or a visitor for whom the calling is not permitted, the information being transmitted from the terminal of the resident, and the video processing unit is configured to analyze the image captured by the camera, based on the condition stored in the condition storage unit.

According to the above configuration, the video processing unit analyzes whether a visitor is a suspicious person, based on the information transmitted from the terminal of the resident. For this reason, the resident can cause the video processing unit to analyze whether a visitor is a suspicious person, based on a setting according to the resident's intention.

According to the above configuration, it is possible to provide the doorbell by which it is not necessary to respond to the calling beyond necessity.

Also, in the doorbell in accordance with an aspect of the present invention, the condition includes information about an action tendency of a suspicious person, and the video processing unit is configured to analyze a motion of the visitor detected by the camera, based on the action tendency of the suspicious person stored in the condition storage unit.

According to the above configuration, the video processing unit analyzes the motion of the visitor, based on the action tendency of the suspicious person stored in the condition storage unit. For this reason, a calling from a visitor who is likely a suspicious person is not notified to the resident.

According to the above configuration, it is possible to provide the doorbell capable of reducing the unnecessary calling notification.

Also, in the doorbell in accordance with an aspect of the present invention, the doorbell can connect to a network via a Wi-Fi router, perform communication with a mobile communication terminal associated with the resident via the network, and notify the calling to the mobile communication terminal.

According to the above configuration, for example, even when the resident is in a remote place, the resident can check the calling notification.

According to the above configuration, it is possible to provide the doorbell by which the resident can check the necessary calling notification even when the resident is in the remote place.

A doorbell in accordance with an aspect of the present invention includes:

a person detection sensor configured to detect a visitor, a motion sensor configured to detect a motion of the visitor detected by the person detection sensor, a determination unit configured to determine whether a visitor is approaching the motion sensor, based on the motion of the visitor detected by the motion sensor, and a calling notification unit configured to notify a calling to a terminal of a resident, wherein when the determination unit determines that the visitor is approaching the motion sensor, based on a motion of the visitor detected by the motion sensor, the calling notification unit notifies a calling to the terminal of the resident.

According to the above configuration, the resident can be called simply when the visitor is approaching the motion sensor, not the pressing on the calling button. For this reason, it is possible to notify a calling to the terminal of the resident, even though a calling button is not provided.

According to the above configuration, it is possible to provide the doorbell capable of extending a service life in an outside environment.

Also, in the doorbell in accordance with an aspect of the present invention, the doorbell further includes a voice recognition unit configured to recognize a voice of the visitor, and when the voice recognition unit recognizes the voice of the visitor who calls the resident, a calling can be notified to the terminal of the resident.

According to the above configuration, the visitor can call the resident simply by uttering a voice for calling the resident toward the doorbell. For this reason, it is possible to call the resident, even though a calling button is not provided.

According to the above configuration, it is possible to provide the doorbell capable of extending the service life in the outside environment.

Also, in the doorbell in accordance with an aspect of the present invention, the doorbell further includes a contact recognition unit configured to recognize a knock of the visitor, and when the contact recognition unit recognizes the knock, the calling notification unit can notify a calling to the terminal of the resident.

According to the above configuration, the visitor can call the resident simply by knocking the contact recognition unit.

For this reason, it is possible to call the resident, even though a calling button is not provided.

According to the above configuration, it is possible to provide the doorbell capable of extending the service life in the outside environment.

Also, in the doorbell in accordance with an aspect of the present invention, the doorbell includes a camera configured to capture the visitor, the camera can read a two-dimensional code for calling the resident, and when the camera reads the two-dimensional code, the calling notification unit can notify a calling to the terminal of the resident.

According to the above configuration, the visitor can call the resident by causing the camera capable of capturing the two-dimensional code to capture the two-dimensional code. For this reason, it is possible to call the resident, even though a calling button is not provided.

According to the above configuration, it is possible to provide the doorbell capable of extending the service life in the outside environment.

Also, in the doorbell in accordance with an aspect of the present invention, the doorbell can connect to a network via a Wi-Fi router, perform communication with a mobile communication terminal associated with the resident via the network, and notify a calling to the mobile communication terminal.

According to the above configuration, for example, even when the resident is in a remote place, the resident can check the calling notification.

According to the above configuration, it is possible to provide the doorbell by which the resident can check the necessary calling notification even when the resident is in the remote place.

In order to achieve the above object, a doorbell of the present invention includes:

a main body part, an operation unit attached to the main body part and enabling a visitor to call a resident, at least two cameras attached to the main body part and capable of capturing a surrounding image, and a control unit connected to the operation unit and the at least two cameras, and capable of transmitting the image captured by the at least two cameras to an external device, wherein at least a part of the operation unit is disposed on a line orthogonal to a virtual straight line connecting the at least two cameras.

According to the above configuration, the image of the visitor or the like can be captured at a wide angle by the at least two cameras disposed on both sides of the operation unit. For this reason, it is possible to appropriately display the captured image of the visitor on the external device. Thereby, a user of the external device can easily perceive who the visitor is. Also, by analyzing the image captured at the wide angle, it is possible to increase a detection capability of a suspicious person and the like, and to prevent an erroneous detection.

Also, in the doorbell, the at least two cameras include a first camera and a second camera, the first camera is disposed on a left side of the operation unit, and the second camera is disposed on a right side of the operation unit, and a capturing range of the first camera and a capturing range of the second camera may overlap at least partially.

According to the above configuration, the capturing range can be set to a wide angle in a right and left direction. Also, since the capturing range of the first camera and the capturing range of the second camera overlap at a central part in front of the operation unit where the visitor may be located, a capability of recognizing the visitor can be improved.

Also, in the doorbell, the main body part may be configured to have an L-shape, as seen from above.

According to the above configuration, it is possible to install the doorbell at a place where it is necessary to capture a wide range around the doorbell, for example, an entrance wall or a corner part such as a pillar.

Also, the external device may include any one of an information terminal associated with the resident and a living room master unit provided in a living room of a residence in which the doorbell is installed.

The doorbell of the present invention is preferably configured as a Wi-Fi doorbell that can perform wireless communication with the information terminal or a doorbell that can perform communication with the living room master unit via an intercom line, for example.

In order to achieve the above object, a housing complex communication system of the present invention includes:

a first calling device installed in a first facility in a housing complex and capable of calling a user in the first facility, a first control unit capable of performing communication with the first calling device and configured to transmit a first calling signal to the first calling device, a second calling device installed in a second facility in the housing complex and capable of calling a user in the second facility, and a second control unit capable of performing communication with the second calling device and configured to transmit a second calling signal to the second calling device, wherein the first calling signal and the second calling signal can be communicated between the first control unit and the second control unit.

According to the above configuration, the calling signal for calling each of the calling devices can be communicated between the first control unit and the second control unit of which calling devices of communication destinations are different. Thereby, it is possible to smoothly perform a calling control for each facility in the housing complex, and to perform communication between the facilities in a seamless manner.

Also, the housing complex communication system may be configured so that the first calling signal and the second calling signal can be communicated between the first control unit and the second control unit by executing a single application in at least one of the first control unit and the second control unit.

According to the above configuration, since it is possible to control both the first control unit and the second control unit by the single application, it is possible to smoothly cooperate the control units.

Also, in the housing complex communication system, the first calling device may include at least one of a living room master unit installed in a living room of each of residences in the housing complex, a living room entrance slave unit installed in an entrance of each of the residences, a group entrance device installed in a group entrance of the housing complex, and a portable information terminal possessed by a user associated with each of the residences.

The first control unit is preferably configured as an integrated control unit that is used for a general intercom system for a housing complex.

Also, in the housing complex communication system, the second calling device may include at least one of a calling device installed in a communal facility in the housing complex, a management office master unit installed in a management office in the housing complex, and a remote control device disposed remotely from the housing complex.

According to the above configuration, for example, even when the second calling device is newly additionally installed in the communal facility, it is not necessary to change a system of the first control unit and it is possible to smoothly perform a calling of the first calling device from the second calling device.

In order to achieve the above object, a housing complex communication system of the present invention includes:

a calling device associated with at least one of each residence and a group entrance in a housing complex, a doorbell associated with a communal facility in the housing complex, and a control unit configured to perform communication with the calling device and the doorbell, wherein the doorbell is configured to perform communication with the control unit by a wireless network communication means.

According to the above configuration, it is possible to provide the housing complex communication system that can enable a smooth calling control between the calling device provided in a housing facility in the housing complex and the doorbell installed in the communal facility. Also, since the doorbell can perform communication by a wireless network means, the doorbell can be easily fitted later.

Also, in the housing complex communication system, the communal facility may include at least one of a management office and a security pole installed in the housing complex.

According to the above configuration, it is possible to call the calling device from the doorbell installed in the management office and to call the doorbell in the management office from the doorbell installed in the security pole.

Also, in the housing complex communication system, the calling device may include a portable information terminal associated with a resident of each residence.

According to the above configuration, it is possible to perform a calling between the doorbell and the information terminal such as a smartphone carried by the resident.

Also, the housing complex communication system may further include a remote control device disposed remotely from the housing complex and configured to perform communication with the control unit by a wireless communication network means.

According to the above configuration, it is possible to deal with a calling from the calling device or the doorbell, in a control room of an apartment management company, a security company and the like.

A meteorological information providing system in accordance with an aspect of the present invention includes:

a doorbell having a near field communication function, a meteorological information measuring device having a near field communication function, a meteorological information analysis device, and a server, wherein the doorbell can perform communication with the meteorological information measuring device via near field communication, wherein the server can perform communication with the doorbell and the meteorological information analysis device via a network, and save position information of the doorbell, wherein the doorbell is configured to acquire meteorological information acquired by the meteorological information measuring device, via the near field communication, and to transmit the meteorological information to the server via the network, and wherein the meteorological information analysis device is configured to analyze the meteorological information, based on the meteorological information transmitted to the server and the position information, and to transmit analysis data to the server.

According to the above configuration, after the meteorological information acquired by the meteorological information measuring device is transmitted to the doorbell, the doorbell transmits the received meteorological information to the server. Then, the meteorological information analysis device analyzes the local meteorological information, based on the meteorological information transmitted to the server and the position information of the doorbell.

According to the above configuration, the doorbell in which the position information of the residence is saved and to which power is stably supplied is used instead of devices such as an antenna, a satellite tuner and the like, so that it is possible to provide the meteorological information providing system capable of providing the user (resident) with a meteorological information service.

Also, the meteorological information providing system in accordance with an aspect of the present invention further includes a mobile communication terminal, the server can perform communication with the mobile communication terminal via the network, and the meteorological information and the analysis data can be browsed on the mobile communication terminal.

According to the above configuration, since the server can perform communication with the mobile communication terminal via the network, the acquired meteorological information and the analysis data can be browsed on the mobile communication terminal. For this reason, the user can conveniently browse the meteorological information of a place of residence and the analysis data on the mobile communication terminal even when the user is in a remote place, for example.

According to the above configuration, it is possible to provide the meteorological information providing system by which the meteorological information and the analysis data can be browsed on the mobile communication terminal.

Also, in the meteorological information providing system in accordance with an aspect of the present invention, the meteorological information is one or more of a temperature, a humidity, a rainfall, an atmospheric pressure, a wind speed, a wind direction, an illuminance, a noise, an ultraviolet ray amount, a carbon dioxide concentration, and a pollen amount.

According to the above configuration, data about a temperature, a humidity, a rainfall, an atmospheric pressure, a wind speed, a wind direction, an illuminance, a noise, an ultraviolet ray, a carbon dioxide concentration, and a pollen amount and the analysis data based on the same are transmitted to the server.

It is possible to provide the meteorological information providing system capable of providing the user (resident) with the meteorological information service without using devices such as an antenna, a satellite tuner and the like.

Also, in the meteorological information providing system in accordance with an aspect of the present invention, the analysis data is one or more of a weather forecast, a weather history, a heat stroke alert, a pollen alert, a sunburn alert, hurricane route information, a lightning alert and a hail alert.

According to the above configuration, the analysis data about a weather forecast, a weather history, a heat stroke alert, a pollen alert, a sunburn alert, hurricane route information, a lightning alert and a hail alert and the meteorological information are transmitted to the server.

According to the above configuration, it is possible to provide the meteorological information providing system capable of providing the user (resident) with the meteorological information service without using devices such as an antenna, a satellite tuner and the like.

Advantageous Effects of Invention

According to the present invention, it is possible to provide the setting method of a Wi-Fi doorbell by which it is possible to perform the initial installation more simply.

Also, according to the present invention, it is possible to provide the doorbell capable of limiting the unnecessary calling notification.

Also, according to the present invention, it is possible to provide the doorbell capable of extending the service life in the outside environment.

Also, according to the present invention, it is possible to provide the doorbell having a configuration capable of appropriately displaying the image of the visitor or the like captured by the camera on the external device.

Also, according to the present invention, it is possible to provide the housing complex communication system capable of smoothly performing the calling control for each facility in the housing complex and performing communication between the facilities in a seamless manner.

Also, according to the present invention, it is possible to provide the housing complex communication system capable of smoothly performing the calling control between the calling device provided in the housing facility in the housing complex and the doorbell installed in the communal facility.

Also, according to the present invention, it is possible to provide the meteorological information providing system capable of providing the user with the meteorological information service without using devices such as an antenna.

DESCRIPTION OF EMBODIMENTS

<Overall Configuration of Doorbell>

Figure 1:
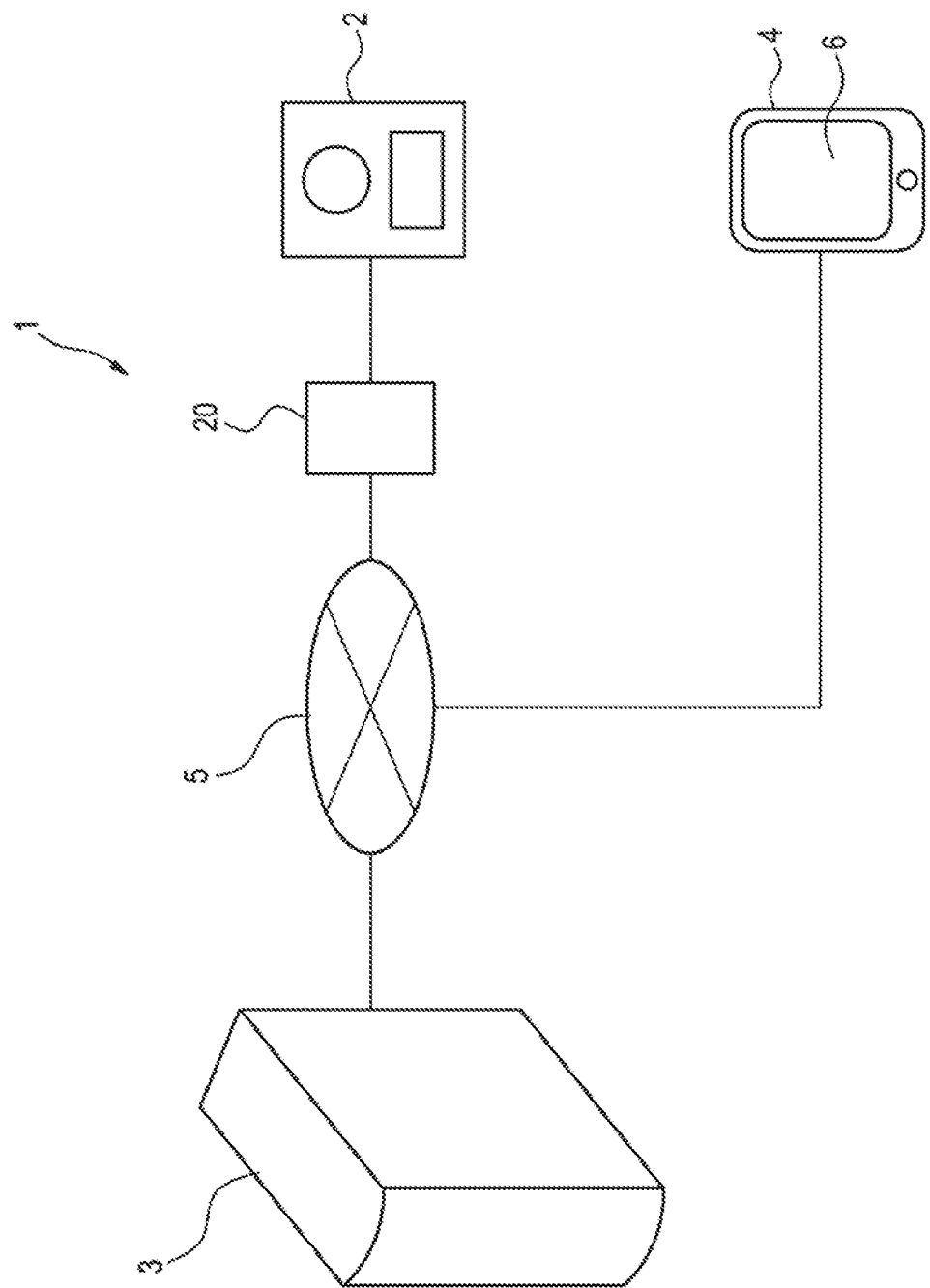
FIG. 1 is a pictorial view of a system in accordance with an aspect of the present invention.

Hereinbelow, an embodiment of the present invention will be described with reference to the drawings. As shown in FIG. 1, a doorbell system 1 includes a doorbell 2 (also referred to as a Wi-Fi doorbell 2), a server 3, and a mobile communication terminal 4 (also referred to as a terminal 4). The doorbell 2 and the mobile communication terminal 4 can perform communication with the server 3 via a network 5. As a communication device configured to relay the doorbell 2 and mobile communication terminal 4 and the network 5, for example, a router 20 (also referred to as a Wi-Fi router 20) may be used. Also, as the mobile communication terminal 4, for example, an electronic device such as a laptop computer, a tablet terminal, a smartphone and the like may be used.

The server 3 includes a storage unit (not shown). The storage unit can store information about a user (resident) of the doorbell 2 and a visitor, position information of the doorbell 2, and the like.

The mobile communication terminal 4 includes a display unit 6, a light-emitting unit (not shown), and an oscillation unit (not shown). The display unit 6 is a touch screen type display such as a liquid crystal monitor, an organic EL display and the like, and is configured to display an image (an operation image, a two-dimensional code and the like). The light-emitting unit can emit a visible light beam such as infrared ray. The visible light beam can be used for visible light communication. The oscillation unit can oscillate an ultrasonic wave. The ultrasonic wave can be used for ultrasonic communication.

The mobile communication terminal 4 can display password information for enabling connection of the doorbell 2 and the server 3 on the display unit 6 or transmit the password information. A display type of the password information is a two-dimensional code, a character for being read as a voice password, and the like, and a transmission method is visible light beam communication, ultrasonic communication and the like.

Also, the user can register a condition setting as to whether or not to admit a visitor and register the position information of the doorbell 2 in the server 3, through the mobile communication terminal 4 in which an application for initial setting of the doorbell 2 is downloaded and the network 5.

Figure 2:
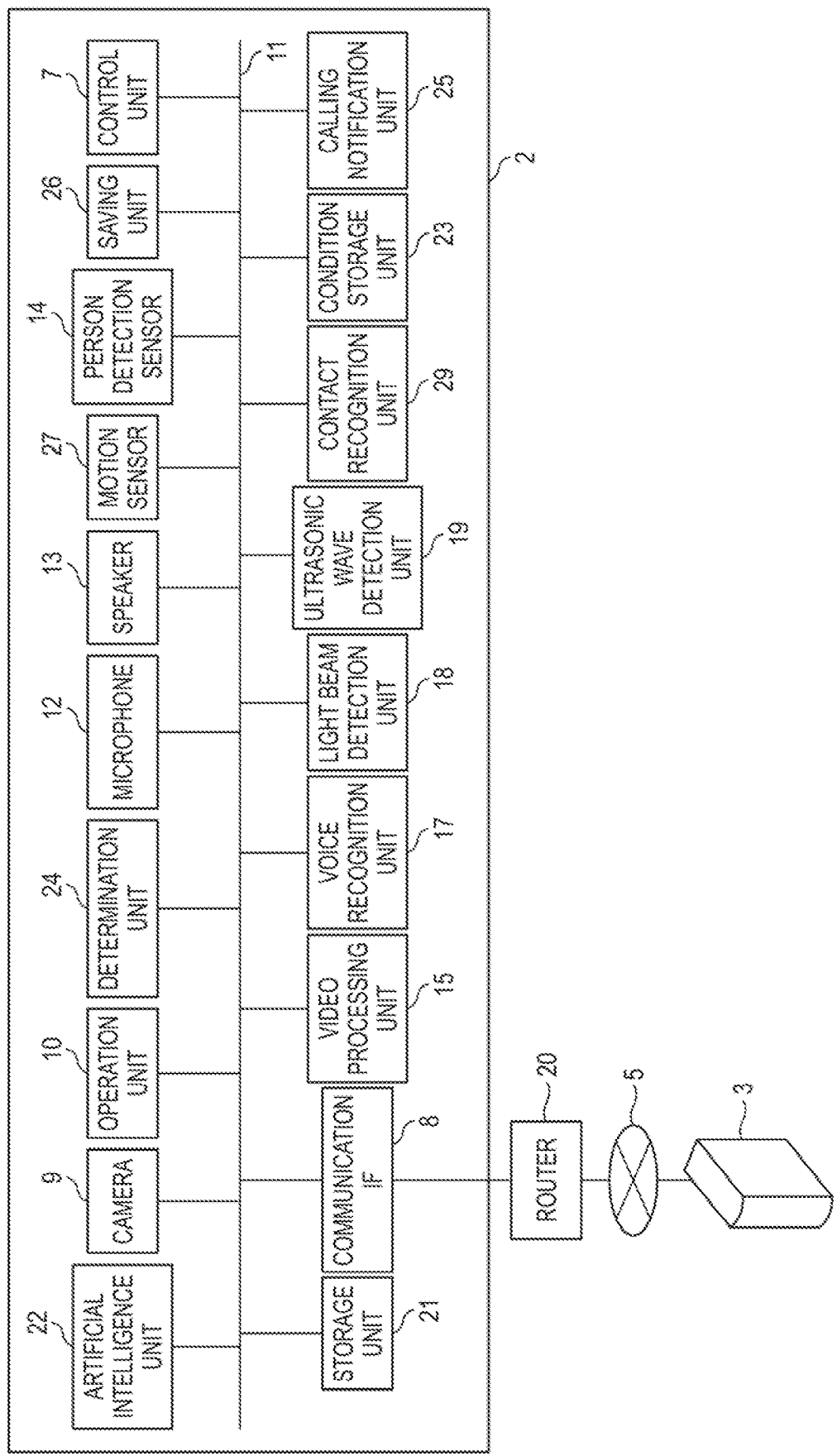
FIG. 2 is a functional block diagram of a doorbell in accordance with an aspect of the present invention.

FIG. 2 is a functional block diagram of the doorbell 2. As shown in FIG. 2, the doorbell 2 includes a control unit 7, a communication IF (interface) 8, a camera 9, an operation unit 10, a microphone 12, a speaker 13, a person detection sensor 14, a video processing unit 15, a voice recognition unit 17, a light beam detection unit 18, an ultrasonic wave detection unit 19, a storage unit 21, an artificial intelligence unit 22, a condition storage unit 23, a determination unit 24, a calling notification unit 25, a saving unit 26, a motion sensor 27, a contact recognition unit 29, and a GPS (Global Positioning System) (no shown), which are communicatively connected to each other via a bus 11.

The control unit 7 is a control unit for controlling operations of each unit of the doorbell 2, and may include at least one microcontroller including one or more processors and one or more memories, and other electronic circuit including an active element such as a transistor and a passive element. The processor is, for example, a CPU (Central Processing Unit), an MPU (Micro Processing Unit), a GPU (Graphics Processing Unit) and/or a TPU (Tensor Processing Unit). The CPU may include a plurality of CPU cores. When the person detection sensor 14 detects a visitor, for example, the CPU controls the camera 9 to start capturing of the visitor. The GPU may include a plurality of GPU cores. The memory includes a ROM (Read Only Memory) and a RAM (Random Access Memory). In the ROM, a doorbell control program may be stored. In the RAM, the doorbell control program may be temporarily stored. The processor may be configured to develop a program designated from the doorbell control program stored in a storage device or the ROM onto the RAM, and to execute a variety of processing in cooperation with the RAM.

Also, the control unit 7 may be configured by an integrated circuit (hardware resource) such as an ASIC (Application Specific Integrated Circuit), FPGA (Field-Programmable Gate Array) and the like. Also, the control unit 7 may be configured by a combination of at least one microcontroller and an integrated circuit.

When a signal received from the light beam detection unit 18 or the ultrasonic wave detection unit 19 (which will be described later) includes the password information for enabling the doorbell 2 to connect to the network 5, the control unit 7 recognizes the password information from the signal, and transfers the recognized password information to the communication IF 8.

The communication IF 8 is a device or an interface enabling connection to the network 5 via the router 20. The doorbell 2 can appropriately perform communication with the server 3 connected to the network 5, via the communication IF 8.

The communication IF 8 has transmission and receiving functions. Focusing on the transmission function, the communication IF 8 functions as an example of a transmission means for transmitting the position information of the doorbell 2 to the server 3 via the network 5, for example.

Also, focusing on the receiving function, the communication IF 8 functions as an example of a receiving means for receiving the position information of the doorbell 2 from the server 3 via the network 5, for example.

The camera 9 is configured to capture a surrounding including the front of the doorbell 2. When a visitor exists in a capturing range of the camera 9, the camera 9 captures the visitor. Also, the camera 9 can read the two-dimensional code. Also, the microphone 12 is configured to capture a voice such as a voice of a visitor around the doorbell 2, for example. The speaker 13 is configured to utter a voice such as a voice of a user captured by a terminal of the user, for example, a microphone of an intercom mater unit.

The operation unit 10 is configured to receive a variety of input operations of the visitor. The diverse input operations include a calling to a user, for example.

The person detection sensor 14 is configured to detect a visitor by infrared ray or the like. When the person detection sensor 14 detects a visitor, it notifies the control unit 7 that the visitor is approaching the doorbell 2.

The video processing unit 15 may be configured by a processor that is similar to the processor of the control unit 7. The video processing unit 15 is configured to process data captured or read by the camera 9 and to transfer a result of the processing to the communication IF 8. The video processing unit 15 includes software for analyzing an image captured by the camera 9. When a visitor presses a calling button of the operation unit 10, the video processing unit 15 can analyze the image captured by the camera 9, based on conditions stored in the condition storage unit 23 (which will be described later).

The voice recognition unit 17 may be configured by a processor that is similar to the processor of the control unit 7. The voice recognition unit 17 is configured to receive voice data such as voice captured by the microphone 12. When the received voice data relates to the password information for enabling the doorbell 2 to connect to the network 5, for example, the voice recognition unit 17 recognizes the password information from the received voice data, and transfers the recognized password information to the communication IF 8.

The voice recognition unit 17 can recognize whether the voice data of the visitor captured by the microphone 12 is voice data relating to a voice for calling a resident, for example, a voice "Excuse me. Is there Mr. Abe?". When the voice recognition unit 17 recognizes the voice data for calling a resident, the voice recognition unit transmits a detection signal indicating that there is a calling to the calling notification unit 25 or the control unit 7.

Also, when the received voice data is data relating to a voice for calling a resident, the voice recognition unit 17 may transfer the received voice data to the artificial intelligence unit 22.

The light beam detection unit 18 includes a detection sensor. The light beam detection unit 18 is configured to detect a light beam (for example, a visible light beam) emitted from the mobile communication terminal 4, for example. The light beam detection unit 18 is configured to convert the detected light beam into a signal and to transmit the signal to the control unit 7.

The ultrasonic wave detection unit 19 includes an ultrasonic wave microphone. The ultrasonic wave detection unit 19 is configured to detect an ultrasonic wave emitted from the mobile communication terminal 4, for example. The ultrasonic wave detection unit 19 is configured to convert the detected ultrasonic wave into a signal and to transmit the signal to the control unit 7.

In the storage unit 21, person-related data is stored. The person-related data is data that is useful for identifying a person. For example, an image, a moving picture and the like relating to a name, a sex, an age, a height, a voice, a physical characteristic and the like correspond to the data. For example, when the user transmits the image data from the mobile communication terminal 4 to the storage unit 21 via the network 5, the storage unit 21 can store the image data.

The artificial intelligence unit 22 includes hardware components such as a processor, a memory, an ALU (arithmetic logic unit), a digital signal processor, a microcomputer, an FPGA (field programmable gate array), a PLU (programmable logic unit) and the like. Also, the artificial intelligence unit 22 includes software that is generally referred to as an artificial intelligence engine.

The artificial intelligence unit 2 can accumulate a plurality of data accumulated in the past and learned models. Also, the artificial intelligence unit 22 can perform machine learning by a framework such as a neural network, deep learning and the like.

For this reason, the artificial intelligence unit 22 can store information about conversation such as words, intonations, conversation grammars and the like, for example. The voice of the visitor captured by the microphone 12 can be analyzed, and a meaning thereof can be interpreted. The artificial intelligence unit 22 is configured to generate an appropriate message, based on the meaning interpreted by the voice recognition unit 17 or the artificial intelligence unit 22. The message is transmitted to the speaker 13, as voice data. Like this, the artificial intelligence unit 22 can interact with a visitor.

The artificial intelligence unit 22 can digitize (compare) a degree of coincidence between the image data processed by the video processing unit 15 or the voice data recognized by the voice recognition unit 17 through the microphone 12 and the data recorded in the storage unit 21.

Upon the comparison, the user can cause the artificial intelligence unit 22 to learn or store a criterion as to whether an association is made. The criterion is, for example, a criterion for notifying the terminal 4 of the user of a calling from the visitor when the digitized degree of coincidence is equal to or greater than a predetermined threshold value.

The artificial intelligence unit 22 is configured to compare the image data processed by the video processing unit 15 or the voice data recognized by the voice recognition unit 17 through the microphone 12 and the data recorded in the storage unit 21. When the degree of coincidence between the image data processed by the video processing unit 15 or the voice data recognized by the voice recognition unit 17 through the microphone 12 and the data recorded in the storage unit 21 is equal to or greater than the predetermined threshold value, a calling from the visitor is notified to the terminal 4 of the user.

The condition storage unit 23 includes a memory for storing a condition under which a notification to the terminal 4 of the user is not issued. The condition is set through the terminal 4 by the user. The condition is information about a visitor who is allowed to call or a visitor who is not allowed to call. The visitor who is not allowed to call is a person who is set by the user so as not to issue a notification to the terminal 4 or a person who does not satisfy a condition stored in advance in the condition storage unit 23 by the user so as not to issue a notification to the terminal 4. A determination criterion as to whether a visitor is a suspicious person or not may include a criterion such as whether a visitor is looking around restlessly, for example. Also, the condition storage unit 23 can store a threshold value for determining whether or not to issue a notification to the terminal 4 of the user, based on a suspicious person frequency (which will be described later). In the meantime, the threshold value that is stored in the condition storage unit 23 can be arbitrarily set by the user.

The determination unit 24 may be configured by a processor that is similar to the processor of the control unit 7. The determination unit 24 can calculate a suspicious person frequency, based on an analysis result by the video processing unit 15. The suspicious person frequency is calculated using a percentage of the number of matching determination criteria to set determination criteria, for example. In the present embodiment, the suspicious person frequency is calculated using this method.

The determination unit 24 is configured to compare the suspicious person frequency calculated by the determination unit 24 and the threshold value stored in the condition storage unit 23. Based on a result of the comparison, the determination unit 24 is configured to determine whether or not to call a resident.

Also, the determination unit 24 may also compare the captured image and suspicious person frequency saved in the saving unit 26 (which will be described later) and the analysis result by the video processing unit 15, and determine whether or not to call a resident by using the comparison result as well.

The determination unit 24 may be configured to determine whether a visitor is approaching the motion sensor 27, based on a detection signal output from the motion sensor 27. For example, when a detection signal indicating that a visitor is approaching the motion sensor 27 is output, the determination unit 24 determines that the visitor is approaching the motion sensor 27. A result of the determination made by the determination unit 24 is transferred to the control unit 7.

The calling notification unit 25 is configured to notify the user that there is a calling from a visitor. The calling notification unit 25 may issue a notification to the terminal 4 of the user when the calling button of the operation unit 10 is pressed or may issue a notification to the terminal 4 of the user, based on a command from the determination unit 24, the control unit 7 or the like.

The saving unit 26 includes a memory in which image data, numerical data and the like can be saved. The saving unit 26 is a means for saving the image captured by the camera 9 and the suspicious person frequency calculated by the determination unit 24.

The motion sensor 27 is configured to continuously detect a motion of a visitor by using infrared ray, microwave, millimeter wave and the like. The motion sensor 27 is activated based on a signal generated as the person detection sensor 14 detects a visitor. When the motion sensor 27 detects a motion of the visitor, the motion sensor 27 outputs a detection signal as a detection result to the determination unit 24.

The contact recognition unit 29 is configured by a pressure sensor and the like, for example, and transmits a detection signal to the calling notification unit 25 or the control unit 7 when a predetermined pressure load is detected. That is, when the visitor knocks at the contact recognition unit 29, the contact recognition unit 29 transmits a detection signal to the calling notification unit 25 or the control unit 7.

First Operation Example (Initial Setting)

An initial setting method of the doorbell 2 where a two-dimensional code is used is described with reference to FIGS. 3 to 6.

Figure 3:
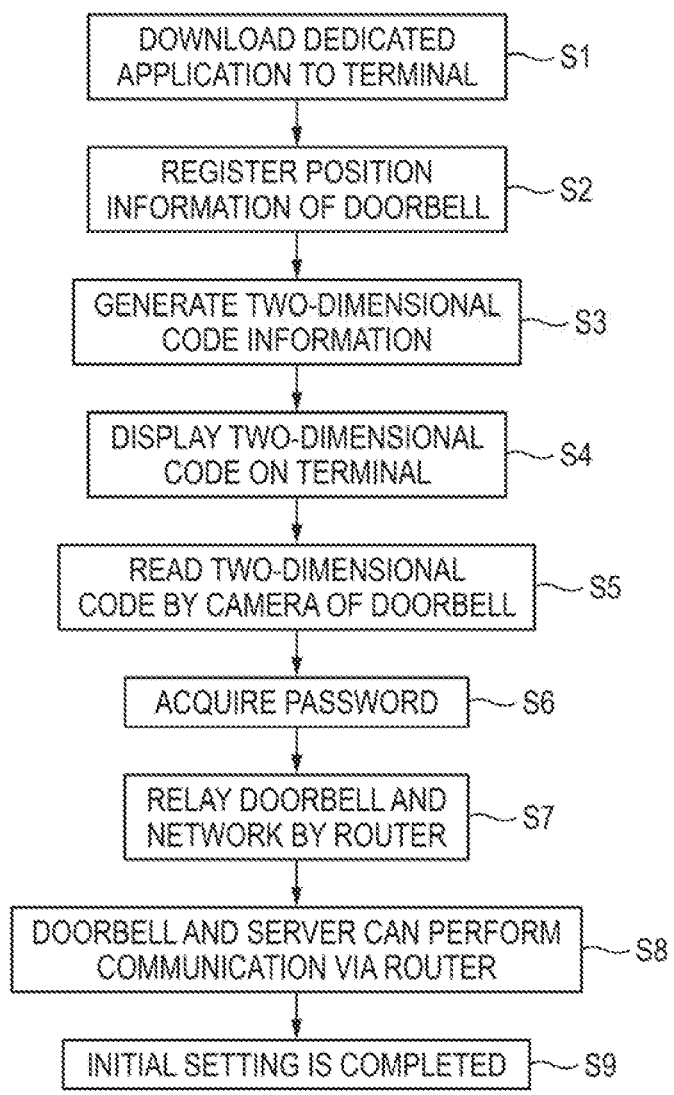
FIG. 3 is a flowchart depicting a flow relating to an initial setting of the doorbell where a two-dimensional code is used.

FIG. 3 is a flowchart depicting a flow relating to an initial setting of the doorbell 2 where a two-dimensional code is used. As shown in FIG. 3, the user of the doorbell 2 downloads a dedicated application to the initial setting from the server 3 into the mobile communication terminal 4 (step S1).

Figure 4:
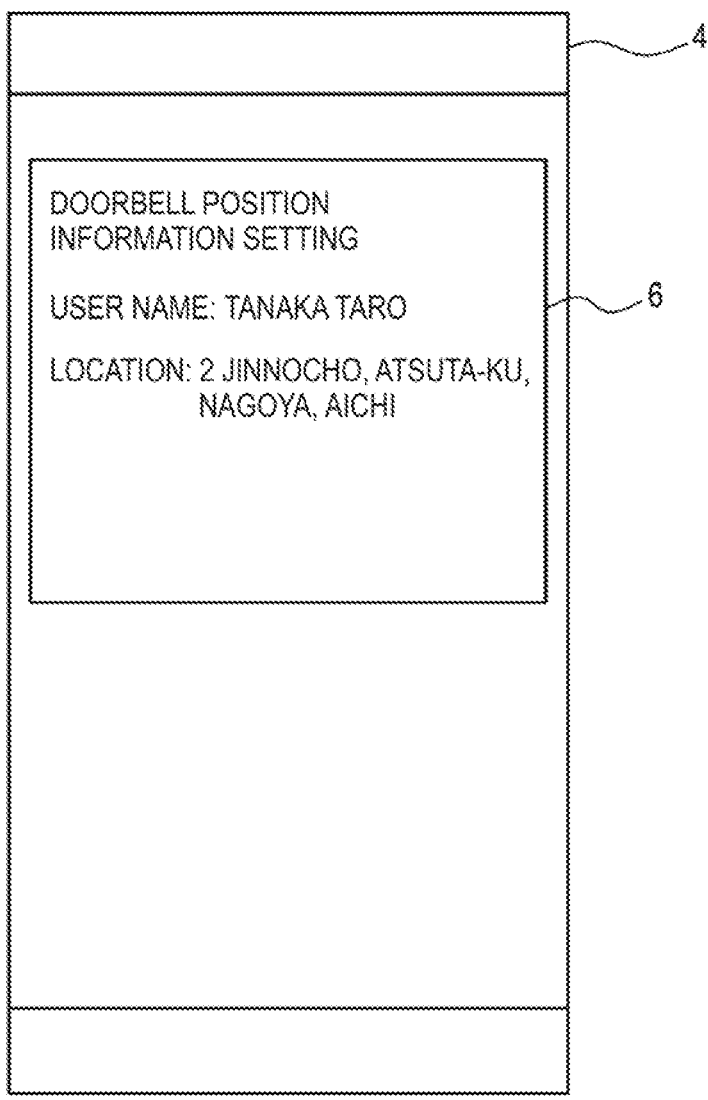
FIG. 4 depicts a screen that is displayed on a display unit of a mobile communication terminal when an application that is used for the initial setting of the doorbell is activated.

FIG. 4 depicts a screen that is displayed on the display unit 6 of the mobile communication terminal 4 when the application that is used for the initial setting of the doorbell 2 is activated.

As shown in FIG. 4, when the application is activated, an input screen relating to the doorbell 2 and a user of the doorbell 2 is displayed on the display unit 6 of the mobile communication terminal 4. The user inputs on the screen the information about the doorbell 2 and the user of the doorbell 2 (for example, the position information of the doorbell 2) (step S2). The position information of the doorbell 2 is an address of a user for registration as the position information of the doorbell 2 or position information acquired by the GPS of the terminal 4. When the input of the position information of the doorbell 2 is completed, the input information is saved in the mobile communication terminal 4. Also, the input information is transmitted to the server 3 via the network 5.

When the position information of the doorbell 2 is input to the mobile communication terminal 4, two-dimensional code information in which password information for enabling the doorbell 2 to connect to the network 5 is embedded is generated by the application, based on the input information (step S3).

Figure 5:
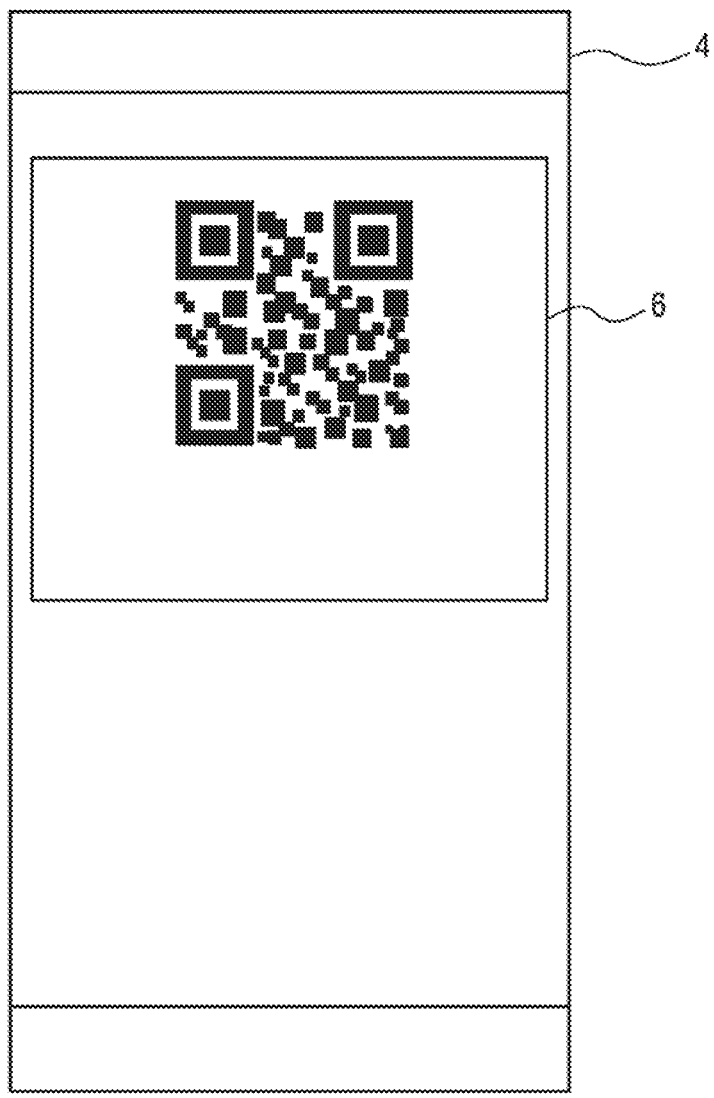
FIG. 5 depicts a state where a two-dimensional code is displayed on the display unit of the mobile communication terminal.

When the two-dimensional code information is generated, a two-dimensional code is displayed on the display unit 6 of the mobile communication terminal 4 (step S4), as shown in FIG. 5.

Figure 6:
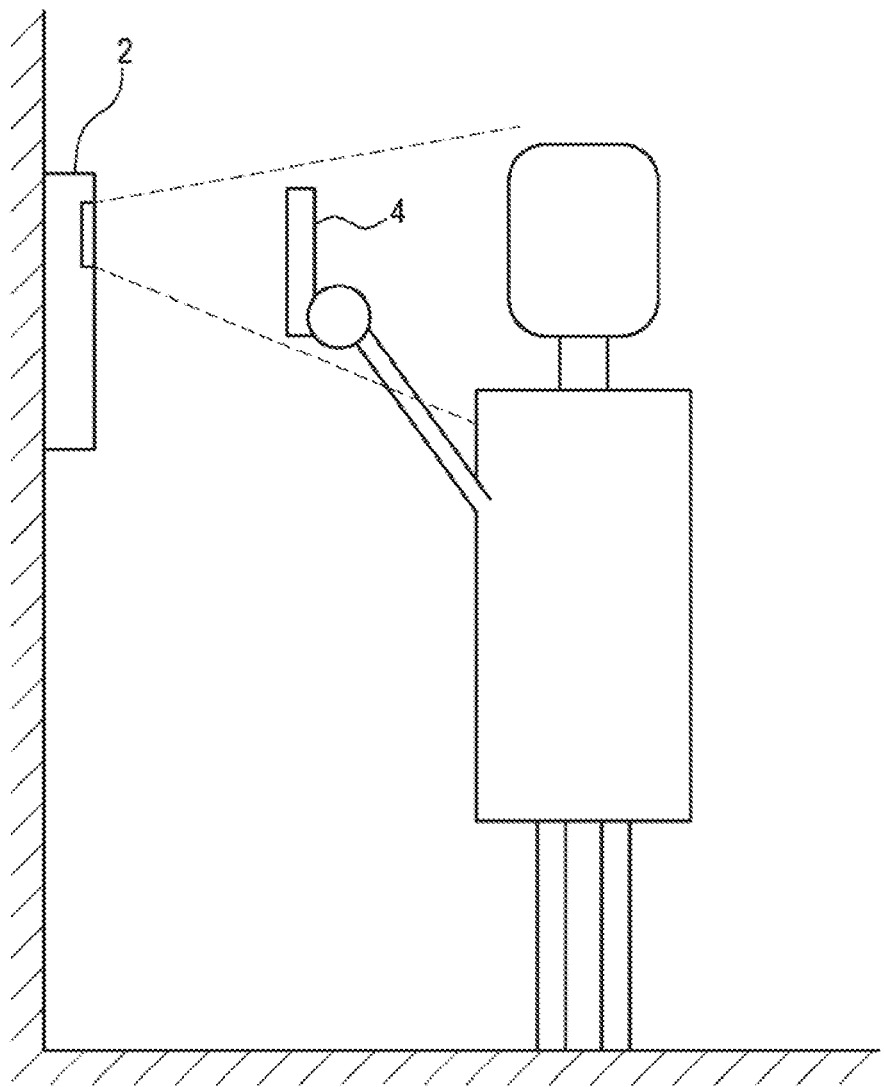
FIG. 6 depicts a state where the two-dimensional code displayed on the display unit of the mobile communication terminal is read by the doorbell.

Then, as shown in FIG. 6, the user causes the camera 9 to read the two-dimensional code displayed on the display unit 6 of the mobile communication terminal 4 (step S5).

For the image captured by the camera 9, the video processing unit 15 recognizes the two-dimensional code. Thereby, the video processing unit 15 acquires the password embedded in the two-dimensional code from the two-dimensional code (step S6).

When the video processing unit 15 acquires the password, the password is transferred to the communication IF 8. The communication IF 8 transmits the received password to the router 20. The router 20 authenticates the received password. When the router 20 determines that the password is valid, the router 20 relays the doorbell 2 and the network 5 (step S7).

As a result, the doorbell 2 is in a state where it can perform communication with the server 3 via the network 5 (step S8). Thereby, the doorbell 2 and the terminal 4 are paired. Thus, the initial setting of the doorbell 2 is completed (step S9).

According to the above configuration, the doorbell 2 and the server 3 can perform communication with each other and the initial setting of the doorbell 2 is completed simply by reading the two-dimensional code displayed on the display unit 6 of the mobile communication terminal 4 with the camera 9 of the doorbell 2. Thereby, since the user can perform the initial setting of the doorbell 2 more conveniently, a burden on the user associated with the installation of the doorbell 2 is reduced.

Like this, according to the above configuration, it is possible to provide the setting method of the doorbell 2 by which it is possible to perform the initial installation more simply.

Also, according to the above configuration, since the doorbell 2 has the position information upon the initial installation, even if the doorbell 2 is stolen, it is possible to easily specify whether the doorbell is a stolen article. For this reason, it is possible to prevent unauthorized use and unauthorized resale of the doorbell 2.

Like this, according to the above configuration, it is possible to provide the setting method of the doorbell 2 capable of further increasing crime prevention.

Second Operation Example (Initial Setting)

Figure 7:
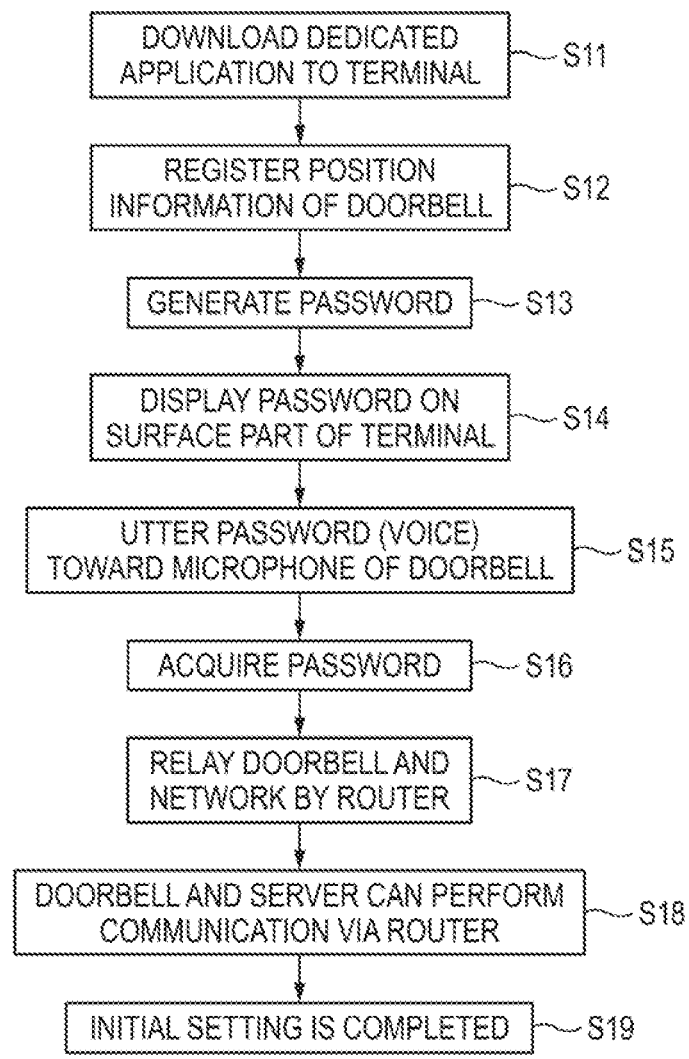
FIG. 7 is a flowchart depicting a flow relating to the initial setting of the doorbell where a voice password is used.

Subsequently, an initial setting method of the doorbell 2 in accordance with a second embodiment is described with reference to FIG. 7. FIG. 7 is a flowchart depicting a flow relating to the initial setting of the doorbell 2 where a voice password is used.

The second operation example is different from the first operation example, in that the password information for enabling the doorbell 2 to connect to the network 5 is transferred to the doorbell 2 by a voice.

Since step S11 and S12 in FIG. 7 are similar to step S1 and S2 in FIG. 3, the descriptions thereof are omitted.

When the position information of the doorbell 2 is input to the mobile communication terminal 4, the password information for enabling the doorbell 2 to connect to the network 2 is generated by the application, based on the input information (step S13). The password information is displayed as character data on the display unit 6 (step S14).

The user utters the password information displayed on the display unit 6 toward the microphone 12 (step S15).

The voice recognition unit 17 receives voice data from a voice of a visitor captured by the microphone 12. The voice recognition unit 17 recognizes the received voice data and acquires the password information (step S16).

The acquired password information is transferred to the communication IF 8. The communication IF 8 transmits the received password to the router 20. The router 20 relays the doorbell 2 and the network 5, based on the received password (step S17).

According to the above configuration, the user can complete the initial setting of the doorbell 2 simply by reading the password for connecting the doorbell 2 and the router 20. Thereby, since the user can perform the initial setting of the doorbell 2 more conveniently, a burden on the user associated with the installation of the doorbell 2 is reduced.

Like this, according to the above configuration, it is possible to provide the setting method of the doorbell 2 by which it is possible to perform the initial installation more simply.

Third Operation Example (Initial Setting)

Figure 8:
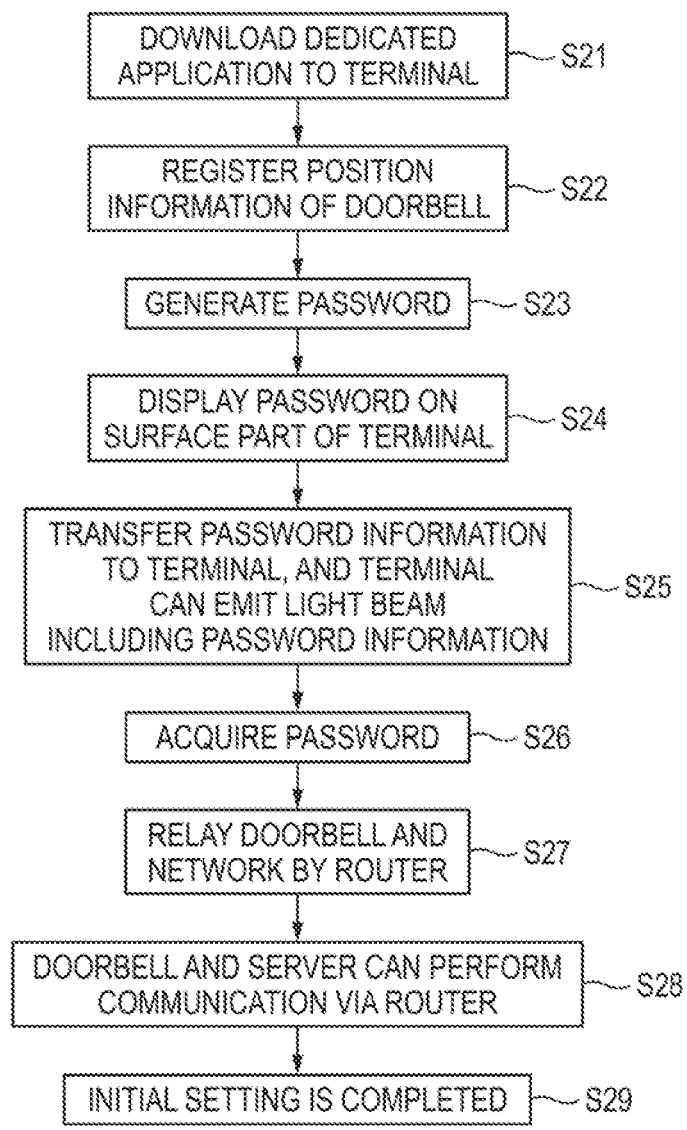
FIG. 8 is a flowchart depicting a flow relating to the initial setting of the doorbell where visible light communication is used.

Subsequently, an initial setting method of the doorbell 2 in accordance with a third operation example is described with reference to FIG. 8. FIG. 8 is a flowchart depicting a flow relating to the initial setting of the doorbell 2 where visible light communication is used.

The third operation example is different from the first operation example, in that the password information for enabling the doorbell 2 to connect to the network 5 is transferred to the doorbell 2 by using visible light beam communication.

Since step S21 and S22 in FIG. 8 are similar to step S1 and S2 in FIG. 3, the descriptions thereof are omitted. Also, since step S28 and S29 are similar to step S8 and S9 of FIG. 3, the descriptions thereof are omitted.

When the position information of the doorbell 2 is input to the mobile communication terminal 4, the password information for enabling the doorbell 2 to connect to the network 2 is generated by the application, based on the input information (step S23).

When the password information is generated, the mobile communication terminal 4 can emit a visible light beam, infrared ray and the like including the password information (step S24).

The user emits a light beam including the password information toward the light beam detection unit 18 by the terminal 4 (step S25).

The light beam detection unit 18 detects the light beam including the password information. The light beam detection unit 18 converts the detected light beam into a signal, and transmits the signal to the control unit 7. The control unit 7 acquires the password information from the signal (step S26).

The acquired password information is transferred to the communication IF 8. The communication IF 8 transmits the received password to the router 20. The router 20 relays the doorbell 2 and the network 5, based on the received password (step S27).

According to the above configuration, the user can complete the initial setting of the doorbell 2 simply by emitting the light beam toward the light beam detection unit 18 of the doorbell 2. Thereby, since the user can perform the initial setting of the doorbell 2 more conveniently, a burden on the user associated with the installation of the doorbell 2 is reduced.

Like this, according to the above configuration, it is possible to provide the setting method of the doorbell 2 by which it is possible to perform the initial installation more simply.

Fourth Operation Example (Initial Setting)

Figure 9:
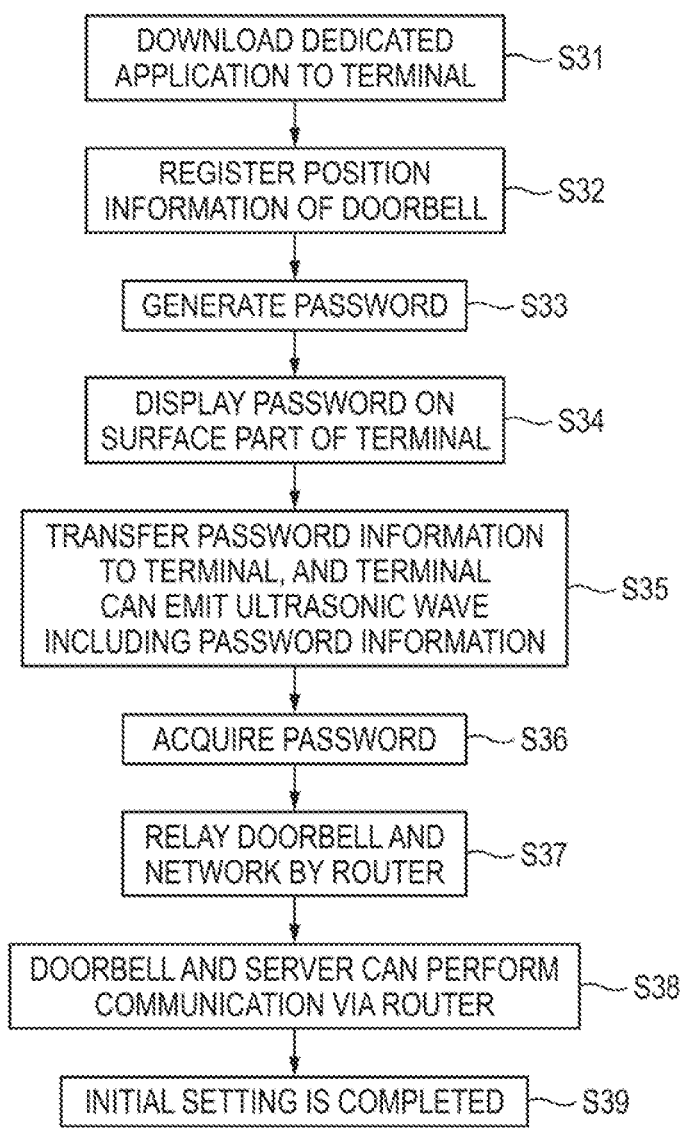
FIG. 9 is a flowchart depicting a flow relating to the initial setting of the doorbell where ultrasonic communication is used.

Subsequently, an initial setting method of the doorbell 2 in accordance with a fourth operation example is described with reference to FIG. 9. FIG. 9 is a flowchart depicting a flow relating to the initial setting of the doorbell 2 where ultrasonic communication is used.

The fourth operation example is different from the first operation example, in that the password information for enabling the doorbell 2 to connect to the network 5 is transferred to the doorbell 2 by using ultrasonic communication.

Since step S31 and S32 in FIG. 9 are similar to step S1 and S2 in FIG. 3, the descriptions thereof are omitted. Also, since step S38 and S39 are similar to step S8 and S9 of FIG. 3, the descriptions thereof are omitted.

When the position information of the doorbell 2 is input to the mobile communication terminal 4, the password information for enabling the doorbell 2 to connect to the network 2 is generated by the application, based on the input information (step S33).

When the password information is generated, the mobile communication terminal 4 can emit an ultrasonic wave including the password information (step S34).

The user emits an ultrasonic wave including the password information toward the ultrasonic wave detection unit 19 by the terminal 4 (step S35).

The ultrasonic wave detection unit 19 detects the ultrasonic wave including the password information. The ultrasonic wave detection unit 19 converts the detected ultrasonic wave into a signal, and transmits the signal to the control unit 7. The control unit 7 acquires the password information from the signal (step S36).

The acquired password information is transferred to the communication IF 8. The 25 communication IF 8 transmits the received password to the router 20. The router 20 relays the doorbell 2 and the network 5, based on the received password (step S37).

According to the above configuration, the user can complete the initial setting of the doorbell 2 simply by emitting the ultrasonic wave toward the ultrasonic wave detection unit 19 of the doorbell 2. Thereby, since the user can perform the initial setting of the doorbell 2 more conveniently, a burden on the user associated with the installation of the doorbell 2 is reduced.

Like this, according to the above configuration, it is possible to provide the setting method of the doorbell 2 by which it is possible to perform the initial installation more simply.

In the first operation example, the example where the camera 9 reads the two-dimensional code has been described. However, the present invention is not limited thereto. For example, the camera 9 can also read a person image. The person image is, for example, a photograph and the like. When the camera 9 is caused to read the person image such as a photograph and the like, data of the person image is transmitted to the video processing unit 15. The video processing unit 15 analyzes the person image, and extracts a physical characteristic of the person, for example. The data and the like about the person image and the physical characteristic of the person are transmitted to the server 3 via the communication IF 8 and the network 5. The server 3 records the received data.

The user can transfer information (information about a condition as to whether to allow a calling) about a person who is allowed to call or a person for whom the user does not respond to a calling with respect to the person image read by the camera 9 to the server 3 via the mobile communication terminal 4. The server 3 records the received information about a condition as to whether to allow a calling.

According to the above configuration, the user can store a face and the like of the user and a specific person such as an acquaintance of the user in the server 3 upon the initial setting of the doorbell 2. Thereby, for a person who has no problem even though the user responds to a calling, the user can smoothly admit the person indoors. In contrast, since the user is not called to a person such as a suspicious person whom the user does not want to admit indoors, the user is not called each time a visitor comes.

Like this, according to the above configuration, it is possible to provide the setting method of the doorbell 2 by which the user is not unnecessarily called.

Modified Embodiments of Initial Setting

An example of a configuration and a setting method when the doorbell 2 is newly set in the doorbell system 1 is described.

The doorbell system 1 of FIG. 1 may include two wireless networks. A first wireless network may originate from the router 20. A second wireless network may originate from the terminal 4 (for example, a portable phone). The first wireless network can enable indirect wireless communication between the doorbell 2 and the terminal 4 via the router 20 or the server 3. The second wireless network can enable direct wireless communication between the doorbell 2 and the terminal 4. The terminal 4 can transmit a password and a name of the first wireless network to the doorbell 2 via the second wireless network. In the meantime, the second wireless network may not require a password.

The doorbell 2 configures its own wireless network (for example, a Wi-Fi network) having a recognizable network name (for example, a service set identifier). When the application of the terminal 4 detects a new wireless network having a recognizable network name, the user can input an instruction for initial setting, through the terminal 4. The instruction for initial setting is to temporarily connect the terminal 4 to the wireless network of the doorbell 2. The user can select a name and a password of the wireless network (first wireless network) that is a target from the terminal 4, and transmit the same to the doorbell 2. The doorbell 2 can connect to the first wireless network (for example, a wireless network in a building in which a security system is provided) and disconnect its own wireless network (second wireless network).

When the user inputs the name and password of the first wireless network into the terminal 4, the name and password of the first wireless network are transferred to the doorbell 2. In the meantime, the terminal 4 may recognize a name of the network (second wireless network) of the doorbell 2, and automatically connect to the network of the doorbell 2 and transmit the name and password of the first wireless network to the doorbell 2.

The terminal 4 can display the name and password of the first wireless network or an image for transferring the same (for example, a high-speed response code). The terminal 4 may generate pulses of light to display the image relating to the name or password of the first wireless network by blinking a monochrome image on the touch screen, for example. The doorbell 2 scans and decodes the image (for example, a high-speed response code) by the camera 9 and the video processing unit 15, thereby specifying the name and password of the first wireless network. The doorbell 2 can connect to the first wireless network by using the specified name and password of the first wireless network. In the meantime, only the password of the first wireless network may be transferred to the doorbell 2. The doorbell 2 may test each of the detected wireless networks by using the password acquired from the terminal 4, thereby identifying a connectable wireless network.

Also, the terminal 4 may generate and sound a voice signal corresponding to the name and/or password of the first wireless network. In this case, the doorbell 2 may analyze and decode the voice signal sounded from the terminal 4 by the microphone 12 and the voice recognition unit 17, thereby receiving the name and/or password of the first wireless network. Also, the terminal 4 may transmit the name and/or password of the first wireless network to the doorbell 2 via a Morse code (for example, by using the light pulse). Also, the doorbell 2 may be paired with the terminal 4 via Bluetooth (registered trademark). That is, the terminal 4 can transmit the name and/or password of the first wireless network to the doorbell 2 via Bluetooth (registered trademark).

Also, the terminal 4 may emit infrared rays to transmit the name and/or password of the first wireless network to the doorbell 2. The infrared communication can transmit the same to the doorbell 2 by using the light-emitting unit of the terminal 4.

Subsequently, an initial setting method of the doorbell 2 is described. As the initial setting of the doorbell 2, the user of the doorbell 2 needs to execute a setup mode so as to connect the doorbell 2 and the terminal 4 via the first wireless network. The setup mode has, for example, a network connection mode.

For example, when the user of the doorbell 2 presses a calling button for a predetermined second, the doorbell 2 enters the network connection mode. In the network connection mode, the control unit 7 reads out identification information for identifying the doorbell 2 (a doorbell identification code associated with the doorbell 2) from the memory or the like of the control unit 7.

Then, the control unit 7 detects the first wireless network for transmitting the identification information to the terminal 4. The control unit 7 can detect the first wireless network by searching for wireless networks within a predetermined range from the doorbell 2, for example.

Then, the control unit 7 transmits a doorbell identification code to the terminal 4 associated with the first wireless network via the detected first wireless network. The doorbell identification code is to check whether the doorbell 2 and the terminal 4 are permitted to perform communication with each other.

Then, the terminal 4 transmits the password for permitting communication by the first wireless network to the doorbell 2 via the second wireless network, based on the received doorbell identification code. The password may be directly transmitted from the terminal 4 to the doorbell 2 via the second wireless network or may be indirectly transmitted to the doorbell via another electronic device such as a server.

Then, the doorbell 2 connects to the specified first wireless network by using the password received from the terminal 4.

<Receiving of Calling>

A flow after a visitor comes until a calling notification is issued to the terminal 4 of a resident is described with reference to FIG. 10.

Figure 10:
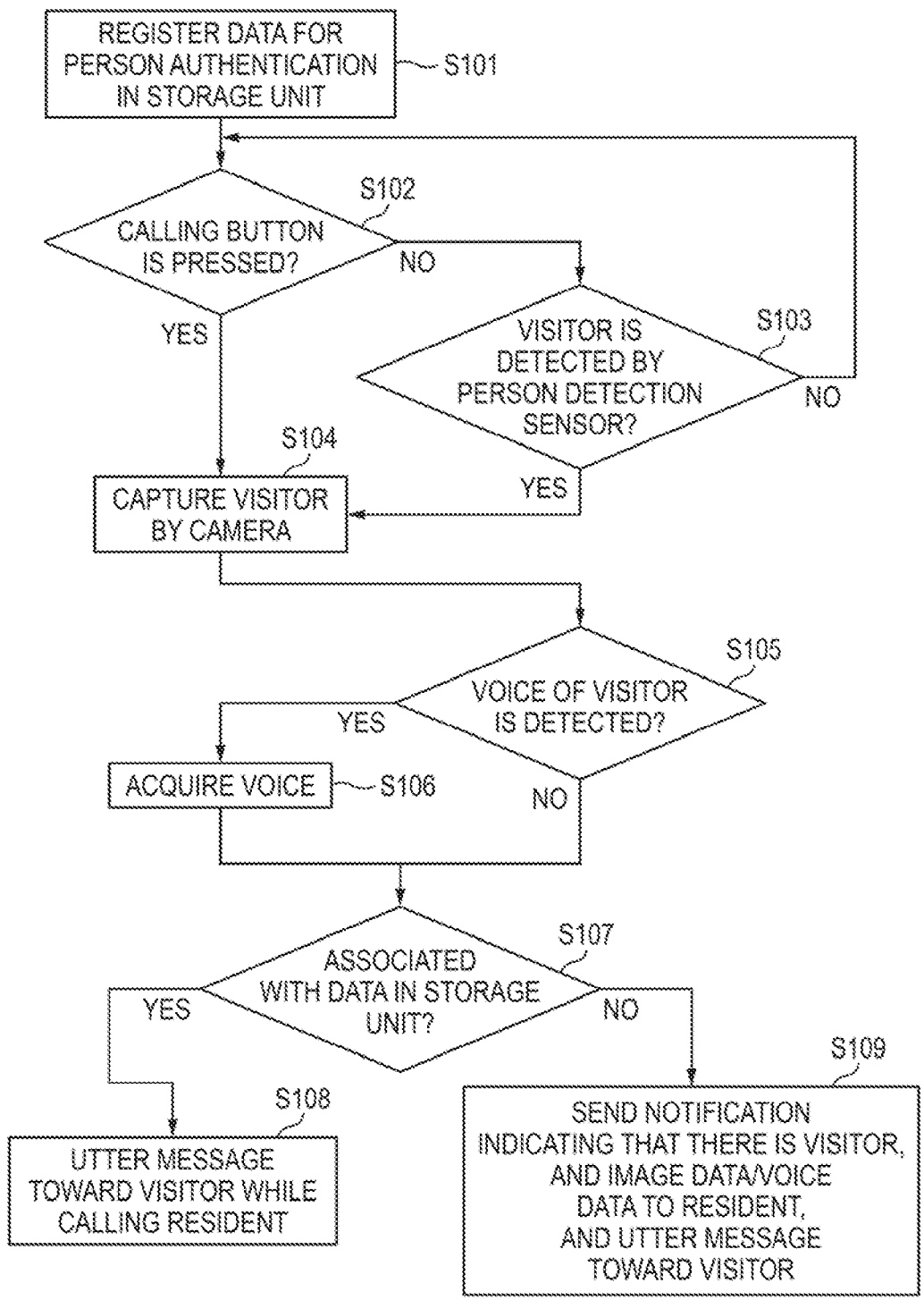
FIG. 10 is a flowchart depicting a flow after a visitor comes until a calling notification is issued to a terminal of a resident.

FIG. 10 is a flowchart depicting a flow after a visitor comes until a calling notification is issued to the terminal 4 of a resident. First, the resident records data (data for person comparison) useful for identifying a person, such as a name, a sex, an age, a height, a voice and a physical characteristic, in the storage unit 21 via the mobile communication terminal 4 and the network 5 (step S101). Specifically, the voice data saved in the mobile communication terminal 4 is transmitted to the doorbell 2 via the network 5. When the doorbell 2 receives the voice data, the control unit 7 saves the received voice data in the storage unit 21.

Then, in step S102, when a visitor presses the calling button (Yes in step S102), the camera 9 is activated to start capturing of the visitor (step S104).

Also, even though the visitor does not press the calling button (No in step S102), when the person detection sensor 14 detects the visitor (Yes in step S103), the camera 9 is activated to start capturing of the visitor (step S104). In the meantime, when the visitor does not press the calling button and the person detection sensor 14 does not detect the visitor (No in step S103), the processing returns to step S102.

When the camera 9 starts the capturing of the visitor, the control unit 7 determines whether the microphone 12 has detected a voice of the visitor (step S105). When the microphone 12 captures a voice such as a voice of the visitor around the doorbell 2 (Yes in step S105), the voice is sent to the voice recognition unit 17 and is acquired (step S106). Thereafter, the acquired data (in this case, the captured data and the voice data) and the data recorded in the storage unit 21 are compared (step S107). On the other hand, when a result of the determination in step S105 is No, the acquired data (in this case, the captured data) and the data recorded in the storage unit 21 are compared (step S107).

In the meantime, when the microphone 12 captures a voice such as a voice of the visitor (after steps 106), the voice recognition unit 17 recognizes the voice of the visitor. Then, the voice recognition unit 17 transmits a signal indicating that the voice of the visitor is detected, text data based on the voice, and the like to the artificial intelligence unit 22. The artificial intelligence unit 22 interprets a meaning of the voice uttered by the visitor from the received text data and the like. Then, the artificial intelligence unit 22 generates data for giving an appropriate reply to the visitor. For example, when the recognized voice is a voice "is there Mr. Abe?", the artificial intelligence unit 22 generates data for uttering a message "Please, wait for a minute". The speaker 13 utters the generated data toward the visitor, as a voice.

The artificial intelligence unit 22 compares the image data processed by the video processing unit 15 or the voice data recognized by the voice recognition unit 17 through the microphone 12, and the data recorded in the storage unit 21 (step S107). Specifically, primarily, the artificial intelligence unit 22 digitizes the degree of coincidence between the data acquired from the visitor and the data recorded in the storage unit 21. For example, when performing the digitization with respect to the image data, the image data processed by the video processing unit 15 and each image data recorded in the storage unit 21 are compared. As a method of the comparison, for example, there is a method of comparing whether a physical characteristic of a person captured in the image coincides. Also, for example, when performing the digitization with respect to the voice data, the voice data recognized by the voice recognition unit 17 and the voice data recorded in the storage unit 21 are compared. As a method of the comparison, there is a method of comparing whether a voiceprint, a habit of speaking or the like coincides, for example.

Figure 11A:
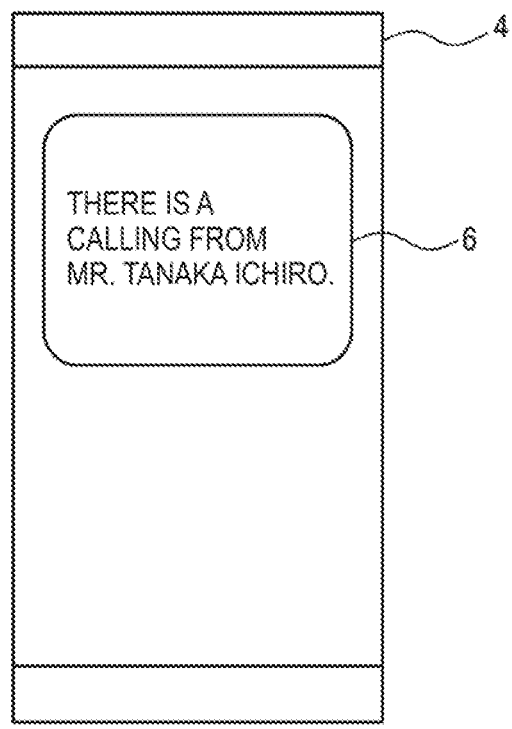
FIG. 11A depicts a display screen of a terminal of the resident having received the calling notification.

Secondly, the artificial intelligence unit 22 determines whether the calculated degree of coincidence is equal to or greater than a threshold value preset by the resident. When the calculated degree of coincidence is equal to or greater than the threshold value, the artificial intelligence unit 22 determines that the data stored in the storage unit 21 and the acquired image data or voice data are associated with each other (Yes in step S107). When a result of the determination in step S107 is Yes, a calling from the visitor is notified to the mobile communication terminal 4 of the resident via the network 5, as shown in FIG. 11A. Also, the artificial intelligence unit 22 generates data of a message "Calling is in progress", for example, and the speaker 13 utters the message toward the visitor, as a voice (step S108).

Figure 11B:
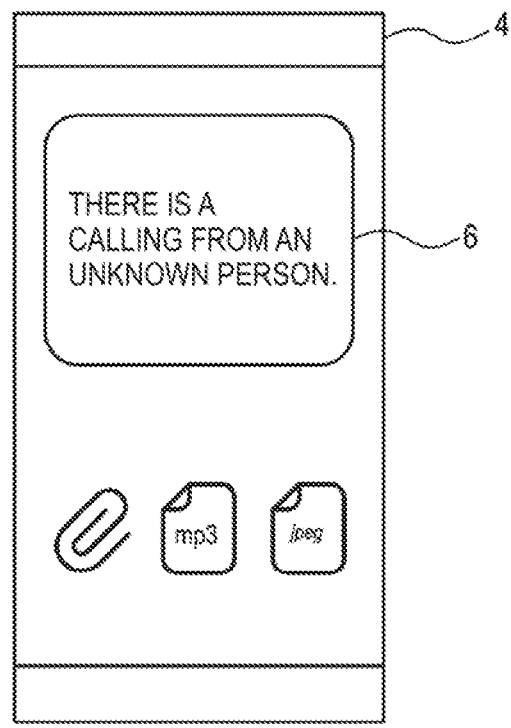
FIG. 11B depicts a display screen of the terminal of the resident having received a notification when an association is not made.

On the other hand, when a result of the determination in step S107 is No, a notification indicating that there is a calling and the image captured by the camera 9 and/or the voice data recognized by the voice recognition unit 17 are transmitted to the terminal 4 of the resident via the network 5, as shown in FIG. 11B. Also, the artificial intelligence unit 22 generates data of a message "In will not be called", for example, and the speaker 13 utters the message toward the visitor, as a voice (step S109). In the meantime, in S109, the artificial intelligence unit 22 may also be configured not to generate data of a message for a visitor.

According to the above configuration, the artificial intelligence unit 22 performs the comparison, based on the data registered in advance in the storage unit 21, and issues the calling notification to the terminal 4 of the resident only when the degree of coincidence is equal to or greater than the predetermined threshold value. For this reason, an unnecessary calling is not notified to the resident.

Like this, according to the above configuration, it is possible to provide the doorbell capable of limiting the unnecessary calling notification.

According to the above configuration, even though a visitor visits while a resident is absent, the doorbell 2 determines whether the visitor is a person to whom it should respond, and then responds appropriately to the visitor.

Like this, according to the above configuration, it is possible to provide the doorbell that can deal with the absence as appropriate.

Also, according to the above configuration, when the degree of coincidence is less than the predetermined threshold value as a result of the comparison of the image captured by the camera 9 or the voice of the visitor recognized by the voice recognition unit 17 with the data registered in the storage unit 21, the artificial intelligence unit 22 notifies the terminal 4 that the degree of coincidence is less than the predetermined threshold value together with the captured image of the visitor or the voice data of the visitor. For this reason, even though the calling notification is not issued, the resident can check the visitor and know that the visitor is a person who is likely not an acquaintance.

Like this, according to the above configuration, it is possible to provide the doorbell by which the resident can check all visitors while limiting the unnecessary calling notification.

The doorbell 2 can perform communication with the terminal 4 associated with the resident via the Wi-Fi router 20 and the network 5, and is configured to notify a calling to the terminal 4. For this reason, for example, even when the resident is in a remote place, the resident can check the calling notification.

In the meantime, the doorbell 2 of the present embodiment just determines whether the visitor is a person to whom it should respond. However, the present invention is not limited thereto. The doorbell 2 may further classify a visitor into attributes of the visitor such as a family, an acquaintance, a trader and the like, and change the responding method.

<Appropriate Calling Notification>

Figure 13:
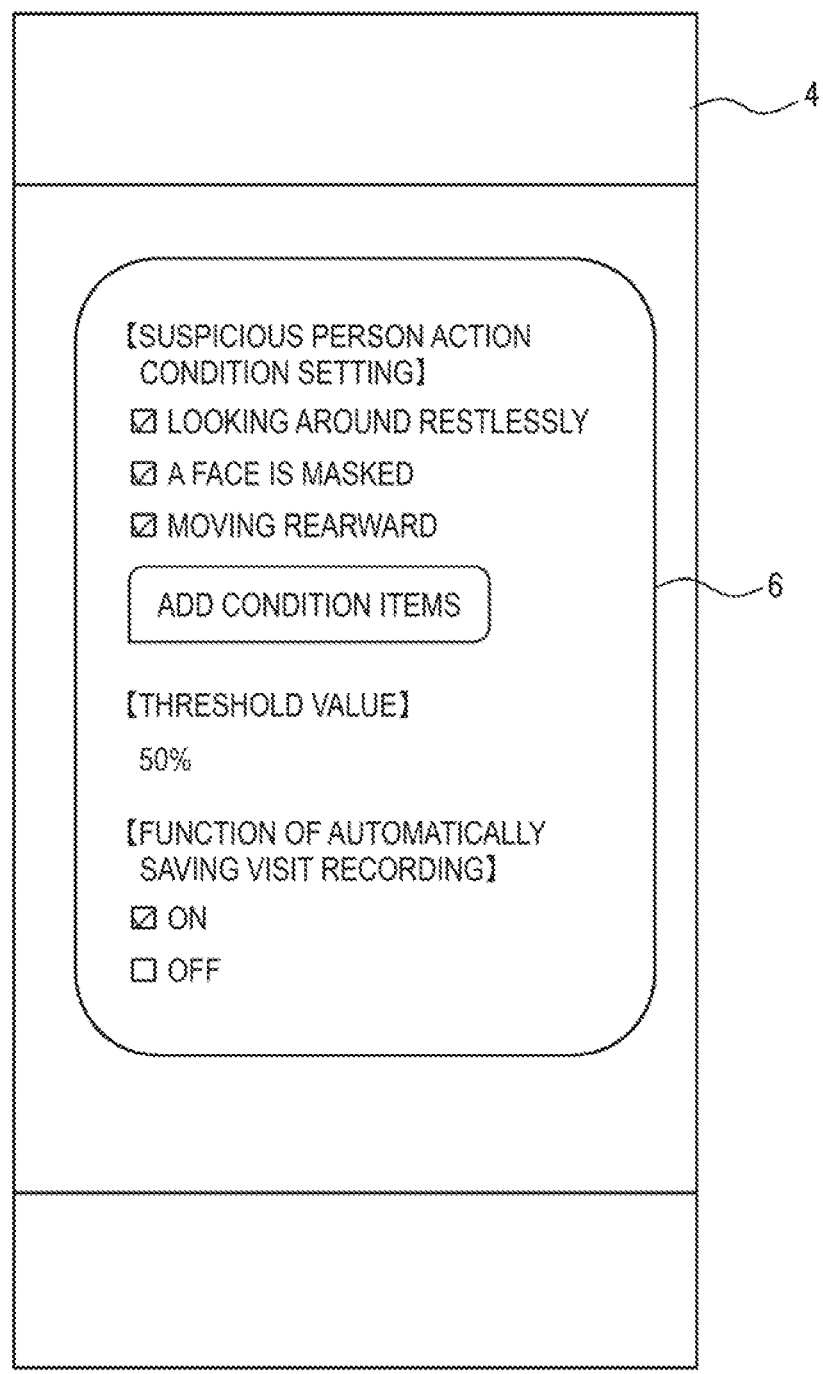
FIG. 13 depicts an aspect of setting conditions under which a calling to a resident is not performed.
Figure 14A:
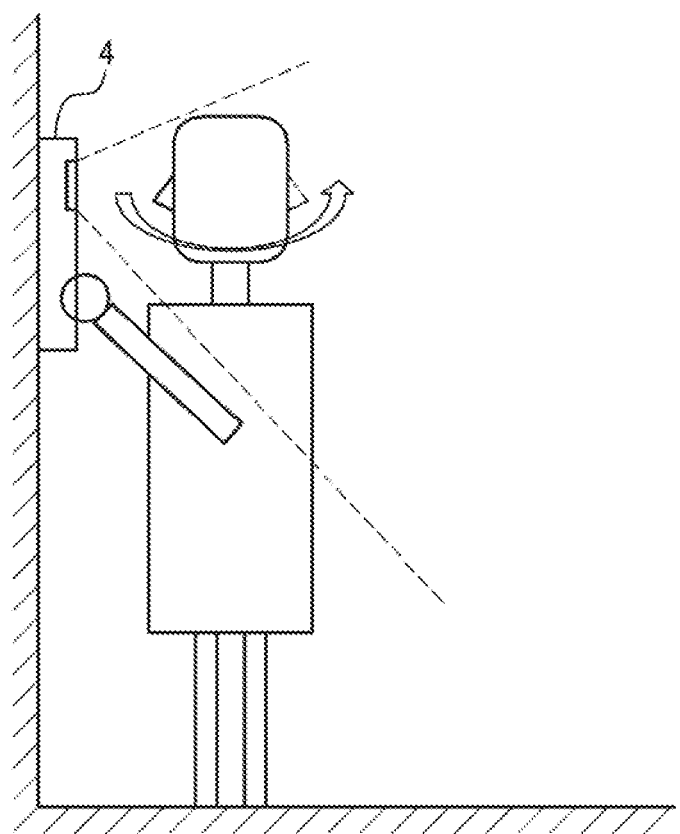
FIG. 14A depicts an aspect where a visitor presses a calling button.
Figure 14B:
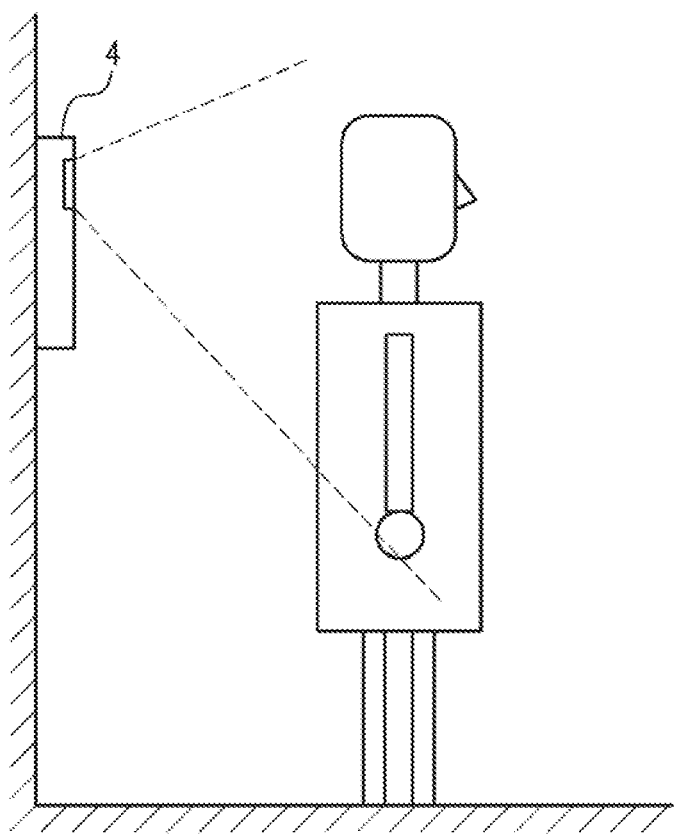
FIG. 14B depicts an aspect where the visitor moves rearward with respect to the doorbell after pressing the calling button.

A flow after a visitor comes until a resident is called is described with reference to FIGS. 12 to 14 (FIGS. 14A and 14B).

Figure 12:
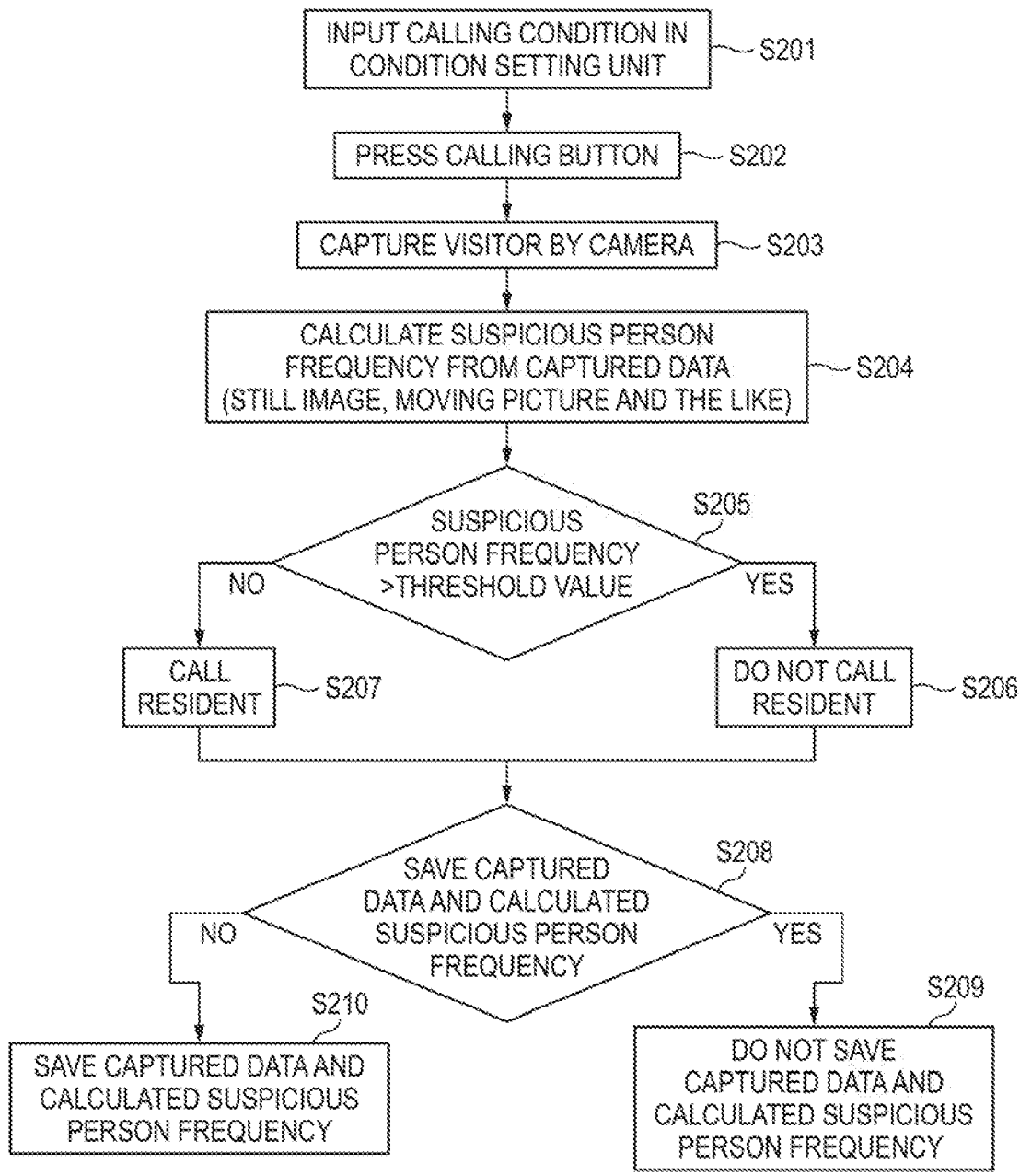
FIG. 12 is a flowchart depicting a flow until a resident is called, when the doorbell in accordance with one embodiment of the present invention is used.

FIG. 12 is a flowchart depicting a flow until a resident is called, when the doorbell 2 in accordance with one embodiment of the present invention is used. First, the resident inputs a calling condition in the terminal 4 (step S201). The calling condition of the present embodiment means a condition under which a calling is not notified to the resident. In the present embodiment, the resident sets a determination criterion as to whether a visitor is a suspicious person and a threshold value. As the determination criterion, generally, an action that a suspicious person tends to take is used. For example, an action that a visitor is looking around restlessly is a common action of a so-called burglar, and an action that a visitor moves rearward with respect to the doorbell 2 is a common action of a mischievous person, such as ping-pong dash. Therefore, it is considered to set the actions as the criterion. Also, the threshold value is any numerical value from 0% to 100%.

FIG. 13 depicts an aspect of setting conditions under which a calling to a resident is not performed. The resident sets the calling condition with the terminal 4. The resident downloads in advance a dedicated application into the terminal 4 and activates the dedicated application to display a setting screen of the determination criterion and the threshold value on the terminal 4. In the present embodiment, a list of actions that a suspicious person is likely to take is displayed on the terminal 4. When there is a condition that the resident intends to set, the resident checks a box disposed on the left side of a setting condition candidate. Thereby, the calling condition is set. In the meantime, the setting condition candidate can be appropriately added. Also, in the present embodiment, the example where the calling condition is set in a checkbox form has been described. However, the present invention is not limited thereto. For example, it is also considered to freely describe the calling condition. Also, the threshold value is set by inputting a numerical value from 0% to 100% into a predetermined place. In the present embodiment, 50% is set as the threshold value.

The determination criterion and the threshold value are transferred to the condition storage unit 23 via the network 5. When the determination criterion and the threshold value are transferred to the condition storage unit 23, the doorbell 2 is in a standby state.

When a visitor presses the calling button (step S202), the camera 9 is activated to start capturing of the visitor (step S203).

When the capturing of the visitor by the camera 9 starts, the captured image is transmitted to the video processing unit 15. The video processing unit 15 analyzes the image captured by the camera 9 by using analysis software. When analyzing the image, in step S201, the analysis is performed in accordance with the determination criterion preset by the resident.

FIGS. 14A and 14B depict aspects when the visitor presses the calling button. As shown in FIGS. 14A and 141, when the calling button is pressed, the camera 9 starts to capture a whole body or a part of the visitor. Then, the camera 9 continuously captures the visitor. Images of the visitor continuously captured by the camera 9 are transmitted to the video processing unit 15, in which the images are analyzed.

The determination unit 24 calculates a suspicious person frequency, based on a result of the analysis performed by the video processing unit 15 (step S204). In the present operation example, the suspicious person frequency is calculated by a method of calculating a percentage of the number of matching determination criteria to the set determination criteria.

The calculation is specifically described using FIGS. 14A and 14B. FIG. 14A depicts an aspect when a visitor is looking around restlessly after pressing a calling button. Also, FIG. 14B depicts an aspect where the visitor moves rearward with respect to the doorbell 2 after pressing the calling button. As shown in FIGS. 14A and 14B, after pressing the calling button, the visitor moves rearward with respect to the doorbell 2 and is looking around restlessly. In the present embodiment, as the setting of the suspicious person action condition, "looking around restlessly", "a face is masked" and "moving rearward" are selected. The visitor shown in FIGS. 14A and 148 is looking around restlessly and moves rearward with respect to the doorbell 2. Therefore, the determination unit 24 calculates a suspicious person frequency 67% (decimal point advance).

When the suspicious person frequency is calculated, it is compared with the threshold value (step S205).

In step S205, the calculated suspicious person frequency and the threshold value preset by the resident in step S201 are compared. When the suspicious person frequency is above the threshold value, the determination unit 24 determines that the visitor is a suspicious person. Therefore, the calling notification unit 25 does not notify the resident of a calling from the visitor (step S206). On the other hand, when the suspicious person frequency is equal to or less than the threshold value, the calling notification unit 25 notifies the resident of a calling from the visitor (step S207).

In the present embodiment, since the suspicious person frequency is 67% it is above the threshold value (50%). Therefore, since the determination unit 24 determines that the visitor of the present embodiment is a suspicious person, the calling notification unit 25 does not issue a notification to the resident, as described above.

Thereafter, it is determined whether or not to save the image captured by the camera 9 and the suspicious person frequency calculated by the determination unit 24 in the saving unit 26 (step S208). A setting as to whether or not to save the captured image and the suspicious person frequency in the saving unit 26 may be performed by checking a box disposed below the setting screen displayed on the terminal 4, as shown in FIG. 13. When there is a setting of saving the captured image and the suspicious person frequency in the saving unit 26, the captured image and the suspicious person frequency are saved in the saving unit 26.

When the captured image and the suspicious person frequency are saved in the saving unit 26, even though the visitor comes next time, the determination unit 24 compares the analysis result by the video processing unit 15 and the captured image and suspicious person frequency saved in the saving unit 26, and determines whether or not to call a resident by using a result of the comparison as well (step S209).

On the other hand, when there is no setting of saving the captured image and the suspicious person frequency in the saving unit 26, the determination unit 24 just compares the calculated suspicious person frequency and the threshold value stored in the condition storage unit 23.

In the meantime, the user can preset whether or not to save the image captured by the camera 9 and the suspicious person frequency calculated by the determination unit 24 in the saving unit 26. Also, the setting can be changed appropriately.

In the related art, the resident receives a calling notification each time the calling button of the doorbell 2 is pressed. However, since there are a calling generated due to an erroneous pressing on the calling button and a calling generated due to a mischievous play such as ping-pong dash, it is troublesome to notify all callings to the resident.

According to the above configuration, since a calling from a visitor who is likely a suspicious person is not notified to the resident, it is possible to reduce the number of unnecessary calling notifications.

Like this, according to the above configuration, it is possible to provide the doorbell 2 capable of reducing the unnecessary calling notification.

Also, according to the above configuration, the video processing unit 15 analyzes whether a visitor is a suspicious person, based on the information sent from the terminal 4 of the resident. For this reason, the resident can cause the video processing unit 15 to analyze whether a visitor is a suspicious person, based on a setting according to the resident's intention.

Like this, according to the above configuration, it is possible to provide the doorbell 2 by which it is not necessary to respond to the calling beyond necessity.

The doorbell 2 can perform communication with the terminal 4 associated with the resident via the network 5, and is configured to notify a calling to the terminal 4. For this reason, for example, even when the resident is in a remote plate, the resident can check the calling notification.

<Configuration Example of Doorbell with No Calling Button>

Figure 15:
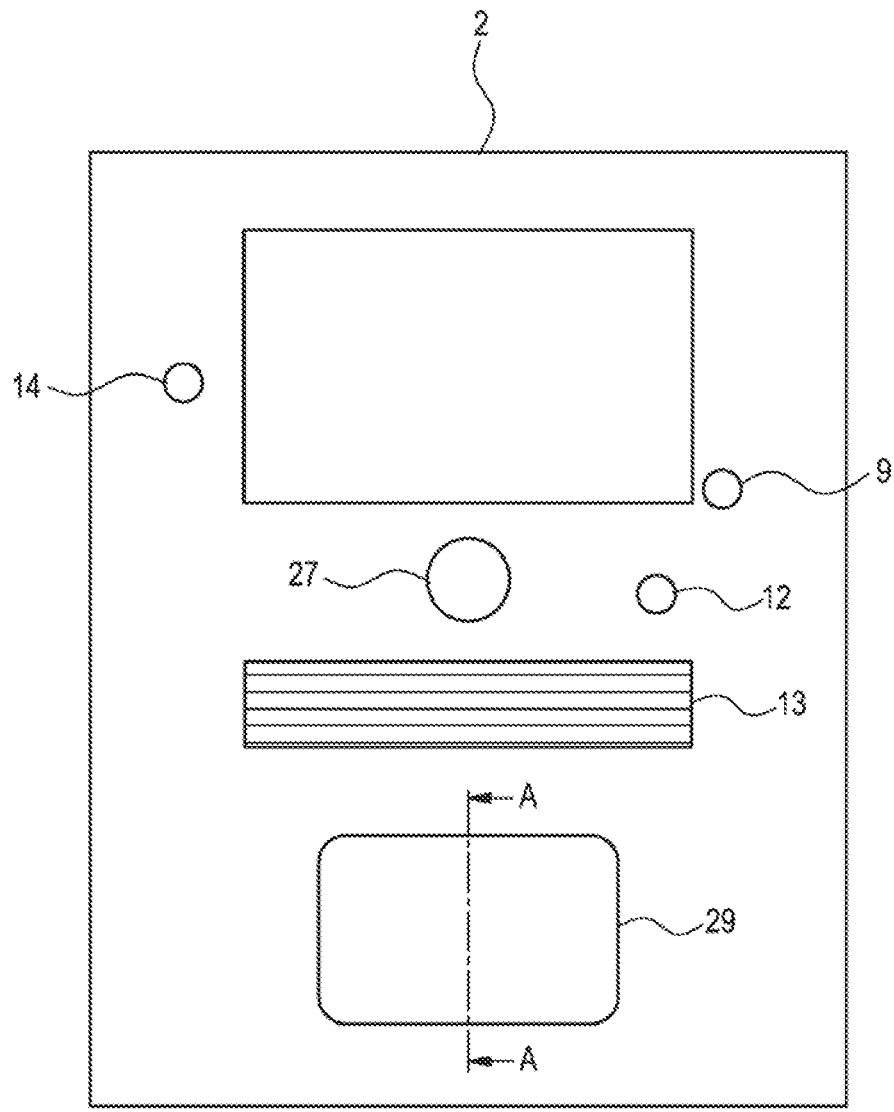
FIG. 15 is a front view of a doorbell in accordance with one embodiment of the present invention.

FIG. 15 is a front view of the doorbell 2 in accordance with the present embodiment. As shown in FIG. 15, the camera 9, the person detection sensor 14, the motion sensor 27, the microphone 12, the speaker 13, and the contact recognition unit 29 are disposed on an outer front surface of the doorbell 2. The camera 9 is disposed at a central upper part of the doorbell 2. The person detection sensor 14 is disposed on a left upper side of the doorbell 2. The motion sensor 27 is disposed at a substantial center of the doorbell 2. The microphone 12 is disposed below the camera 9. The speaker 13 is disposed below the motion sensor 27. The contact recognition unit 29 is disposed below the speaker 13 and at a lower central part of the doorbell 2.

Figure 16:
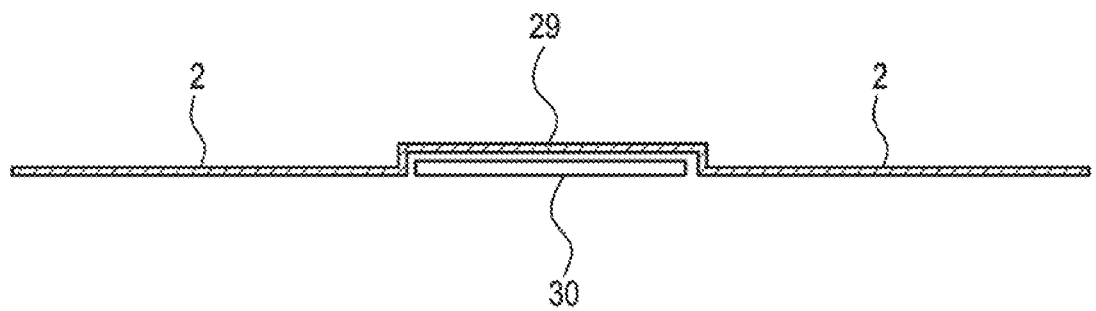
FIG. 16 depicts a vicinity of a contact recognition unit when seeing the doorbell in accordance with one embodiment of the present invention in a direction of an arrow A.

FIG. 16 is a sectional view taken along a line A-A of the contact recognition unit 29 shown in FIG. 15. As shown in FIG. 16, the contact recognition unit 29 is provided on a surface of the doorbell 2 and has a flat protrusion shape. A surface of the contact recognition unit 29 is continuous to the surface of the doorbell 2 around the contact recognition unit 29. The contact recognition unit 29 has therein a sensor 30. The sensor 30 is configured to detect a pressure load to the contact recognition unit 29. The surface of the contact recognition unit 29 is formed of an elastic resin sheet or the like, for example. In the meantime, in the example of FIG. 16, the contact recognition unit 29 has a protrusion shape but is not limited thereto. For example, the contact recognition unit may have a planar shape.

The contact recognition unit 29 is provided at a place of a doorbell of the related at which a calling button is disposed. In the related art, the calling button is provided to be movable in a pressing direction when pressed. For this reason, there is a gap around the calling button. On the other hand, since the contact recognition unit 29 does not move in a pressing direction, a gap is not formed around the contact recognition unit 29.

When the visitor knocks at an upper surface of the contact recognition unit 29, the sensor 30 detects that the contact recognition unit 29 is pressed. The sensor 30 detects the pressing on the contact recognition unit 29, so that the contact recognition unit 29 recognizes the knock of the visitor, and transmits a detection signal to the calling notification unit 28 or the control unit 7.

Fifth Operation Example (Operation Example of Calling Notification to Resident)

Figure 17:
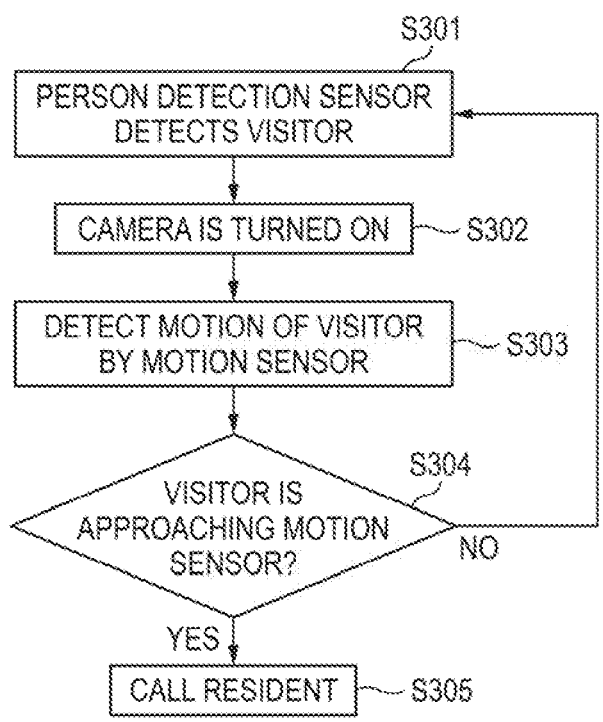
FIG. 17 is a flowchart depicting a flow after a person detection sensor of a fifth embodiment detects a visitor until a resident is called.

In a fifth operation example, a flow after the person detection sensor 14 detects a visitor until a resident is called is described with reference to FIG. 17. When a visitor comes to see a resident, the visitor approaches the person detection sensor 14 of the doorbell 2 disposed on an entrance, a door or the like of a residence. When the visitor approaches the person detection sensor 14 up to a predetermined distance, the person detection sensor 14 detects the visitor (step S301).

When the person detection sensor 14 detects the visitor, the person detection sensor 14 notifies the control unit 7 that the visitor is approaching the doorbell 2. When it is notified to the control unit 7 that the visitor is approaching the doorbell 2, the control unit 7 transmits a control signal for starting capturing to the camera 9. The camera 9 starts capturing of a surrounding including the front of the doorbell 2 and the visitor (step S302).

Also, when it is notified to the control unit 7 from the person detection sensor 14 that the visitor is approaching the doorbell 2, the control unit 7 transmits a control signal for starting motion detection of the visitor to the motion sensor 27. The motion sensor 27 continuously detects the motion of the visitor (step S303).

When the motion sensor 27 detects the motion of the visitor, the motion sensor 27 outputs a detection signal as a result of the detection to the determination unit 24. The determination unit 24 determines whether the visitor is approaching the motion sensor 27, based on the detection signal (step S304). For example, as compared to when the motion of the visitor starts to be detected by the motion sensor 27, when a distance detected thereafter between the visitor and the motion sensor 27 becomes shorter, it means that the visitor is approaching the motion sensor 27. Then, the determination unit 24 determines that the visitor is approaching the motion sensor 27 (Yes in step S304).

On the other hand, as compared to when the motion of the visitor starts to be detected by the motion sensor 27, when a distance detected thereafter between the visitor and the motion sensor 27 is not reduced, the processing proceeds to step S301 (No in step S304).

When the determination unit 24 determines that the visitor is approaching the motion sensor 27 (Yes in step S304), the determination unit 24 transfers a result of the determination to the control unit 7. When the determination result indicating that the visitor is approaching the motion sensor 27 is transferred to the control unit 7, the control unit 7 transmits a control signal for calling a resident to the calling notification unit 25. The calling notification unit 25 notifies the terminal 4 of the resident of a calling from the visitor (step S305).

In the meantime, in the related art, a calling to a resident is performed by pressing the calling button. For this reason, it is necessary to provide the doorbell 2 with the calling button. The calling button is provided so as to be movable in a pressing direction when pressed. Therefore, a gap is formed around the calling button between the calling button and a case of the doorbell 2. For this reason, rainwater and the like may enter the doorbell 2 through the gap, thereby damaging the doorbell 2.

According to the above configuration, the resident can be called simply when the visitor is approaching the motion sensor 27, not the pressing on the calling button. For this reason, it is possible to notify a calling to the terminal 4 of the resident, even though the calling button is not provided.

Like this, according to the above configuration, it is possible to provide the doorbell 2 capable of extending a service life in an outside environment.

Sixth Operation Example (Operation Example of Calling Notification to Resident)

Figure 18:
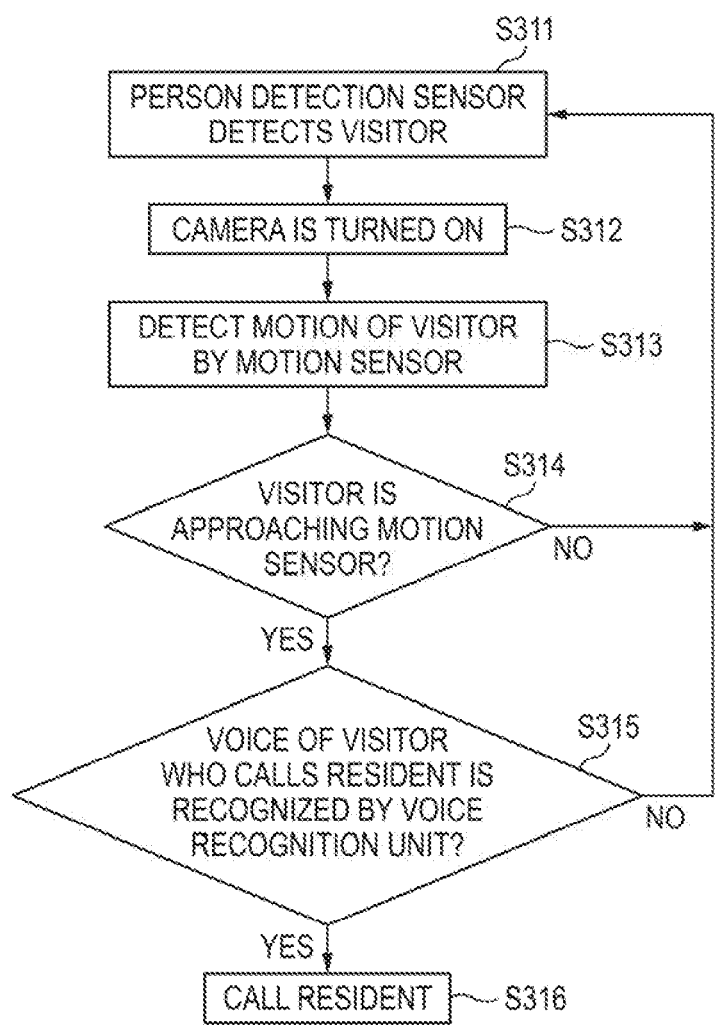
FIG. 18 is a flowchart depicting a flow after a person detection sensor of a sixth embodiment detects a visitor until a resident is called.

In a sixth operation example, a flow after the person detection sensor 14 detects a visitor until a resident is called is described with reference to FIG. 18. The flowchart shown in FIG. 18 is different from the fifth operation example, in that not only the determination unit 24 determines that the visitor is approaching the motion sensor 27, but also the voice recognition unit 17 recognizes a voice for calling a resident, for example, a voice "Excuse me, is there Mr. Abe?" through the microphone 12 to perform a calling notification to the terminal 4 of the resident.

Since the processing that is executed from step S311 to S314 is similar to step S301 to S304 of the fifth operation example, the descriptions thereof are omitted.

When the determination unit 24 determines that the visitor is approaching the motion sensor 27 (Yes in step S314), the determination unit 24 transfers a result of the determination to the control unit 7. When the determination result indicating that the visitor is approaching the motion sensor 27 is transferred to the control unit 7, the control unit 7 controls the microphone 12 to capture a voice for calling a resident that is uttered by the visitor.

In step S315, the microphone 12 captures a voice that is uttered in the vicinity of the microphone 12 by the visitor, and transfers the same to the voice recognition unit 17. When the voice recognition unit 17 recognizes that the voice is a voice for calling a resident (Yes in step S315), the calling notification unit 25 notifies the terminal 4 of the resident of a calling from the visitor (step S316). On the other hand, when the microphone 12 does not capture a voice for calling a resident or when the voice recognition unit 17 recognizes that the voice captured by the microphone 12 is not a voice for calling a resident (No in step S315), the processing proceeds to step S311.

According to the above configuration, the visitor can call the user simply by uttering a voice for calling the resident toward the doorbell 2. For this reason, it is possible to call the resident, even though a calling button is not provided.

Like this, according to the above configuration, it is possible to provide the doorbell 2 capable of extending the service life in the outside environment.

Seventh Operation Example (Operation Example of Calling Notification to Resident)

Figure 19:
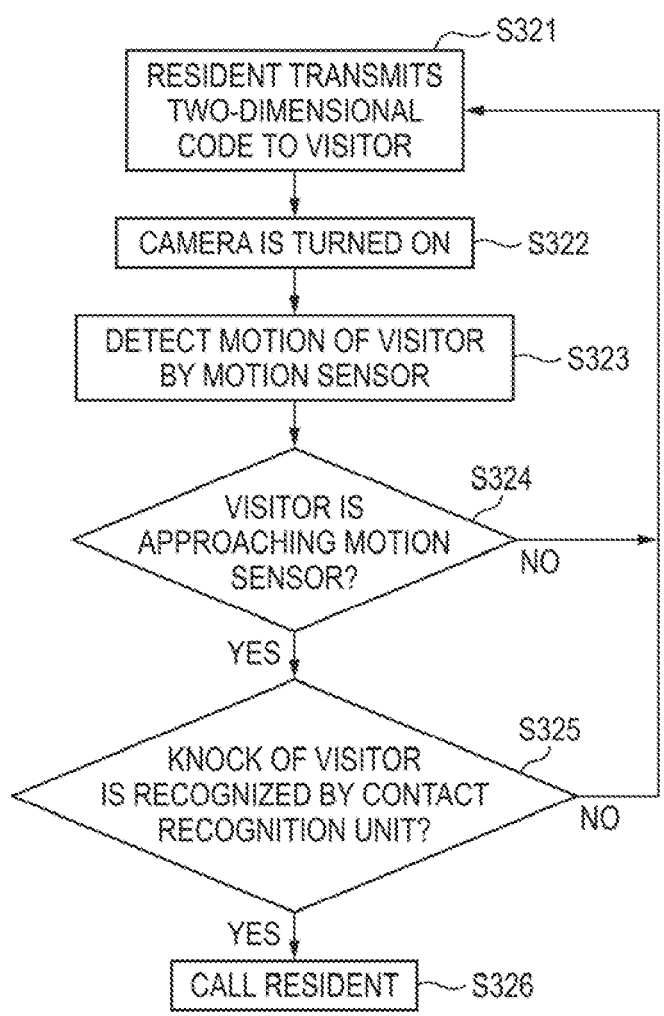
FIG. 19 is a flowchart depicting a flow after a person detection sensor of a seventh embodiment detects a visitor until a resident is called.

In a seventh operation example, a flow after the person detection sensor 14 detects a visitor until a resident is called is described with reference to FIG. 19. The flowchart shown in FIG. 19 is different from the fifth operation example, in that not only the determination unit 24 determines that the visitor is approaching the motion sensor 27, but also the contact recognition unit 29 recognizes a knock of the visitor to perform a calling notification to the terminal 4 of the resident.

Since the processing that is executed from step S321 to S324 is similar to step S301 to S304 of the fifth operation example, the descriptions thereof are omitted.

When the determination unit 24 determines that the visitor is approaching the motion sensor 27 (Yes in step S324) and the visitor knocks at the contact recognition unit 29, the sensor 30 detects that the contact recognition unit 29 is pressed. The sensor 30 detects the pressing on the contact recognition unit 29, so that the contact recognition unit 29 recognizes that the visitor has knocked (Yes in step S325). On the other hand, when the sensor 30 does not detect that the contact recognition unit 29 is pressed (No in step S325), the processing proceeds to step S321.

When the contact recognition unit 29 recognizes the knock for calling a resident (Yes in step S325), the contact recognition unit 29 transmits a detection signal to the calling notification unit 28 or the control unit 7. The calling notification unit 25 receives the detection signal, thereby notifying the terminal 4 of the resident of a calling from the visitor (step S326).

According to the above configuration, the visitor can call the resident simply by knocking at the contact recognition unit 29 so as to call the resident. For this reason, it is possible to call the resident, even though a calling button is not provided.

Like this, according to the above configuration, it is possible to provide the doorbell 2 capable of extending the service life in the outside environment.

Eighth Operation Example (Operation Example of Calling Notification to Resident)

Figure 20:
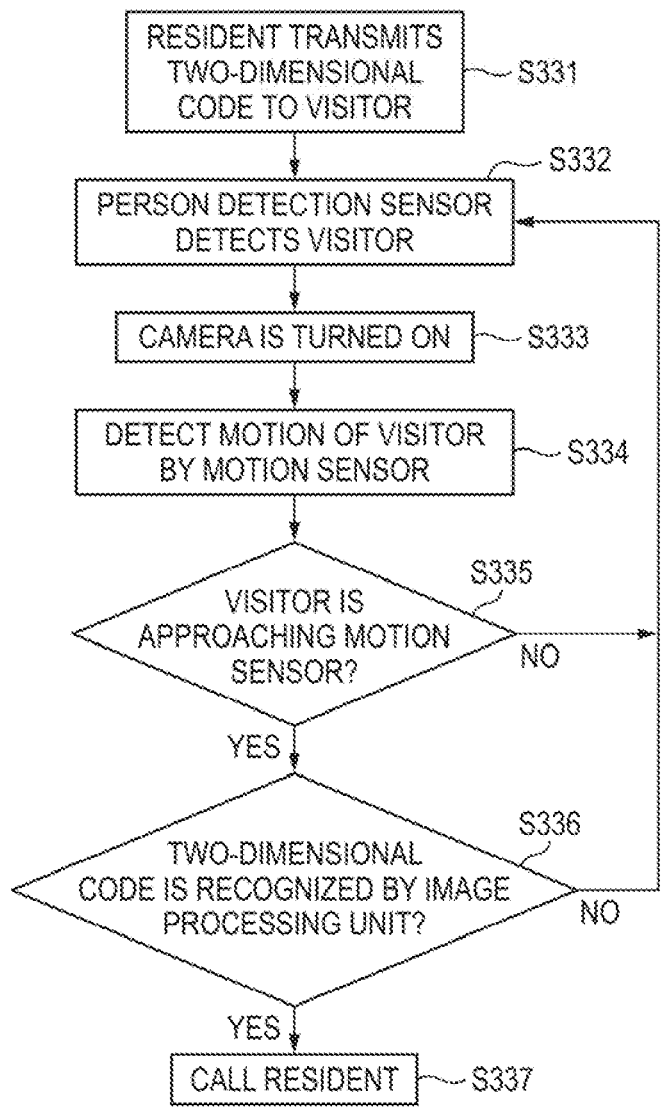
FIG. 20 is a flowchart depicting a flow after a person detection sensor of an eighth embodiment detects a visitor until a resident is called.

In an eighth operation example, a flow after the person detection sensor 14 detects a visitor until a resident is called is described with reference to FIG. 20. The flowchart shown in FIG. 20 is different from the fifth operation example, in that not only the determination unit 24 determines that the visitor is approaching the motion sensor 27, but also the video processing unit 15 recognizes a two-dimensional code sent in advance to visitor from the resident and captured by the camera 9 to perform a calling notification to the terminal 4 of the resident.

In the eighth operation example, the resident sends a two-dimensional code for calling notification generated by the application to an anticipated visitor in advance by an e-mail (step S331), for example. The anticipated visitor goes to the residence with carrying a communication terminal capable of displaying the two-dimensional code sent from the resident or a printed material on which the two-dimensional code is indicated.

Since the processing that is executed from step S332 to S335 is similar to step S301 to S304 of the fifth operation example, the descriptions thereof are omitted.

When the determination unit 24 determines that the visitor is approaching the motion sensor 27 (Yes in step S335), the control unit 7 controls the camera 9 to be in a state where it can capture a two-dimensional code. Then, when the camera 9 captures the two-dimensional code and the video processing unit 15 recognizes the two-dimensional code (Yes in step S336), the video processing unit 15 transmits the information embedded in the two-dimensional code from the two-dimensional code to the control unit 7. On the other hand, when the two-dimensional code is not captured by the camera 9 (No in step S336), the processing proceeds to step S332.

When the video processing unit 15 recognizes the two-dimensional code, the video processing unit 15 transmits the information embedded in the two-dimensional code from the two-dimensional code to the control unit 7. The control unit 7 transmits a signal for notifying a calling from the visitor to the calling notification unit 25, based on the information embedded in the two-dimensional code. The calling notification unit 25 notifies the terminal 4 of the resident of a calling from the visitor, based on the signal for notifying a calling from the visitor transmitted from the control unit (step S337).

According to the above configuration, the visitor can call the resident by causing the camera 9 capable of capturing the two-dimensional code to capture the two-dimensional code. For this reason, it is possible to call the resident, even though a calling button is not provided.

Like this, according to the above configuration, it is possible to provide the doorbell 2 capable of extending the service life in the outside environment.

The doorbell 2 can perform communication with the terminal 4 associated with the resident via the Wi-Fi router 20 and the network 5, and is configured to notify a calling to the terminal 4. For this reason, for example, even when the resident is in a remote place, the resident can check the calling notification.

<Doorbell Having Stereo Camera>

A doorbell system in accordance with an example of the present embodiment is described with reference to the drawings.

Figure 21:
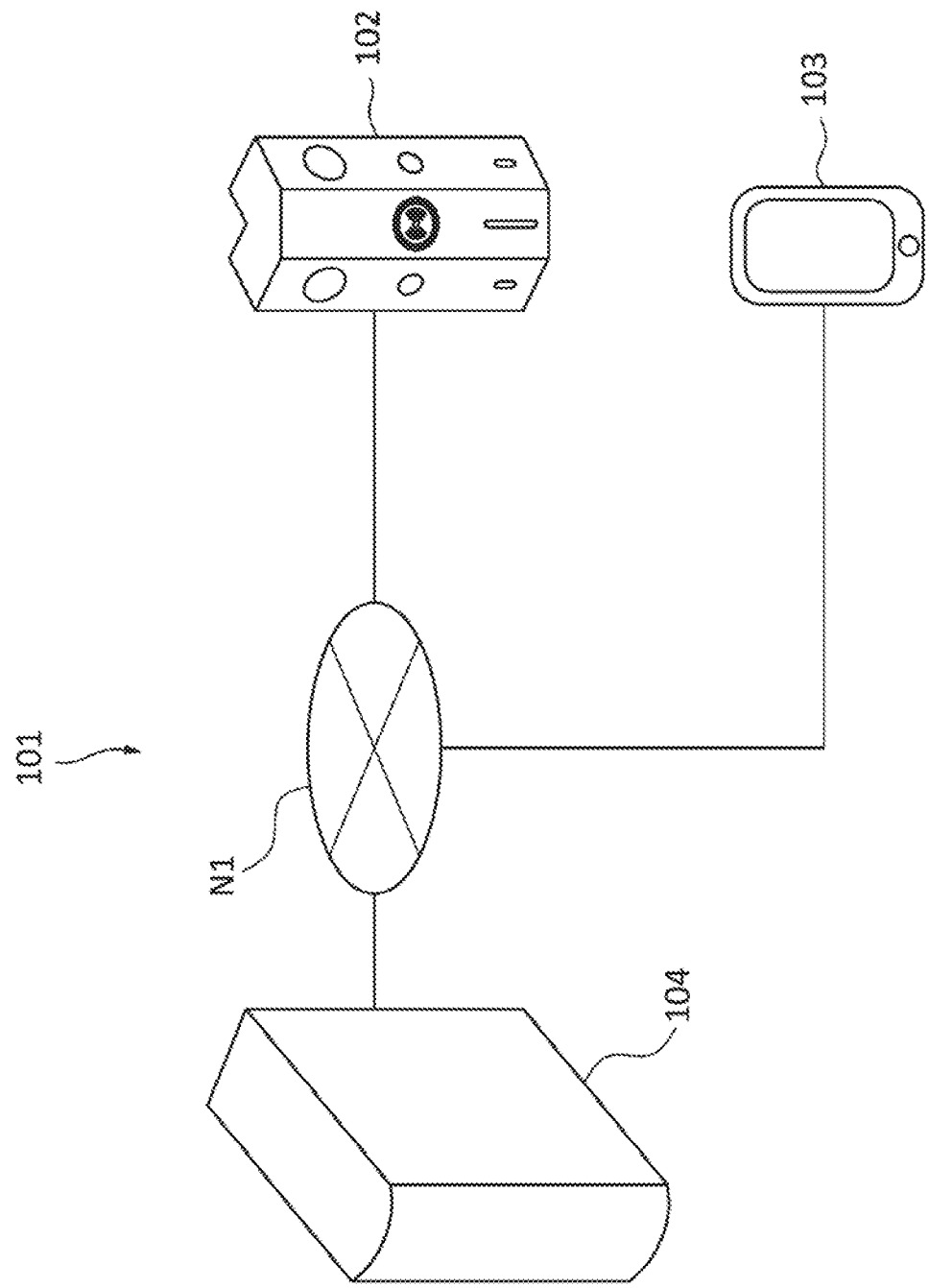
FIG. 21 depicts a configuration of a doorbell system in accordance with one embodiment of the present invention.

FIG. 21 depicts a configuration of a doorbell system of the present embodiment.

As shown in FIG. 21, the doorbell system 101 includes a doorbell 102, an information terminal 103 (an example of an external device), and a server 104. The doorbell 102 and the information terminal 103 can perform communication with the server 104 on an external network via a network N1. As a communication device configured to relay the doorbell 102 and information terminal 103 and the network N1, for example, a Wi-Fi router may be used.

Figure 22:
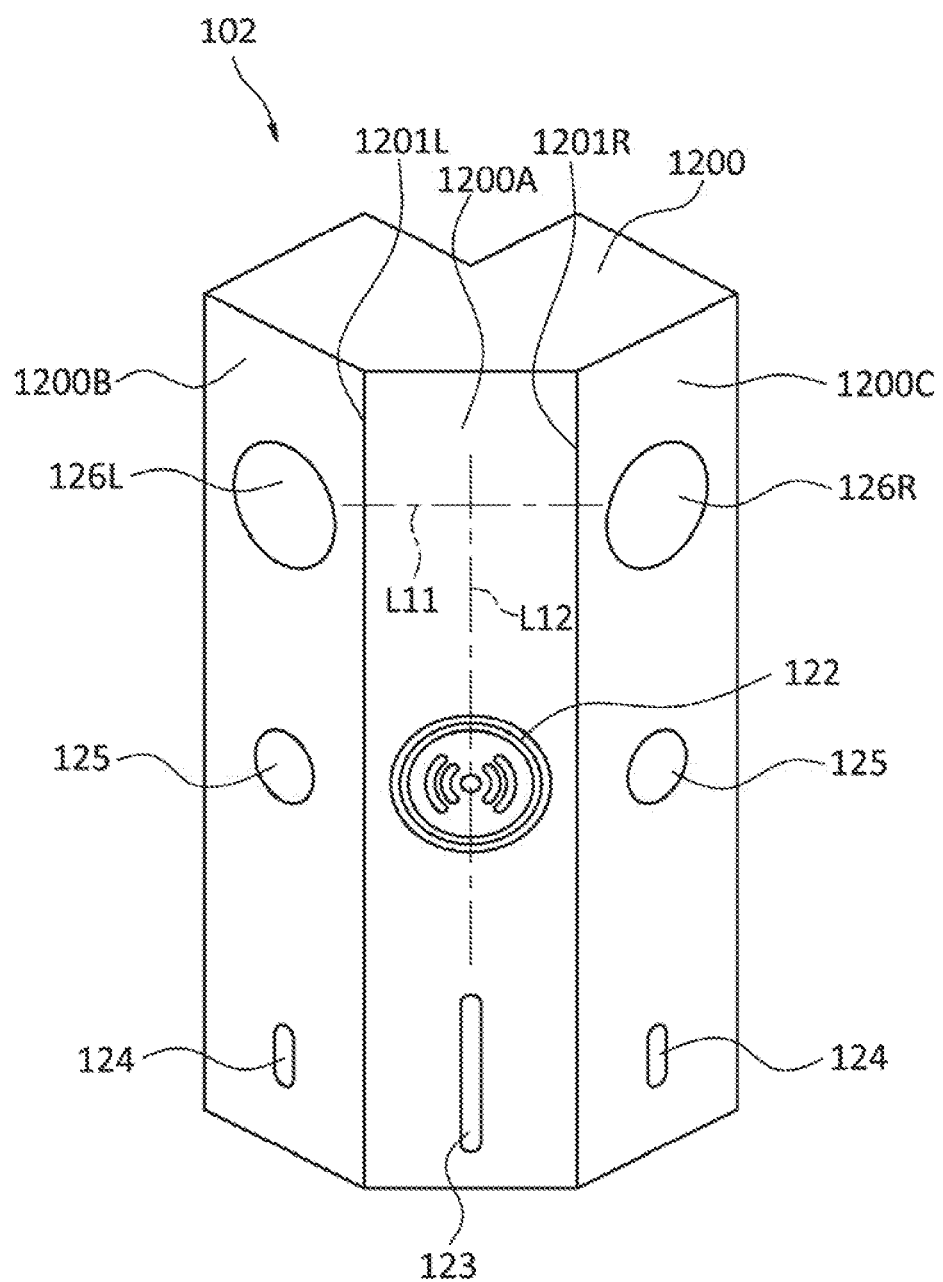
FIG. 22 depicts a configuration of a doorbell of the doorbell system shown in FIG. 21.
Figure 23:
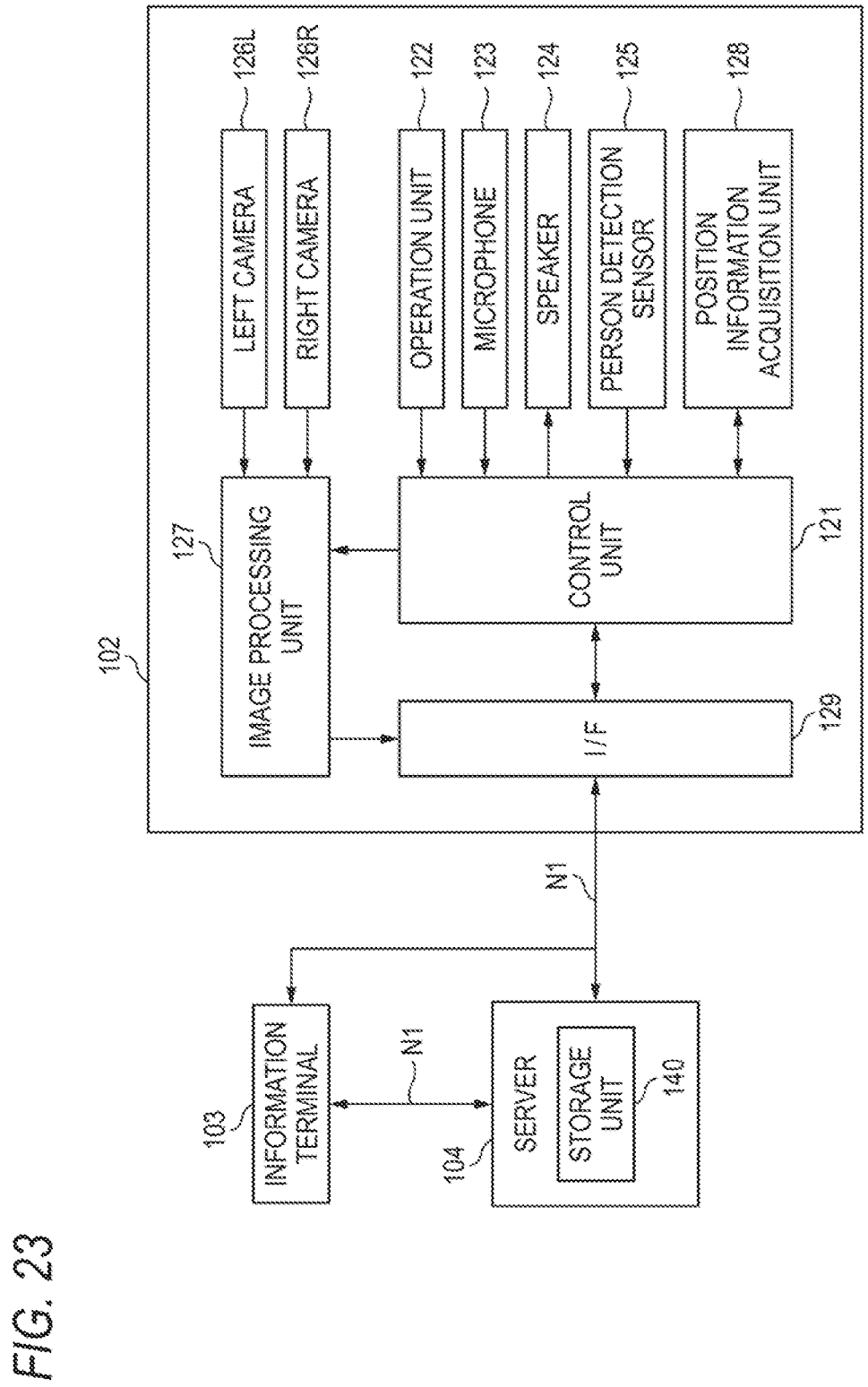
FIG. 23 is a functional block diagram of the doorbell shown in FIG. 22.

FIG. 22 depicts a configuration of the doorbell 102, and FIG. 23 is a functional block diagram of the doorbell 102.

The doorbell 102 is used so as for a visitor to call a resident for phone call, and is installed in an entrance of a building (a detached house), for example. The doorbell 102 is electrically connected to a power system of the building, to which the doorbell is attached, by a predetermined wire, so that power is supplied thereto from the power system. In the meantime, the doorbell 102 may include a battery for backup and/or primary power.

As shown in FIGS. 22 and 23, the doorbell 102 includes a control unit 121, an operation unit (calling button) 122, a microphone 123, a speaker 124, a person detection sensor 125, a left camera 126L (an example of a first camera), a right camera 126R (an example of a second camera), an image processing unit 127, a position information acquisition unit 128, and an interface circuit (hereinbelow, the interface circuit is referred to as "I/F") 129.

The control unit 121 is a control unit for controlling operations of each unit of the doorbell 102, and may include at least one microcontroller including one or more processors and one or more memories, and other electronic circuit including an active element such as a transistor and a passive element. The processor is, for example, a CPU (Central Processing Unit), an MPU (Micro Processing Unit), a GPU (Graphics Processing Unit) and/or a TPU (Tensor Processing Unit). The CPU may include a plurality of CPU cores. The GPU may include a plurality of GPU cores. The memory includes a ROM (Read Only Memory) and a RAM (Random Access Memory). In the ROM, a doorbell control program may be stored. In the RAM, the doorbell control program may be temporarily stored. The processor may be configured to develop a program designated from the doorbell control program stored in a storage device or the ROM onto the RAM, and to execute a variety of processing in cooperation with the RAM.

Also, the control unit 121 may be configured by an integrated circuit (hardware resource) such as an ASIC (Application Specific Integrated Circuit), FPGA (Field-Programmable Gate Array) and the like. Also, the control unit 121 may be configured by a combination of at least one microcontroller and an integrated circuit.

The operation unit 122 is configured to receive a variety of input operations of a visitor. The diverse input operations include a calling to a resident, for example. The microphone 123 and the speaker 124 configure a phone call unit for transmitting voice data of a message and the like of a visitor toward a resident (in the present example, an information terminal 103 of a resident in a building in which the doorbell 102 is installed) and outputting voice data of a message and the like of a resident toward a visitor.

The person detection sensor 125 is a sensor for detecting a person in front of the doorbell 102, and is configured by an infrared sensor, for example. The person detection sensor 125 is connected to each of the left camera 126L and the right camera 126R via the control unit 121. The person detection sensor 125 is configured to output a detection signal for notifying detection of a person to each of the left camera 126L and the right camera 126R via the control unit 121. The left camera 126L and the right camera 126R are capturing devices for capturing a person such as a visitor. The left camera 126L and the right camera 126R may be configured by a video camera that is a web camera, respectively. In the meantime, the specific configurations of the left camera 126L and the right camera 126R will be described later. For example, the left camera 126L and the right camera 126R are respectively activated by the detection signal that is output from the person detection sensor 125. Images captured by the left camera 126L and the right camera 126R are output to the image processing unit 127. The image processing unit 127 is configured by a processor and a memory, for example, and is configured to synthesize the image captured by the left camera 126L and the image captured by the right camera 126R, based on a control signal of the control unit 121. The image processing unit 127 is configured to transmit synthesized image data to the information terminal 103 (or the server 104) via the I/F 129, based on a control signal of the control unit 121.

The position information acquisition unit 128 is configured to acquire position information of the doorbell 102. The position information is acquired using a GPS (Global Positioning System), for example. In the meantime, upon initial setting at the time the doorbell 102 is installed in a building, the position information of the doorbell 102 may be registered in advance in the position information acquisition unit 128 by a resident. The control unit 121 is configured to transmit the position information acquired by the position information acquisition unit 128 to the server 104. In the meantime, when the position information of the doorbell 102 is updated, the control unit 121 can transmit the updated position information to the server 104.

The I/F 129 can perform communication with the server 104 via the network N1. Specifically, the I/F 129 can perform communication with the server 104 by a network communication means such as wireless local area network (LAN), radio, cellular, the Internet, Bluetooth (registered trademark), electromagnetic wave, infrared light, sonic wave, microwave and the like. Like this, the doorbell 102 can transmit predetermined data (for example, voice data and image data) to the server 104 and start communication by a two-way voice call or the like between a visitor and a user of the information terminal 103. In the meantime, the I/F 129 of the doorbell 102 may also be configured to directly perform communication with the information terminal 103.

Figure 24:
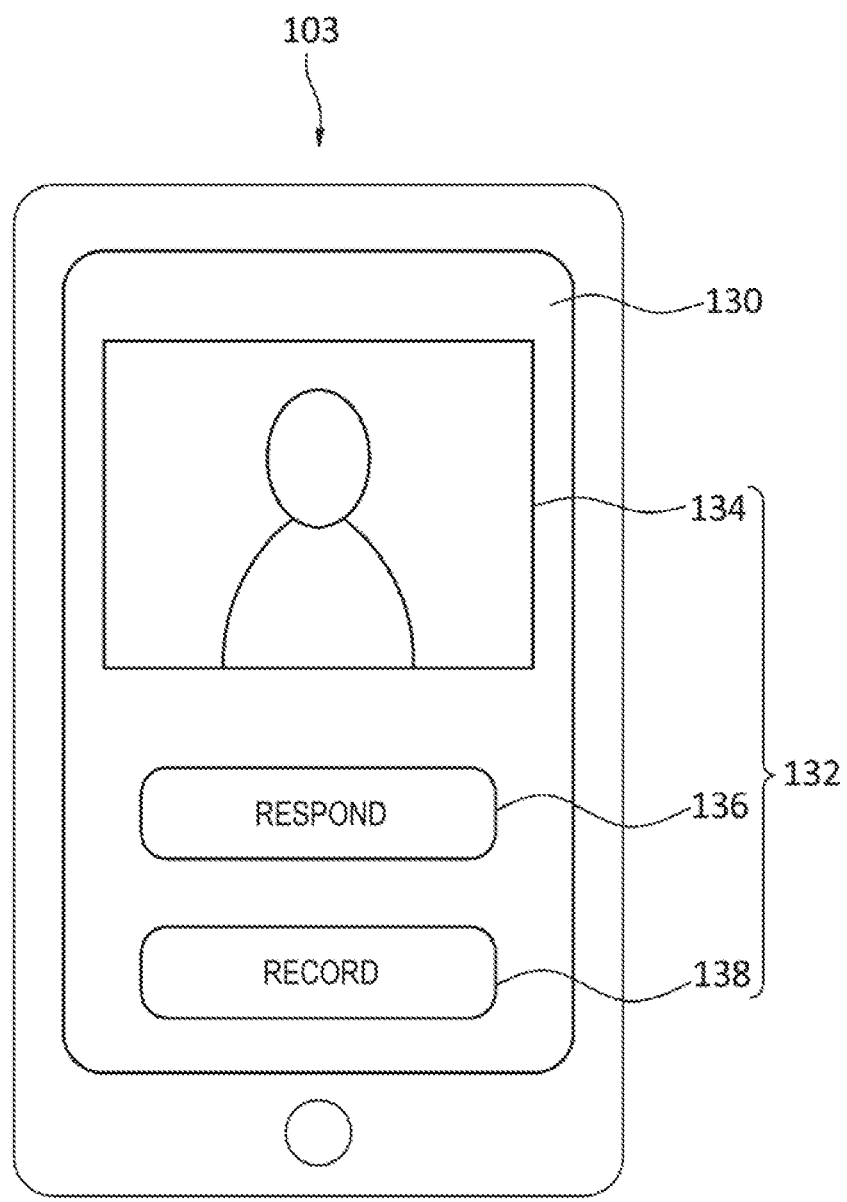
FIG. 24 depicts a configuration of an information terminal provided in the doorbell system of FIG. 21.

FIG. 24 depicts a configuration of the information terminal 103.

The information terminal 103 is a device that is used so that a resident (user) in a residence in which the doorbell 102 is installed responds to a calling from the doorbell 102, for example. The information terminal 103 includes, for example, a smartphone, a tablet computer and other portable information terminal possessed by the resident. The doorbell 102 and the information terminal 103 can perform communication with each other via the server 104.

The information terminal 103 includes a display unit 130 capable of displaying a predetermined user interface 132, as shown in FIG. 24. The display unit 130 is a touch screen type display such as a liquid crystal monitor, an organic EL display and the like, and is configured to display an image (operation image and the like). The information terminal 103 is configured to execute predetermined computer software (for example, application software for voice call and image display), based on data transmitted from the doorbell 102. For example, the information terminal 103 can execute the predetermined application software, based on an input on the user interface 132 displayed on the display unit 130. The user interface 132 includes an image display unit 134 on which a display image of a still image or a moving picture is displayed based on image data of a front area captured by the cameras 126L and 126R of the doorbell 102. Also, the user interface 132 includes a response permission receiving unit 136 for permitting a user to respond to a calling of a visitor. When the user touches the response permission receiving unit 136, a two-way voice communication starts so as to respond to a calling of the visitor. Also, the user interface 132 includes a recording receiving unit 138 for allowing the user to select recording of a display image displayed on the image display unit 134. When the user touches the recording receiving unit 138, a display image that is displayed on the image display unit 134 can be recorded.

As shown in FIG. 23, the server 104 includes a storage unit 140, and can store the data (image data and voice data) transmitted from the doorbell 102 in the storage unit 140 and transmit the data to the information terminal 103. Also, the server 104 can store the data transmitted from the information terminal 103 in the storage unit 140, and transmit the data to the doorbell 102. Like this, the server 104 can start communication by a two-way voice call or the like between a visitor who visits a building in which the doorbell 102 is installed and a user of the information terminal 103 by transmitting and receiving predetermined data (for example, voice data and image data) between the doorbell 102 and the information terminal 103. In the meantime, as described above, the data can also be directly transmitted and received between the doorbell 102 and the information terminal 103 without via the server 104.

Subsequently, an outer configuration of the doorbell 102 is described with reference to FIGS. 22 and 25.

As shown in FIG. 22, the doorbell 102 has a housing 1200 (an example of a main body part) having water resistance and/or waterproofness. The housing 1200 is formed of metal or resin, and is produced by nickel, aluminum, molded plastic or the like, for example.

The housing 1200 has a substantial L-shape, as seen from above. Thereby, for example, it is possible to install the doorbell 102 at a place where it is necessary to capture a wide range around the doorbell 102, for example, a corner part or a pillar of an entrance.

A front surface of the housing 1200 is configured by a first surface 1200A, a second surface 1200B, and a third surface 1200C. The first surface 1200A is a central surface sandwiched between the second surface 1200B and the third surface 1200C, and the operation unit 122 is attached at a central part thereof in an upper and lower direction. Also, the microphone 123 is provided below the operation unit 122. The second surface 1200B is a surface that continues to a left end of the first surface 1200A via a bent part 1201L, and the left camera 126L is attached at an upper part thereof. The third surface 1200C is a surface that continues to a right end of the first surface 1200A via a bent part 1201R, and the right camera 126R is attached at an upper part thereof.

Like this, the left camera 126L and the right camera 126R are preferably disposed in left and right areas of the operation unit 122. Specifically, at least a part of the operation unit 122 is preferably disposed on a line L12 orthogonal to a virtual straight line L11 connecting the left camera 126L and the right camera 126R.

On the second surface 1200B, the person detection sensor 125 is provided below the left camera 126L, and the speaker 124 is provided below the person detection sensor 125. Also, on the third surface 1200C, the person detection sensor 125 is provided below the right camera 126R, and the speaker 124 is provided below the person detection sensor 125. In the meantime, the numbers and arrangement places of the microphone 123, the speaker 124, and the person detection sensor 125 are not limited to the configuration shown in FIG. 22. For example, in the present example, the person detection sensor 125 and the speaker 124 are respectively provided on left and right sides by two. However, at least one person detection sensor 125 and at least one speaker 124 may be provided.

Figure 25:
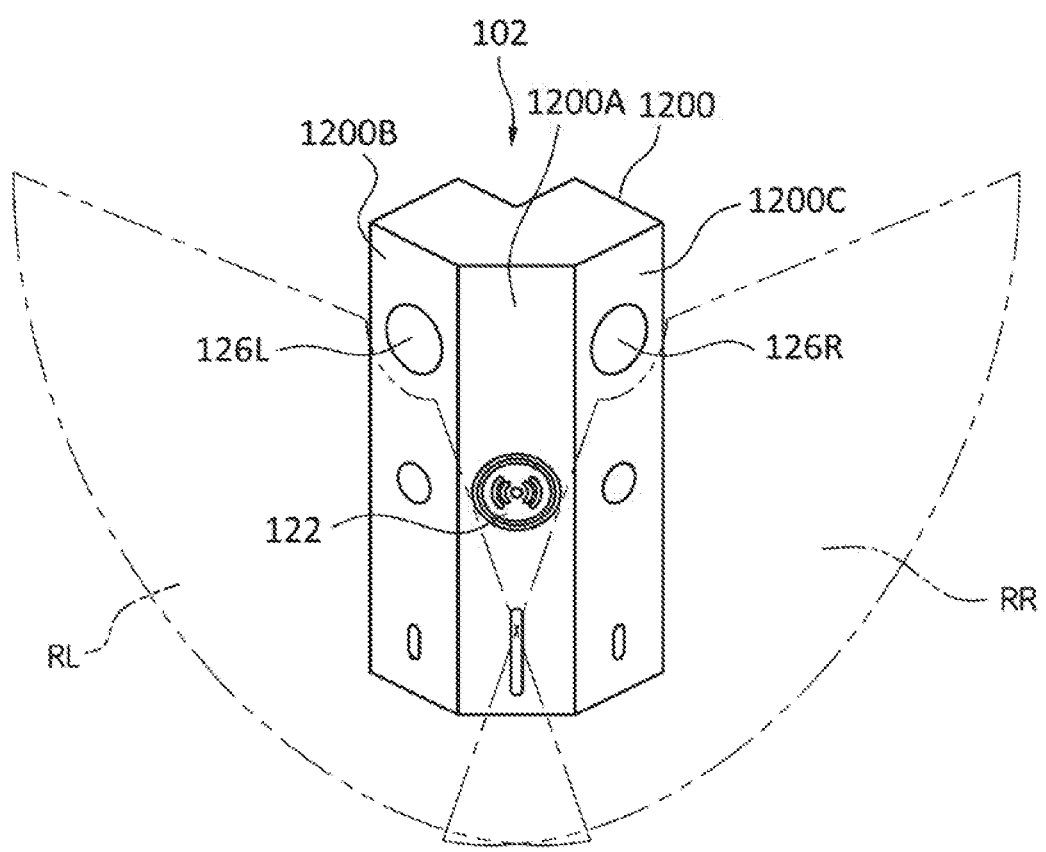
FIG. 25 is a pictorial view depicting a capturing range of the doorbell shown in FIG. 22.

FIG. 25 is a pictorial view depicting a capturing range of the doorbell 102.

As shown in FIG. 25, the left camera 126L and the right camera 126R have predetermined capturing ranges RL and RR, respectively, and are disposed so that the capturing range RL of the left camera 126L and the capturing range RR of the right camera 126R overlap partially. In this way, the left camera 126L, and the right camera 126R are disposed on the left and right sides of the operation unit 122, so that it is possible to capture a front area of the doorbell 102 within a wide angle range of about 270° to the maximum.

Subsequently, operations of the doorbell system 101 are described with reference to FIGS. 21 to 25.

When the operation unit 122 of the doorbell 102 is pressed by a visitor or when a visitor is detected by the person detection sensor 125, the control unit 121 of the doorbell 102 transmits a communication request signal from the I/F 129 to the information terminal 103 via the network. Also, when the operation unit 122 is pressed or when a visitor is detected by the person detection sensor 125, the control unit 121 starts capturing of an area (specifically, the visitor) in front of the doorbell 102 by the left and right cameras 126L and 126R. Then, an image captured by the left camera 126L and an image captured by the right camera 126R are transmitted to the image processing unit 127. The image processing unit 127 synthesizes the images captured by the left and right cameras 126L and 126R, and generates a synthesis image signal. The synthesis image signal is transmitted from the image processing unit 127 to the information terminal 103 (or the server 104) via the I/F 129, based on a control signal of the control unit 121.

The information terminal 103 performs processing of displaying, on the display unit 130, the user interface 132 for allowing the user of the information terminal 103 to select whether or not to respond to a calling of the visitor (whether or not to permit communication between the doorbell 102 and the information terminal 103), based on the received communication request signal. Specifically, the information terminal 103 performs processing of displaying the captured image of the visitor on the image display unit 134 in the user interface 132, based on the received synthesis image signal.

Then, the information terminal 103 transmits a communication permission signal to the doorbell 102, when the user touches the response permission receiving unit 136 in the user interface 132. The doorbell 102 having received the communication permission signal starts communication with the information terminal 103. In this way, communication between the doorbell 102 and the information terminal 103 is caused to start, so that two-way voice communication can be performed between the visitor and the user. That is, the visitor can talk with the user of the information terminal 103 by using the microphone 123 and speaker 124 of the doorbell 102.

As described above, the doorbell 102 of the present embodiment includes the housing 1200, the operation unit 122 attached on the housing 1200 and enabling a visitor to call a resident, the left camera 126L and the right camera 126R attached to the housing 1200 and capable of capturing an image around the doorbell 102, and the control unit 121 connected to the operation unit 122, the left camera 126L and the right camera 126R, and capable of transmitting an image to the information terminal 103, based on a calling operation by the operation unit 122. At least a part of the operation unit 122 is disposed on the line L12 orthogonal to the virtual straight line L11 connecting the left camera 126L and the right camera 126R. According to the above configuration, it is possible to capture the image of the visitor or the like at a wide angle by the left camera 126L and the right camera 126R disposed so as to locate the operation unit 122 therebetween. For this reason, it is possible to appropriately display the image on the information terminal 103. Thereby, the user of the information terminal 103 can easily perceive who the visitor is. Also, by analyzing the image captured at the wide angle, it is possible to increase a detection capability of a suspicious person and the like, and to prevent an erroneous detection.

Also, in the doorbell 102 of the present embodiment, the capturing range RL of the left camera 126L and the capturing range RR of the right camera 126R are configured to overlap at least partially. Thereby it is possible to acquire the wide-angle captured image by synthesizing the image captured by the left camera 126L, and the image captured by the right camera 126R. Also, since the capturing range RL of the left camera 126L, and the capturing range RR of the right camera 126R are configured to overlap at a central part in front of the operation unit 122 where the visitor may be located, a capability of recognizing the visitor can be improved.

In the meantime, in the doorbell system 101 of the above embodiment, the information terminal 103 associated with the resident is exemplified as the external device, and the doorbell 102 is configured as a Wi-Fi doorbell capable of performing wireless communication with the information terminal 103. However, the present invention is not limited thereto. For example, the external device may include a living room master unit provided in a living room of a housing in which the doorbell 102 is installed. That is, the doorbell 102 may be configured as a doorbell capable of performing communication with the living room master unit via an intercom line, for example.

In the above embodiment, the operation unit 122 is disposed on the line L12 orthogonal to the virtual straight line L11 connecting the left camera 126L and the right camera 126R. However, the present invention is not limited thereto. The operation unit 122 may be disposed close to the left camera 126L or the right camera 126R. However, also in this case, in order to maintain the capability of recognizing the visitor by the left camera 126L and the right camera 126R, the capturing range RL of the left camera 126L and the capturing range RR of the right camera 126R are preferably configured to overlap in front of the operation unit 122.

Also, in the doorbell 102 of the above embodiment, the left camera 126L is provided on the second surface 1200B that is continuous to the first surface 1200A, on which the operation unit 122 is provided, via the bent part 1201L, and the right camera 126R is provided on the third surface 1200C that is continuous to the first surface 1200A via the bent part 1201R. However, the present invention is not limited thereto. The front face of the housing 1200 may be configured by a single surface curved in the right and left direction, and the operation unit 122 may be disposed between the left camera 126L, and the right camera 126R on the single curved surface. Also in this case, in order to attach the doorbell 102 to a pillar or a corner part of a wall, a back surface of the housing 1200 is preferably formed to have a substantial L-shape, as seen from above.

First Operation Example of Housing Complex Communication System

In the below, a housing complex communication system in accordance with an example of the present embodiment is described with reference to the drawings.

Figure 26:
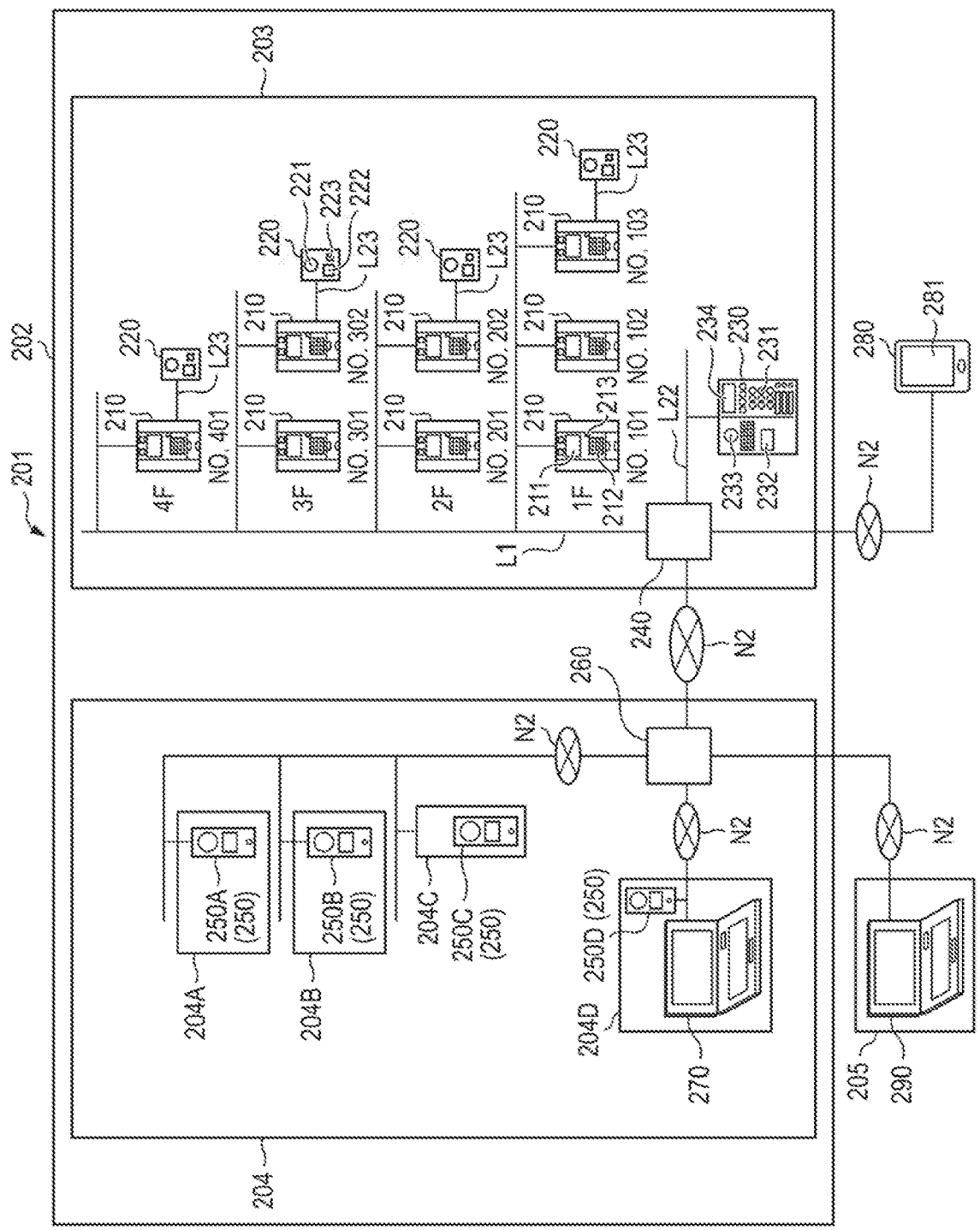
FIG. 26 depicts a configuration of a housing complex communication system in accordance with one embodiment of the present invention.

FIG. 26 depicts a configuration of a housing complex communication system in accordance with the present embodiment.

As shown in FIG. 26, a housing complex communication system 201 is a system that is used for a housing complex 202 comprised of a residence building 203 (an example of a first facility), a communal building 204 (an example of a second facility) and the like, such as an apartment.

The housing complex communication system 201 includes living room master units 210 (an example of a first calling device), living room entrance slave units 220 (an example of a first calling device), a group entrance device 230 (an example of a first calling device), and a residence building server 240 for calling control (an example of a first control unit), which are provided in the residence building 203.

Also, the housing complex communication system 201 includes doorbells 250A to 250D (an example of a second calling device), and a communal building server 260 for calling control (an example of a second control unit), which are provided in the communal building 204. The doorbell 250 (250A to 250D is installed in a gym 204A, a parking lot 204B, a security pole 204C built on a sidewalk in the housing complex, a management office 204D (in the management office, at a counter, or the like) in which a concierge is, and the like, which are provided as communal facilities. The doorbell 250 (250A to 250D) is used so that a user (for example, a visitor, a resident, a concierge and the like) in the communal building 204 talks with a user (for example, a resident and the like) in the residence building 203 or so that users in the communal building 204 talk with each other. In the management office 204D, a PC (Personal Computer) is provided as a management office master unit 270 in which housing information about the housing complex 202 is saved.

The residence building 203 and the communal building 204 are connected so that the residence building server 240 and the communal building server 260 can perform communication with each other via a network N2. As the network N2, a network communication means such as wireless local area network (LAN), radio, cellular, Bluetooth (registered trademark), electromagnetic wave, infrared light, sonic wave, microwave and the like can be used, for example.

In the residence building 203, the living room master unit 210 is communicatively connected to the residence building server 240 via an intercom line (dedicated line for intercom) L21. Also, the group entrance device 230 is communicatively connected to the residence building server 240 via an intercom line L22. Also, the living room entrance slave unit 220 is communicatively connected to the living room master unit 210 via an intercom line L23.

In the communal building 204, the doorbell 250 (250A to 250D) is communicatively connected to the communal building server 260 via the network N2. In the meantime, as a communication device configured to relay the doorbell 250 (250A to 50D) and the network N2, for example, a Wi-Fi router may be used.

Also, the residence building server 240 in the residence building 203 can be communicatively connected to a portable information terminal 280 (an example of a first calling device) via the network N2. The portable information terminal 280 is a smartphone, a tablet computer and other portable information terminal possessed by the user (for example, a resident) associated with each of the residences, for example.

Also, the housing complex communication system 201 is provided with a remote control center 205 at a place distant from the housing complex 202, and a remote control device 290 (an example of a second calling device) configured to manage information of the housing complex is installed in the remote control center 205. The remote control device 290 is, for example, a PC, and master data of the housing complex is stored therein. The remote control device 290 is communicatively connected to the communal building server 260 via the network N. The remote control center 205 is, for example, an apartment management company, a security company and the like.

The living room master unit 210 is installed in each of residences of the housing complex. The living room master unit 210 includes a display unit 211, an operation unit 212, a phone call unit 213 and the like. The living room master unit 210 is configured to respond to callings from the living room entrance slave unit 220, the group entrance device 230, the doorbell 250 (250A to 250D), the portable information terminal 280 and the remote control device 290, for example, via the phone call unit 213. Also, the living room master unit 210 is configured to call the doorbell 250A of the gym 204A, the doorbell 250B of the parking lot 204B, the doorbell 250D of the management office 204D, the portable information terminal 280, and the remote control device 290, for example, by operating the operation unit 212. In each of the living room master units 210, a living room master unit ID for identifying the living room master unit is stored.

The living room entrance slave unit 220 is installed in an entrance of the residence. The living room entrance slave unit 220 includes a camera 221, an operation unit 222, a phone call unit 223 and the like. The living room entrance slave unit 220 is configured to call the living room master unit 210 connected to the living room entrance slave unit 220 by operating the operation unit 222.

The group entrance device 230 is installed in a group entrance, a communal space or the like of the housing complex. The group entrance device 230 includes a calling unit 231, a phone call unit 232, a camera 233, a display unit 234 and the like. The group entrance device 230 is configured to call the living room master unit 210, the doorbell 250A of the gym 204A, the doorbell 250B of the parking lot 204B, the doorbell 250D of the management office 204D, the portable information terminal 280, and the remote control device 290, for example, by operating the calling unit 231. Also, the group entrance device 230 is configured to talk with a resident at the living room master unit 210, a user (for example, a visitor, a resident, a concierge or the like) at the doorbell 250A, the doorbell 250B or the doorbell 250D, a resident carrying the portable information terminal 280, and a manager in the remote control center 205 via the phone call unit 232. Also, the group entrance device 230 is configured to capture a user (for example, a visitor and the like) by the camera 233. In the group entrance device 230, a group entrance device 11) for identifying the group entrance device is stored.

The portable information terminal 280 is configured to respond to callings from the doorbell 250 (250A to 250D), the group entrance device 230, the living room entrance slave unit 220, the remote control device 290 and the like, for example, via the residence building server 240. The portable information terminal 280 includes a touch screen-type display unit 281 capable of displaying a predetermined user interface. The portable information terminal 280 is configured to execute predetermined computer software (for example, application software for voice call and image display), based on a signal transmitted from the doorbell 250 (250A to 250D) and the like. For example, the portable information terminal 280 can execute application software configured to allow a response to a calling from the doorbell 250 (250A to 250D) and the like and to start two-way communication with a visitor by touching a user interface displayed on the display unit 281. Also, the portable information terminal 280 is configured to call the group entrance device 230, the doorbell 250A of the gym 204A, the doorbell 250B of the parking lot 204B, the doorbell 250D of the management office 204D, and the remote control device 290, for example, by touching the user interface displayed on the display unit 281. In the portable information terminal 280, a portable information terminal ID for identifying the information terminal is stored.

Figure 27:
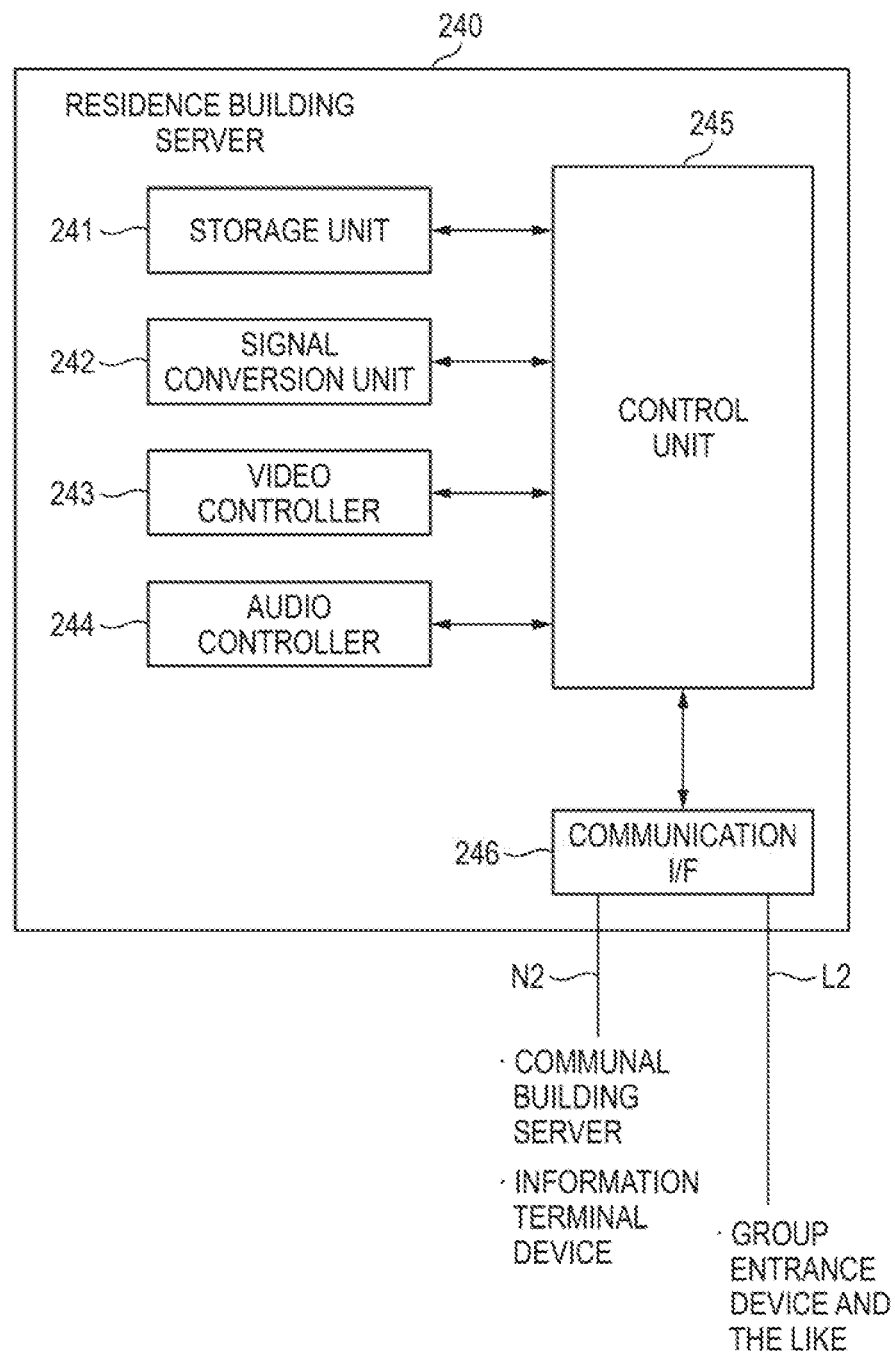
FIG. 27 is a functional block diagram of a residence building server provided in the housing complex communication system in accordance with one embodiment of the present invention.

The residence building server 240 is a server for calling control, and includes a storage unit 241, a signal conversion unit 242, a video controller 243, an audio controller 244, a control unit 245, and a communication interface (hereinbelow, referred to as 'communication I/F') 246, as shown in FIG. 27.

In the storage unit 241, information about the living room master unit 210, the living room entrance slave unit 220 and the group entrance device 230 of the residence building 203, the portable information terminal 280 and the like, and information about the doorbells 250A to 250D and the like of the communal building 204 are stored with being associated in a calling table for calling control, for example. Also, in the storage unit 241, a residence building server ID for identifying the residence building server 240 is stored.

Also, in the storage unit 241, an application capable of storing calling signals and data (for example, image data, voice data and the like) transmitted from the living room master unit 210, the living room entrance slave unit 220, the group entrance device 230, and the portable information terminal 280 in the storage unit 241 and transmitting the calling signals and data to the communal building server 260 is installed. This application can also store calling signals and data (for example, image data, voice data and the like) transmitted from the communal building server 260 in the storage unit 241 and transmit the calling signals and data to a predetermined living room master unit 210, the group entrance device 230 and the portable information terminal 280. Also, the application can store and transmit the calling signals and data between the living room master unit 210 and the group entrance device 230, and between the living room master unit 210 and group entrance device 230 and the portable information terminal 280.

The signal conversion unit 242 includes an analog to digital conversion unit configured to convert an analog signal that can be communicated via the intercom lines L21 to L23 into a digital signal that can be communicated via the network N2, and a digital to analog conversion unit configured to convert a digital signal into an analog signal.

The video controller 243 is configured to signal-process a video signal captured by the group entrance device 230, and to transmit the processed video signal toward the living room master unit 210, the portable information terminal 280, or the communal building server 260. The audio controller 244 is configured to signal-process a voice signal transmitted from the living room master unit 210, the group entrance device 230, or the communal building server 260, and to transmit the processed voice signal toward a call target device.

The control unit 245 is configured to control operations of each unit of the residence building server 240. The control unit 245 may include at least one microcontroller including one or more processors and one or more memories, and other electronic circuit including an active element such as a transistor and a passive element. The processor may also be configured to read out a program designated from a control program stored in the memory, and to execute a variety of processing in cooperation with the memory.

The control unit 245 is configured to control, based on a calling table, communication processing and the like between the living room master unit 210 and group entrance device 230 connected via the intercom line L2 and the communal building server 260 of the communal residence 204 connected via the network N2. Also, the control unit 245 is configured to control, based on the calling table, communication processing and the like between the portable information terminal 280 connected via the network N2 and the communal building server 260 of the communal residence 204 connected via the network N2. Also, the control unit 245 is configured to control, based on the calling table, communication processing and the like between the living room master unit 210 connected via the intercom line L21 and the group entrance device 230 connected via the intercom line L22. Also, the control unit 245 is configured to control, based on the calling table, communication processing and the like between the living room master unit 210 and group entrance device 230 connected via the intercom line L2 and the portable information terminal 280 connected via the network N2.

When a calling signal for calling the doorbells 250A to 250D is transmitted from the living room master unit 210, the group entrance device 230, and the portable information terminal 280, for example, the control unit 245 executes the application installed in the storage unit 241, and starts communication processing between the predetermined elements. Also, when a calling signal for calling the living room master unit 210, the group entrance device 230, or the portable information terminal 280 is transmitted from the communal building server 260 of the communal building 204, for example, the control unit 245 executes the application installed in the storage unit 241, and starts communication processing between the predetermined elements.

The communication I/F 246 is configured to form a signal transmission path between the residence building server 240 and the communal building server 260 and between the residence building server 240 and the portable information terminal 280 via the Internet N2. Also, the communication I/F 246 is configured to form a signal transmission path between the residence building server 240 and living room master unit 210 and the group entrance device 230 via the intercom line L2 (L21, L22).

Figure 28:
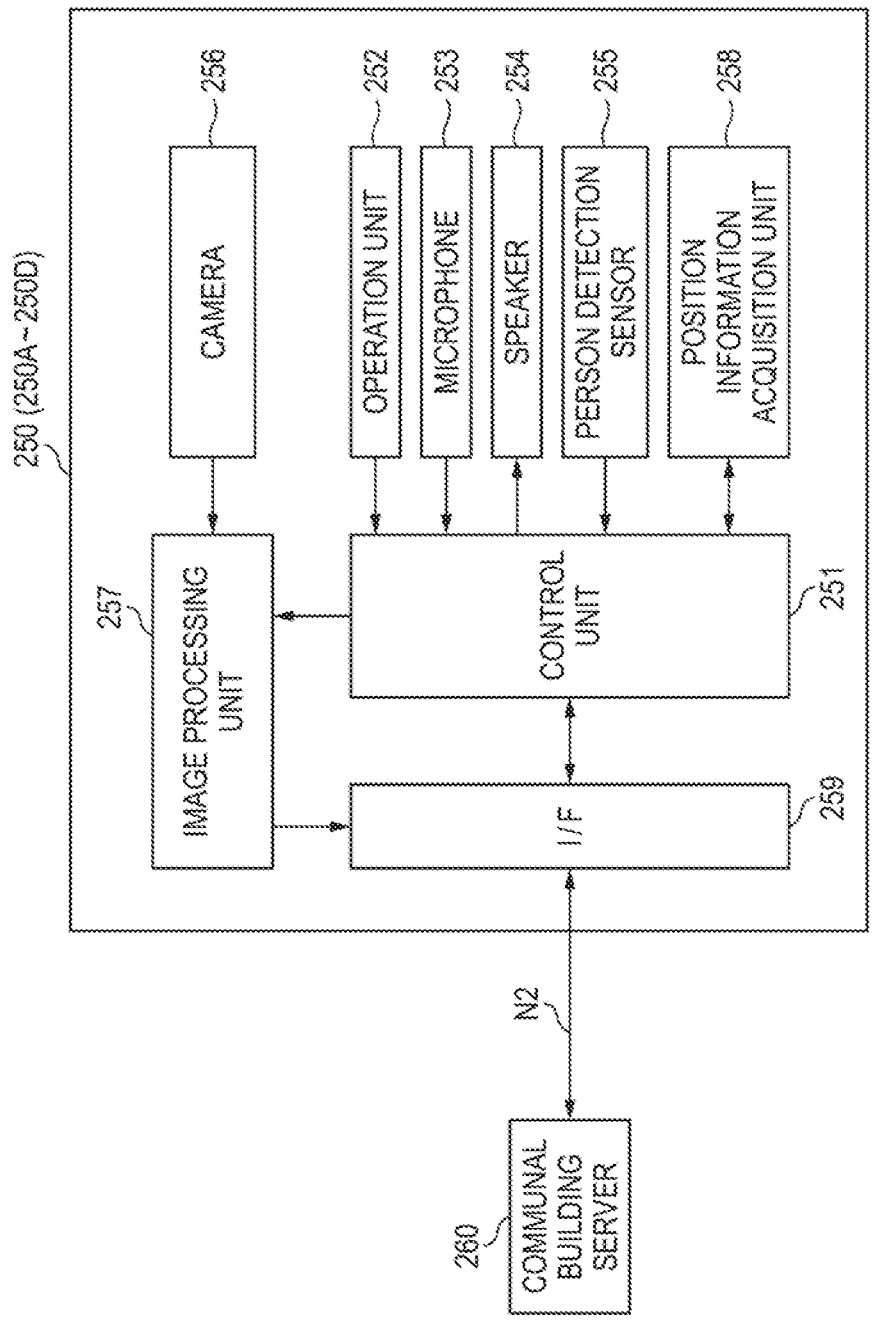
FIG. 28 is a functional block diagram of a doorbell provided in the housing complex communication system in accordance with one embodiment of the present invention.

As shown in FIG. 28, the doorbell 250 (250A to 250D) includes a control unit 251, an operation unit 252, a microphone 253, a speaker 254, a person detection sensor 255, a camera 256, an image processing unit 257, a position information acquisition unit 258, and a communication I/F 259.

The control unit 251 is configured to control operations of each unit of the doorbell 250. The control unit 251 may include at least one microcontroller including one or more processors and one or more memories, and other electronic circuit including an active element such as a transistor and a passive element. The processor may also be configured to read out a program designated from a control program stored in the memory, and to execute a variety of processing in cooperation with the memory.

The operation unit 252 is configured to receive a variety of input operations of a user (for example, a visitor, a resident, a concierge and the like). The diverse input operations include, for example, an input operation for calling a user (for example, a resident and the like) in the residence building 203, and an input operation for calling another user in the communal building 204, and the like. The microphone 253 and the speaker 254 configure a phone call unit configured to transmit voice data of a user on a doorbell-side toward a user at a call destination and to output voice data from the user at the call destination toward the user on the doorbell-side.

The person detection sensor 255 is a sensor for detecting a person (user) in front of the doorbell 250, and is configured by an infrared sensor, for example. The person detection sensor 255 is connected to the camera 256 via the control unit 251. The person detection sensor 255 is configured to output a detection signal, which notifies that a person is detected, to the camera 256. The camera 256 is a capturing device for capturing a user. The camera 256 may be configured by a video camera that is a web camera, for example. The camera 256 is activated, based on a detection signal that is output from the person detection sensor 255. An image captured by the camera 256 is output to the image processing unit 257. The image processing unit 257 is configured to transmit image data acquired from the camera 256 to the communal building server 260 via the communication I/F 259, based on a control signal of the control unit 251.

The position information acquisition unit 258 is configured to acquire the position information of the doorbell so as to specify the predetermined doorbell 250 (250A to 250D). The position information is acquired using a GPS (Global Positioning System), for example. In the meantime, when installing the doorbell 250 (250A to 250D), the position information of the doorbell may be registered in advance in the position information acquisition unit 258. In the meantime, as the information that is used so as to specify the predetermined doorbell 250 (250A to 250D), a doorbell ID capable of identifying each of the doorbells 250A to 250D may be used. The doorbell ID is stored in each of the doorbells 250A to 250D.

The communication I/F 259 is configured to form a signal transmission path between the doorbell 250 and the communal building server 260 via the Internet N2.

Figure 29:
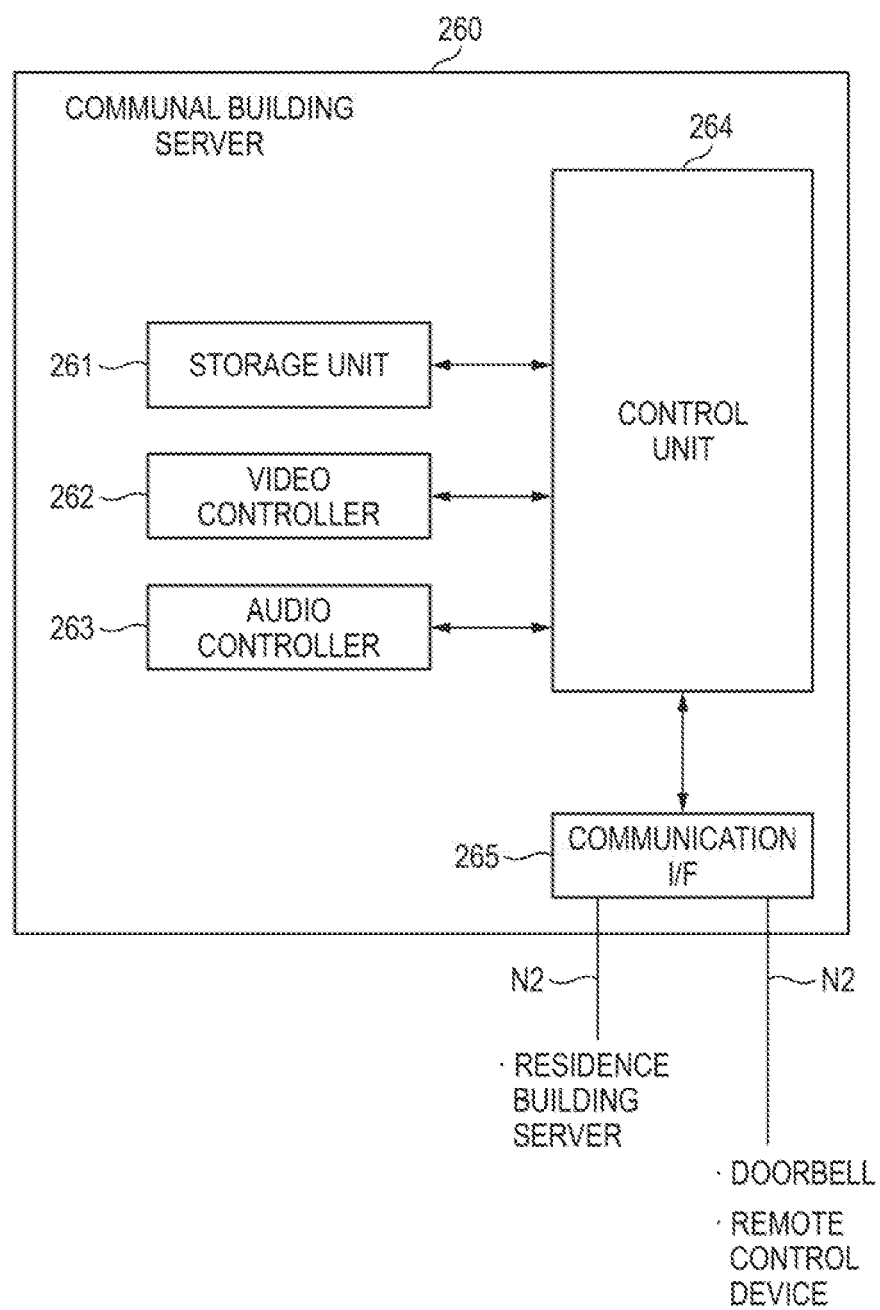
FIG. 29 is a functional block diagram of a communal building server provided in the housing complex communication system in accordance with one embodiment of the present invention.

The communal building server 260 is a server for calling control, and includes a storage unit 261, a video controller 262, an audio controller 263, a control unit 264, and a communication I/F 265, as shown in FIG. 29.

In the storage unit 261, information about the doorbell 250A to 250D and the like of the communal building 204, and information about the living room master unit 210, the living room entrance slave unit 220 and the group entrance device 230 of the residence building 203, the portable information terminal 280 and the like are stored with being associated in a calling table for calling control, for example. Also, in the storage unit 261, a communal building server ID for identifying the communal building server 260 is stored.

Also, in the storage unit 261, calling signals and data (for example, image data, voice data and the like) transmitted from the doorbells 250A to 250D are stored, and an application capable of transmitting the calling signals and data to the residence building server 240 is installed. This application can also store calling signals and data (for example, image data, voice data and the like) transmitted from the residence building server 240 in the storage unit 261 and transmit the calling signals and data to a predetermined doorbell 250 (250A to 250D). Also, the application can store calling signals and data transmitted from the doorbells 250A to 250C in the storage unit 261 and transmit the calling signals and data to the doorbell 250D. Also, the application can store and transmit the calling signals and data between the remote control device 290 and the doorbell 250D, or between the remote control device 290 and the residence building server 240.

The video controller 262 is configured to signal-process a video signal captured by the doorbell 250 (250A to 250D), and to transmit the processed video signal toward the residence building server 240 or another doorbell 250 (250A to 250D). The audio controller 263 is configured to signal-process a voice signal transmitted from the doorbell 250 (250A to 250D), and to transmit the processed voice signal toward the residence building server 240 or another doorbell 250 (250A to 250D).

The control unit 264 is configured to control operations of each unit of the communal building server 260. The control unit 264 has a hardware configuration that is similar to the control unit 245 of the residence building server 240 and the control unit 251 of the doorbell 250. The control unit 264 is configured to control, based on the calling table, communication processing and the like between the doorbell 250 (250A to 250D) connected via the network N2 and the residence building server 240 of the residence building 203 connected via the network N2. Also, the control unit 264 is configured to control, based on the calling table, communication processing and the like between the doorbells 250 (250A to 250D) connected via the network N2.

When a calling signal for calling the living room master unit 210 of the residence building 203, the portable information terminal 280 or another doorbell 250A to 250D is transmitted from the doorbells 250A to 250D, the control unit 264 executes the application installed in the storage unit 261 and starts communication processing between the predetermined elements. Also, when a calling signal for calling the doorbell 250 (250A to 250D, for example, from the residence building server 240 of the residence building 203 is transmitted, the control unit 264 executes the application installed in the storage unit 261 and starts communication processing between the predetermined elements.

The communication I/F 265 is configured to form a signal transmission path between the communal building server 260 and the residence building server 240, the doorbell 250 (250A to 250D) and the remote control device 290 via the internet N2.

Figure 30:
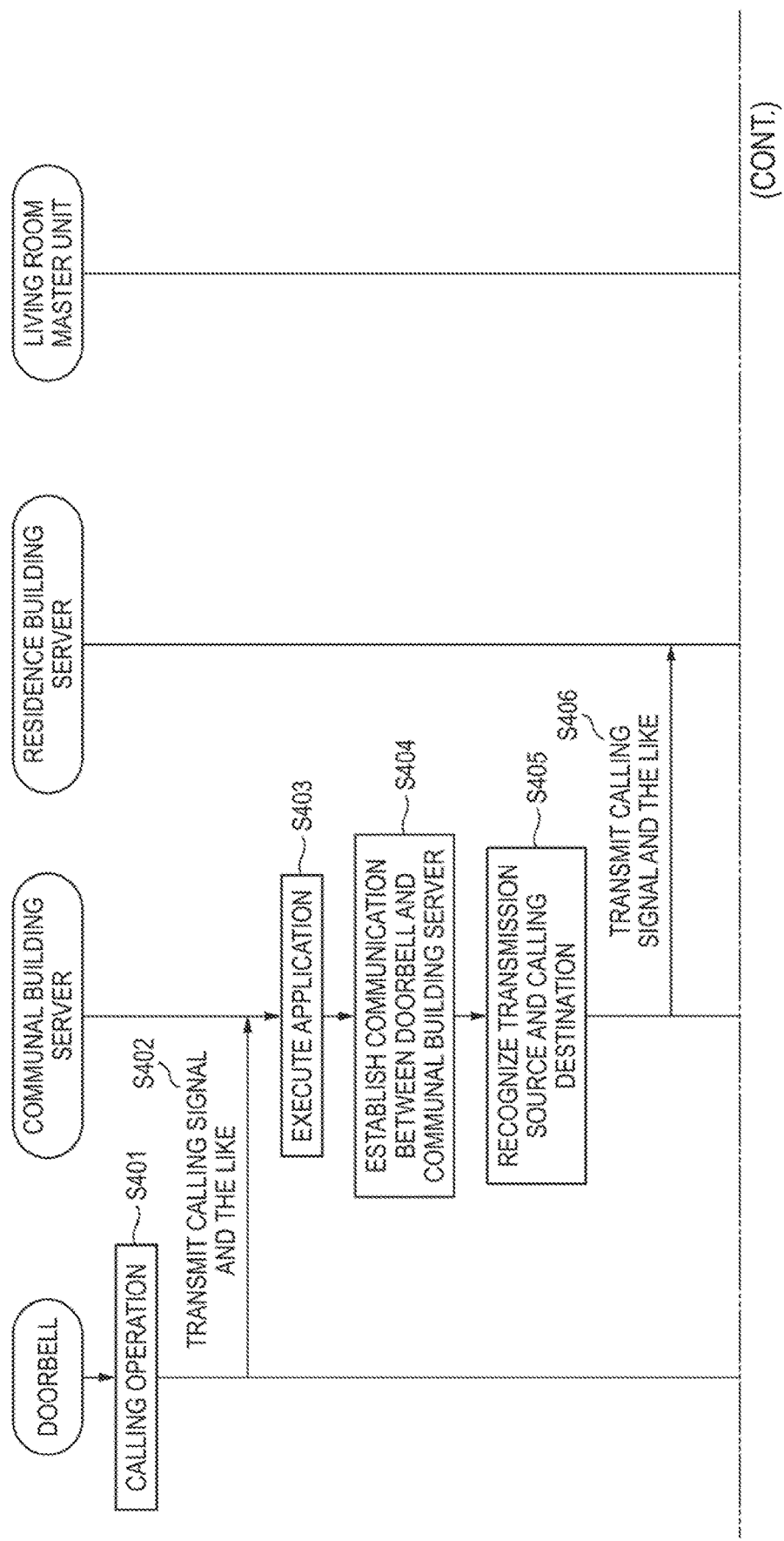
FIG. 30 is a flowchart depicting operations of the housing complex communication system in accordance with one embodiment of the present invention.

Subsequently, operations of the housing complex communication system 201 are described with reference to FIG. 30.

For example, when the living room master unit 210 of the residence building 203 is called from the doorbell 250 of the communal building 204, the housing complex communication system 201 operates, as follows.

A visitor inputs a room number "101" that is a visit destination via the operation unit 252 of the doorbell 250B installed in the parking lot 204B, for example, and then presses the calling button (step S401).

The input "101" is transmitted to the communal building server 260 via the network N2, as a calling signal "101" (step S402). In the meantime, the position information or the doorbell ID (in the present example, the doorbell ID is used) for identifying the doorbell 2503 that is a transmission source is added to the calling signal "101" that is transmitted. Also, when the calling button is pressed, the image data captured by the camera 256 of the doorbell 250B and the voice data acquired by the microphone 253 are transmitted to the communal building server 260 via the network N2.

The control unit 264 of the communal building server 260 having received the calling signal "101" to which the doorbell ID is added executes the application installed in the storage unit 261 (step S403). The control unit 264 establishes communication between the doorbell 250B and the communal building server 260 via the network N2, in accordance with a command of the application (step S404). The control unit 264 refers to the calling table to recognize that the transmission source is the doorbell 250B of the parking lot 204B and that the calling destination is a room 101 (living room master unit 210) of the residence building 203 (step S405). Then, the control unit 264 stores the received calling signal "101", doorbell ID, image data, and voice data in the storage unit 261, and transmits the calling signal "101", the doorbell ID, the image data, and the voice data toward the residence building server 240 via the network N2 (step S406). In the meantime, the communal building server ID of the communal building server 260 that is a transmission source is added to the calling signal "101" that is transmitted.

The control unit 245 of the residence building server 240 having received the calling signal "101" to which the communal building server ID is added activates the application installed in the storage unit 241 (step S407). The control unit 245 establishes communication between the communal building server 260 and the residence building server 240 via the network N2, in accordance with a command of the application (step S408). The control unit 245 refers to the calling table to recognize that the transmission source is the communal building server 260, that the calling source is the doorbell 250B of the parking lot 204B, and that the calling destination is the living room master unit 210 in a room 101 (step S409). Then, the control unit 245 stores the received calling signal "101", communal building server ID, doorbell ID, image data, and voice data in the storage unit 241. The control unit 245 converts the digital signal of the received calling signal "101" and the like into an analog signal, which can be communicated via the intercom line L, by the signal conversion unit 242 (step S410). The control unit 245 transmits the converted calling signal "101" toward all the living room master units 210 via the intercom line L21 (step S411). In the meantime, in this case, the image data (video of the visitor) is also added to the calling signal "101".

Each of the living room master units 210 having received the calling signal "101" determines whether the calling signal "101" is a calling signal for itself. In this case, the living room master unit 210 in a room 101 determines that the calling signal is a calling signal for itself. Thereby, in the living room master unit 210 of a room 101, a calling sound is output from the speaker of the phone call unit 213 and a predetermined calling lamp is turned on, so that a calling from the doorbell 250B is notified (step S412). Also, a video of the visitor is displayed on the display unit 211. When a resident in a room 101 presses a phone call button of the living room master unit 210, signal communication between the living room master unit 210 and the doorbell 250D is permitted, so that a phone call can be performed, (step S413), for example.

In the meantime, in step S411, the calling signal "101" is transmitted toward all the living room master units 210 via the intercom line 121. However, the control unit 245 may determine the calling destination, based on the calling signal "101" received from the communal building server 260, and transmit the calling signal "101" only to the living room master unit 210 in a room 101 associated with the calling signal "101".

For example, also in a case where the portable information terminal 280 of the resident associated with each of the residences is called from the doorbell 250 (250A to 250D), each processing that is similar to the above processing is executed. In this case, however, communication between the control unit 245 of the residence building server 240 and the portable information terminal 280 is performed via the network N2. Also, in this case, when a calling to the living room master unit 210 is performed from the doorbell 250 (250A to 250D) and there is no response from the living room master unit 210, the calling may be automatically transferred to the portable information terminal 280 of the resident associated with each of the residences.

Also, for example, the doorbell 250 (250A to 250D) can be called from the living room master unit 210 and the portable information terminal 280. In this case, processing that is similar to the above processing is performed in reverse steps, so that each calling operation is executed.

As described above, according to the housing complex communication system 201 of the present embodiment, a calling signal (an example of a first calling signal and a second calling signal) for calling each calling device can be communicated between two control units of which the calling devices of the communication destinations are different, i.e., the communal building server 260 of which the calling device of the communication destination is the doorbell 250 and the like and the residence building server 240 of which the calling device of the communication destination is the living room master unit 210 and the like. Thereby, it is possible to smoothly perform a calling control for the residence building 203 and the communal building 204 that are different buildings in the housing complex 202, and to perform communication between the buildings in a seamless manner.

Also, since it is possible to control all of the residence building server 240 and the communal building server 260 by the single application installed in each of servers, it is possible to smoothly cooperate the servers.

Also, when the doorbell 250 is newly additionally added to the communal building 204, it is not necessary to change a system of the residence building server 240 and it is possible to smoothly perform a calling to the living room master unit 210 from the doorbell 250. Similarly, when the living room master unit 210 is newly additionally added to the residence building 203, it is not necessary to change a system of the communal building server 260 and it is possible to smoothly perform a calling to the doorbell 250 from the living room master unit 210.

Second Operation Example of Housing Complex Communication System

In the below, a housing complex communication system in accordance with an example of the present embodiment is described with reference to the drawings.

Figure 31:
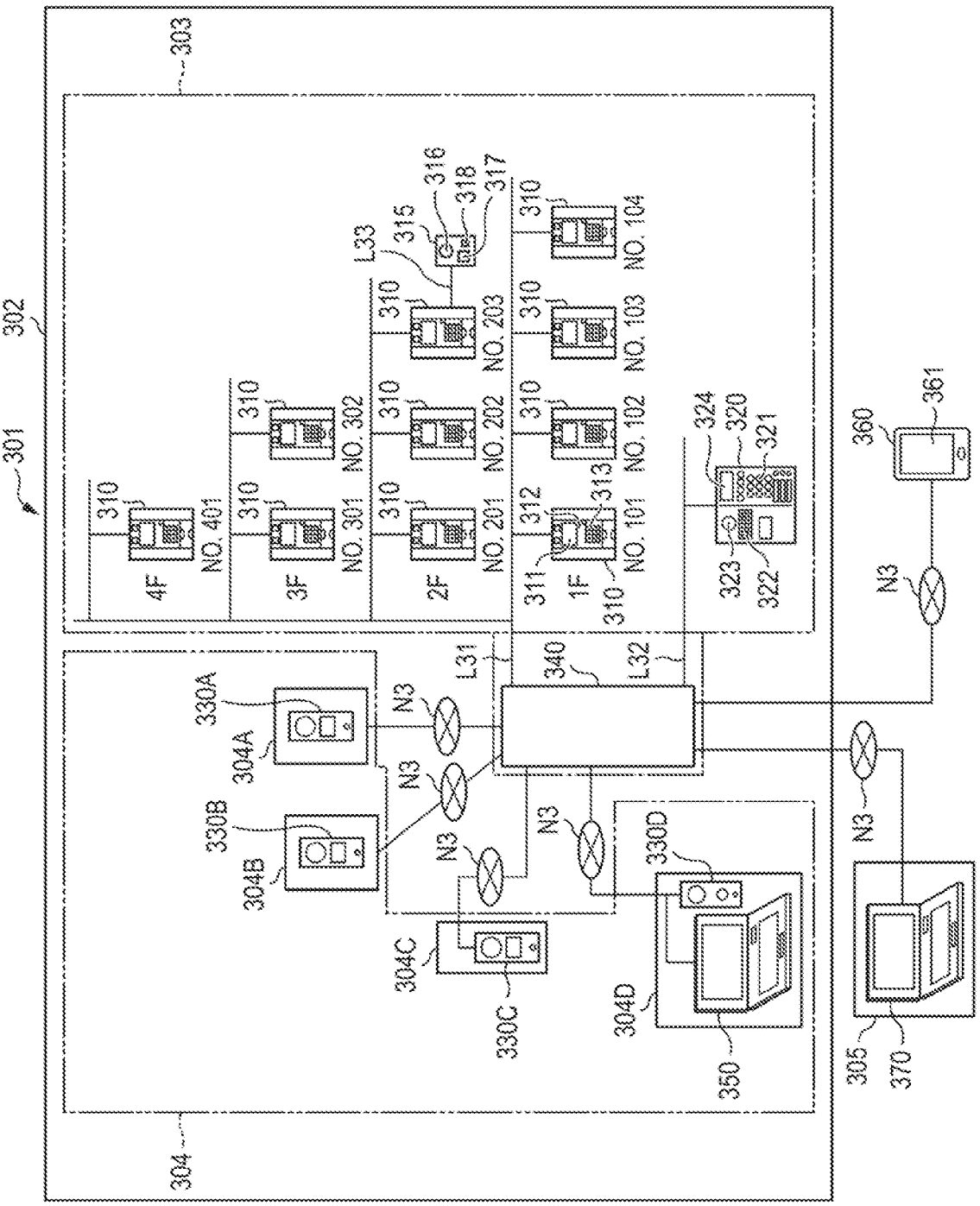
FIG. 31 depicts a configuration of the housing complex communication system in accordance with one embodiment of the present invention.

FIG. 31 depicts a configuration of a housing complex communication system in accordance with the present embodiment. A housing complex communication system 301 is a system that is used for a housing complex 302 comprised of a housing facility 303 in which a resident resides, a communal facility 304 that many persons can use commonly, and the like, such as an apartment.

As shown in FIG. 31, the housing complex communication system 301 includes living room master units 310 (an example of a calling device), living room entrance slave units 315, and a group entrance device 320 (an example of a calling device), which are provided in the housing facility 303, and a doorbell 330 (330A to 330D) provided in the communal facility 304. Also, the housing complex communication system 301 includes a server 340 (an example of a control unit) configured to perform calling control between the devices.

The living room master unit 310 is communicatively connected to the server 340 via an intercom line (dedicated line for intercom) L31. Also, the group entrance device 320 is communicatively connected to the server 340 via an intercom line 132. Also, the living room entrance slave unit 315 is communicatively connected to the living room master unit 310 via an intercom line L33.

The doorbell 330 (330A to 330D) is communicatively connected to the server 340 via a network N3. As the network N3, a wireless network communication means such as wireless local area network (LAN), radio, cellular, Bluetooth (registered trademark), electromagnetic wave, infrared light, sonic wave, microwave and the like can be used, for example. In the meantime, as a communication device configured to relay the doorbell 330 (330A to 330D) and the network N3, for example, a Wi-Fi router may be used.

The doorbell 330 (330A to 330D) is installed in a gym 304A, a parking lot 304B, a security pole 304C built on a sidewalk in the housing complex, a management office 304D (in the management office, at a counter, or the like) in which a concierge is, and the like. The doorbell 330 (330A to 330D) is used so that a user (for example, a visitor, a resident, a concierge and the like) in the communal facility 304 talks with a user (for example, a resident and the like) in the housing facility 303 or so that users in the communal facility 304 talk with each other. In the management office 304D, a PC (Personal Computer) is provided as a management office master unit 350 in which housing information about the housing complex 302 is saved.

Also, the server 340 can be communicatively connected to a portable information terminal 360 via the network N3. The portable information terminal 360 is a smartphone, a tablet computer and other information terminal possessed by the user (for example, a resident) associated with each of the residences, for example.

Also, the housing complex communication system 301 is provided with a remote control center 305 at a place distant from the housing complex 302, and a remote control device 370 configured to manage information of the housing complex is installed in the remote control center 305. The remote control device 370 is, for example, a PC, and master data of the housing complex is stored therein. The remote control device 370 is communicatively connected to the server 340 via the network N3. The remote control center 305 is, for example, an apartment management company, a security company and the like.

The living room master unit 310 is installed in each of residences of the housing complex. The living room master unit 310 includes a display unit 311, an operation unit 312, a phone call unit 313 and the like. The living room master unit 310 is configured to respond to callings from the group entrance device 320, the doorbell 330 (330A to 330D), the portable information terminal 360 and the remote control device 370, for example, via the phone call unit 313. Also, the living room master unit 310 is configured to call the doorbell 330A of the gym 304A, the doorbell 330B of the parking lot 304B, the doorbell 330D of the management office 304D, the portable information terminal 360, and the remote control device 370, for example, by operating the operation unit 312. In each of the living room master units 310, a living room master unit ID for identifying the living room master unit is stored.

The living room entrance slave unit 315 is installed in an entrance of the residence. The living room entrance slave unit 315 includes a camera 316, an operation unit 317, a phone call unit 318 and the like. The living room entrance slave unit 315 is configured to call the living room master unit 310 connected to the living room entrance slave unit 315 by operating the operation unit 317.

The group entrance device 320 is installed in a group entrance, a communal space or the like of the housing complex. The group entrance device 320 includes a calling unit 321, a phone call unit 322, a camera 323, a display unit 324 and the like. The group entrance device 320 is configured to call the living room master unit 310, the doorbell 330A of the gym 304A, the doorbell 330B of the parking lot 304B, the doorbell 330D of the management office 304D, the portable information terminal 360, and the remote control device 370, for example, by operating the calling unit 321. Also, the group entrance device 320 is configured to talk with a resident at the living room master unit 310, a user (for example, a visitor, a resident, a concierge or the like) at the doorbell 330A, the doorbell 330B or the doorbell 330D, a resident carrying the portable information terminal 360, and a manager in the remote control center 305 via the phone call unit 322. Also, the group entrance device 320 is configured to capture a user (for example, a visitor and the like) by the camera 323. In the group entrance device 320, a group entrance device ID for identifying the group entrance device is stored.

The portable information terminal 360 is configured to respond to callings from the doorbell 330 (330A to 330D), the group entrance device 320, the living room entrance slave unit 315, the remote control device 370 and the like, for example, via the server 340. The portable information terminal 360 includes a touch screen-type display unit 361 capable of displaying a predetermined user interface. The portable information terminal 360 is configured to execute predetermined computer software (for example, application software for voice call and image display), based on a signal transmitted from the doorbell 330 (330A to 330D) and the like. For example, the portable information terminal 360 can execute application software configured to allow a response to a calling from the doorbell 330 (330A to 330D) and the like and to start two-way communication with a visitor by touching a user interface displayed on the display unit 361. Also, the portable information terminal 360 is configured to call the group entrance device 320, the doorbell 330A of the gym 304A, the doorbell 330B of the parking lot 304B, the doorbell 330D of the management office 304D, and the remote control device 370, for example, by touching the user interface displayed on the display unit 361. In the portable information terminal 360, a portable information terminal ID for identifying the information terminal is stored.

Figure 32:
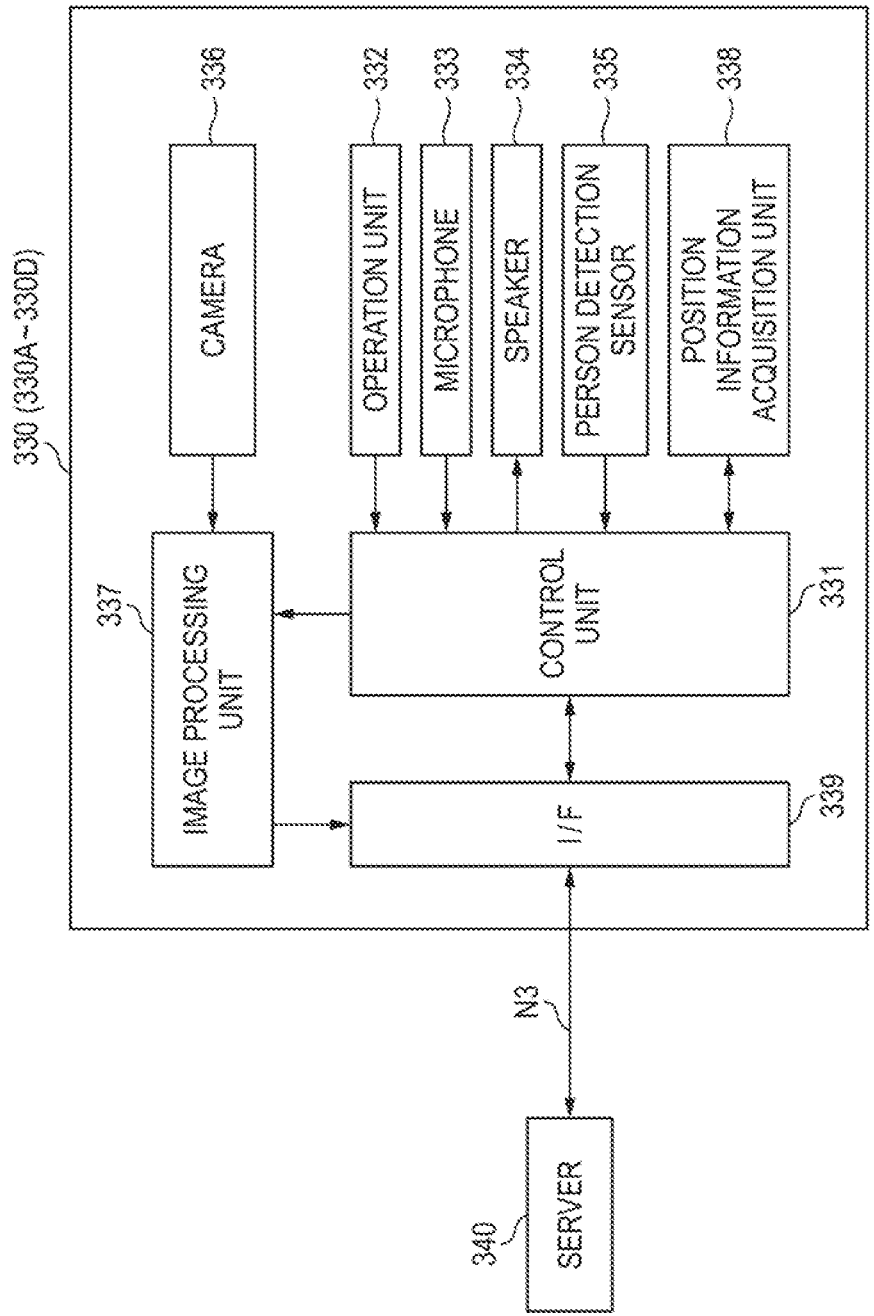
FIG. 32 is a functional block diagram of a doorbell provided in the housing complex communication system in accordance with one embodiment of the present invention.

As shown in FIG. 32, the doorbell 330 (330A to 330D) includes a control unit 331, an operation unit 332, a microphone 333, a speaker 334, a person detection sensor 335, a camera 336, an image processing unit 337, a position information acquisition unit 338, and a communication interface (hereinafter, referred to as a communication IF) 339.

The control unit 331 is configured to control operations of each unit of the doorbell 330. The control unit 331 may include at least one microcontroller including one or more processors and one or more memories, and other electronic circuit including an active element such as a transistor and a passive element. The processor may also be configured to read out a program designated from a control program stored in the memory, and to execute a variety of processing in cooperation with the memory.

The operation unit 332 is configured to receive a variety of input operations of a user (for example, a visitor, a resident, a concierge and the like). The diverse input operations include, for example, an input operation for calling a user (for example, a resident and the like) in the housing facility 3, and an input operation for calling another user in the communal facility 304, and the like. The microphone 333 and the speaker 334 configure a phone call unit configured to transmit voice data of a user on a doorbell-side toward a user at a call destination and to output voice data from the user at the call destination toward the user on the doorbell-side.

The person detection sensor 335 is a sensor for detecting a person (user) in front of the doorbell 330, and is configured by an infrared sensor, for example. The person detection sensor 335 is connected to the camera 336 via the control unit 331. The person detection sensor 335 is configured to output a detection signal, which notifies that a person is detected, to the camera 336. The camera 336 is a capturing device for capturing a user. The camera 336 may be configured by a video camera that is a web camera. The camera 336 is activated, based on a detection signal that is output from the person detection sensor 335. An image captured by the camera 336 is output to the image processing unit 337. The image processing unit 337 is configured to transmit image data acquired from the camera 336 to the server 340 via the communication I/F 339, based on a control signal of the control unit 331.

The position information acquisition unit 338 is configured to acquire the position information of the doorbell so as to specify the predetermined doorbell 330 (330A to 330D). The position information is acquired using a GPS (Global Positioning System), for example. In the meantime, when installing the doorbell 330 (330A to 330D), the position information of the doorbell may be registered in advance in the position information acquisition unit 338. In the meantime, as the information that is used so as to specify the predetermined doorbell 330 (330A to 330D), a doorbell ID capable of identifying each of the doorbells 330A to 330D may be used. The doorbell ID is stored in each of the doorbells 330A to 330D.

The communication I/F 339 is configured to form a signal transmission path between the doorbell 330 and the server 340 via the Internet N3.

Figure 33:
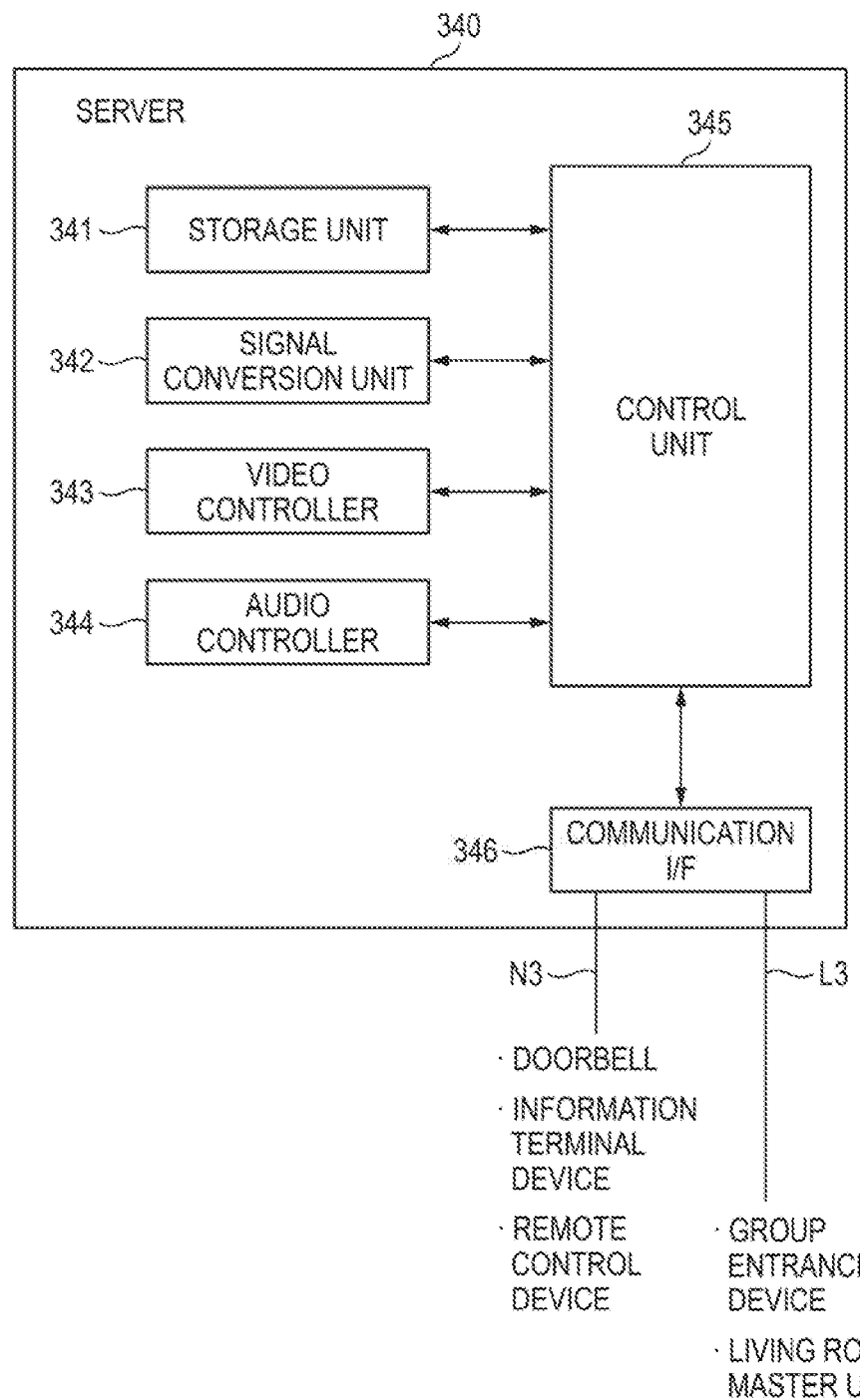
FIG. 33 is a functional block diagram of a server provided in the housing complex communication system in accordance with one embodiment of the present invention.

The server 340 includes a storage unit 341, a signal conversion unit 342, a video controller 343, an audio controller 344, a control unit 345, and a communication interface 346, as shown in FIG. 33. The server 340 is installed in the housing facility 303 of the housing complex, for example.

In the storage unit 341, information about the living room master unit 310, the living room entrance slave unit 315 and the group entrance device 320 of the housing facility 303, the portable information terminal 360 and the like, and information about the doorbells 330A to 330D and the like of the communal facility 304 are stored with being associated in a calling table for calling control, for example. Also, in the storage unit 341, a server ID for identifying the server 340 is stored.

Also, in the storage unit 341, calling signals and data (for example, image data, voice data and the like) transmitted from the living room master unit 310, the living room entrance slave unit 315, the group entrance device 320, the doorbell 330 (330A to 330D) and the portable information terminal 360 are stored in the storage unit 341 and an application capable of transmitting the calling signals and data to a calling target device is installed. This application can also store and transmit calling signals and data between the living room master unit 310, portable information terminal 360 and doorbell 330D and the remote control device 370.

The signal conversion unit 342 includes an analog to digital conversion unit configured to convert an analog signal that can be communicated via the intercom lines L31 to L32 into a digital signal that can be communicated via the network N3, and a digital to analog conversion unit configured to convert a digital signal into an analog signal.

The video controller 343 is configured to signal-process a video signal captured by the group entrance device 320, and to transmit the processed video signal toward the living room master unit 310, the doorbell 330 (330A to 330D) or the portable information terminal 360. Also, the video controller 343 is configured to signal-process a video signal captured by the doorbell 330 (330A to 330D) and to transmit the processed video signal toward the living room master unit 310, the group entrance device 320, the portable information terminal 360, or another doorbell 330 (330A to 330D). The audio controller 344 is configured to signal-process a voice signal transmitted from the living room master unit 310, the group entrance device 320, the doorbell 330 (330A to 330D) or the portable information terminal 360, and to transmit the processed voice signal toward a call target device.

The control unit 345 is configured to control operations of each unit of the server 340. The control unit 245 may include at least one microcontroller including one or more processors and one or more memories, and other electronic circuit including an active element such as a transistor and a passive element. The processor may also be configured to readout a program designated from a control program stored in the memory, and to execute a variety of processing in cooperation with the memory.

The control unit 345 is configured to control, based on a calling table, communication processing and the like between the living room master unit 310 connected via the intercom line L31 and the group entrance device 320 connected via the intercom line L32. Also, the control unit 345 is configured to control, based on the calling table, communication processing and the like between the living room master unit 310 and group entrance device 320 connected via the intercom line L3 and the doorbell 330 (330A to 330D), portable information terminal 360 and remote control device 370 connected via the network N3. Also, the control unit 345 is configured to control, based on the calling table, communication processing and the like among the doorbell 330 (330A to 330D), the portable information terminal 360, and the remote control device 370 connected via the network N3.

When a calling signal for calling a predetermined target device is transmitted from the living room master unit 310, the group entrance device 320, the doorbell 330 (330A to 330D), the portable information terminal 360, and the remote control device 370, for example, the control unit 245 executes the application installed in the storage unit 341, and starts communication processing between the predetermined elements.

The communication I/F 346 is configured to form a signal transmission path between the server 340 and the doorbell 330 (330A to 330D), portable information terminal 360 and remote control device 370 via the Internet N3. Also, the communication I/F 346 is configured to form a signal transmission path between the server 340 and the living room master unit 310 and group entrance device 320 via the intercom line L3 (L31, L32).

Figure 34:
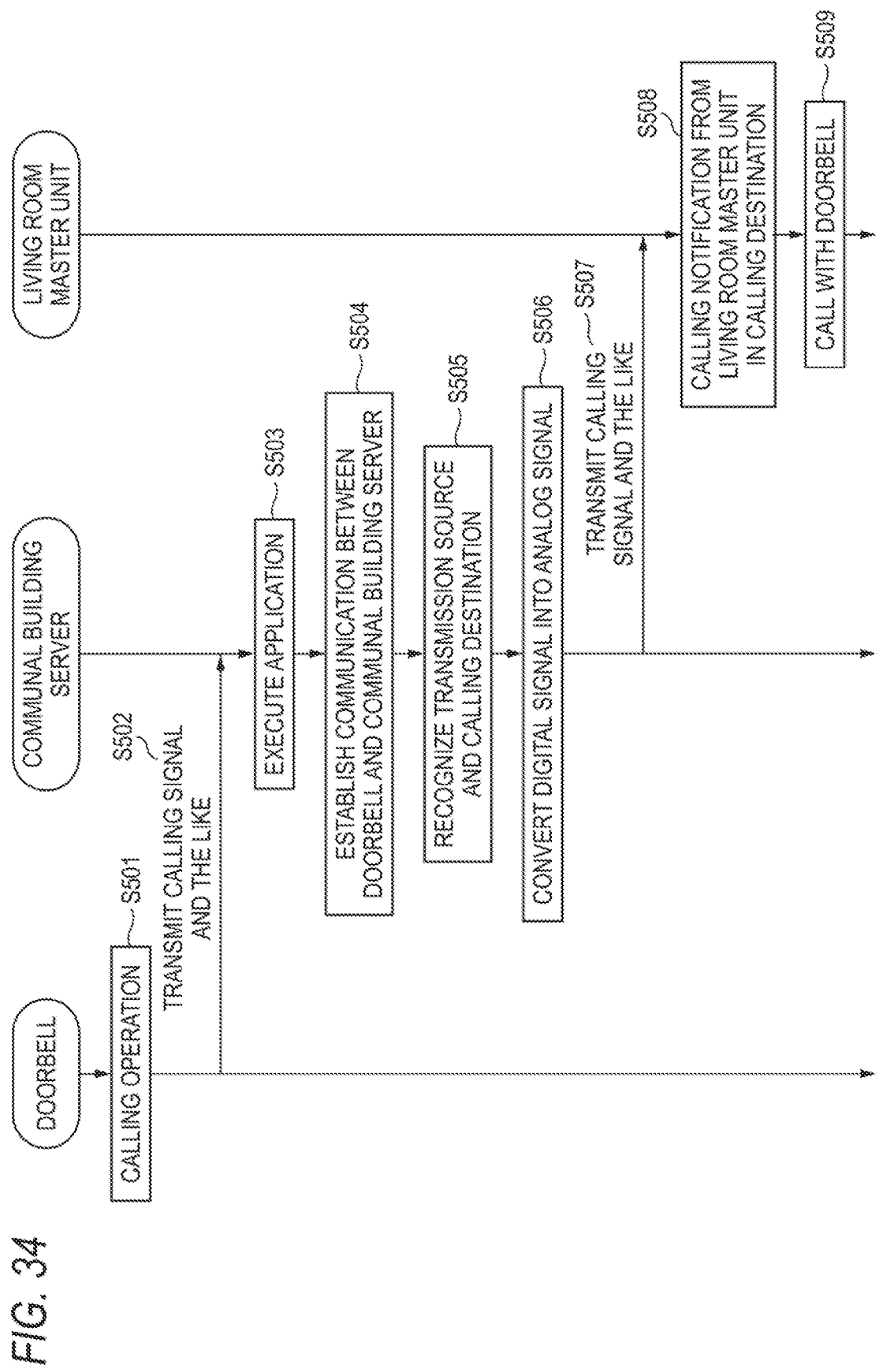
FIG. 34 is a flowchart depicting operations of the housing complex communication system in accordance with one embodiment of the present invention.

Subsequently, operations of the housing complex communication system 301 are described with reference to FIG. 34.

For example, when the living room master unit 310 of the housing facility 303 is called from the doorbell 330 of the communal facility 304, the housing complex communication system 301 operates, as follows.

A visitor inputs a room number "301" that is a visit destination via the operation unit 332 of the doorbell 330B installed in the parking lot 304B, for example, and then presses the calling button (step S501).

The input "301" is transmitted to the server 304 via the network N3, as a calling signal "301" (step S502). In the meantime, the position information or the doorbell ID (in the present example, the doorbell ID is used) for identifying the doorbell 330B that is a transmission source is added to the calling signal "301" that is transmitted. Also, when the calling button is pressed, the image data captured by the camera 336 of the doorbell 330B and the voice data acquired by the microphone 333 are transmitted to the server 340 via the network N3.

The control unit 345 of the server 340 having received the calling signal "301" to which the doorbell ID is added executes the application installed in the storage unit 341 (step S503). The control unit 345 establishes communication between the doorbell 330B and the server 340 via the network N3, in accordance with a command of the application (step S504). The control unit 345 refers to the calling table to recognize that the transmission source is the doorbell 330B of the parking lot 304B and that the calling destination is a room 301 (living room master unit 310) of the housing facility 303 (step S505). Then, the control unit 345 stores the received calling signal "301", doorbell ID, image data, and voice data in the storage unit 341. The control unit 345 converts a digital signal such as the received calling signal "301" into an analog signal, which can be communicated via the intercom line L, by the signal conversion unit 342 (step S506). The control unit 345 transmits the converted calling signal "301" toward all the living room master units 310 via the intercom line L31 (step S507). In the meantime, in this case, the image data ta video of the visitor) is also added to the calling signal "301".

Each of the living room master units 310 having received the calling signal "301" determines whether the calling signal "301" is a calling signal for itself. In this case, the living room master unit 310 in a room 301 determines that the calling signal is a calling signal for itself. Thereby, in the living room master unit 310 of a room 301, a calling sound is output from the speaker of the phone call unit 313 and a predetermined calling lamp is turned on, so that a calling from the doorbell 330B is notified (step S508). Also, a video of the visitor is displayed on the display unit 311. When a resident in a room 301 presses a phone call button of the living room master unit 310, signal communication between the living room master unit 310 and the doorbell 330B is permitted, so that a phone call can be performed, (step S509), for example.

In the meantime, in step S507, the calling signal "301" is transmitted toward all the living room master units 310 via the intercom line L31. However, the control unit 345 may determine the calling destination, based on the calling signal "301", and transmit the calling signal "301" only to the living room master unit 310 in a room 301 associated with the calling signal "301".

For example, also in cases where the portable information terminal 360 of the resident associated with each of the residences is called from the doorbell 330 (330A to 330D) and where the remote control device 370 of the remote control center 305 is called from the doorbell 330 (330A to 330D), each processing that is similar to the above processing is executed. In this case, however, communication between the server 340 and the portable information terminal 360 and between the server 340 and the remote control device 370 is performed via the network N3. Also, in a case of calling the portable information terminal 360, when a calling to the living room master unit 310 is first performed from the doorbell 330 (330A to 330D) and there is no response from the living room master unit 310, the calling may be automatically transferred to the portable information terminal 360 of the resident associated with each of the residences.

Also, for example, the doorbell 330 (330A to 330D) can be called from the living room master unit 310 and the portable information terminal 360. In this case, processing that is similar to the above processing is performed in reverse steps, so that each calling operation is executed.

As described above, according to the housing complex communication system 301 of the present embodiment, it is possible to smoothly perform a calling control between the calling device provided in the housing facility 303 of the housing complex 302 and the doorbell 330 installed in the communal facility 304 via the single application server 340.

For example, the living room master unit 310 and the group entrance device 320 in the housing facility 303 or the portable information terminal 360 associated with the resident in each of the residences can be called from the doorbell 330 (330A to 330D) installed in the communal facility 304. Also, the doorbell 330 (330A to 330D) can be called from the living room master unit 310, the group entrance device 320, and the portable information terminal 360.

Also, for example, the doorbell 330D of the management office 304D can be called from the doorbell 330A of the gym 304A, the doorbell 330B of the parking lot 304B and the doorbell 330C of the security pole 304C.

Also, for example, the calling can be performed among the living room master unit 310, the group entrance device 320, and the portable information terminal 360.

Also, for example, the remote control device 370 of the remote control center 305 (an apartment management company or a security company) can be called from the living room master unit 310, the group entrance device 320, the doorbell 330 (330A to 330D), and the portable information terminal 360. For this reason, it is possible to deal with the calling in the control room of the remote control center 305. Also, the living room master unit 310, the group entrance device 320, the doorbell 330 (330A to 330D), and the portable information terminal 360 can be called from the remote control device 370.

Also, since the doorbell 330 can perform communication by the wireless network communication means, the later installation of the doorbell 330 can be easily performed.

<Meteorological Information Analysis Device>

In the below, an example of the embodiment of the present invention is described with reference to the drawings.

Figure 35:
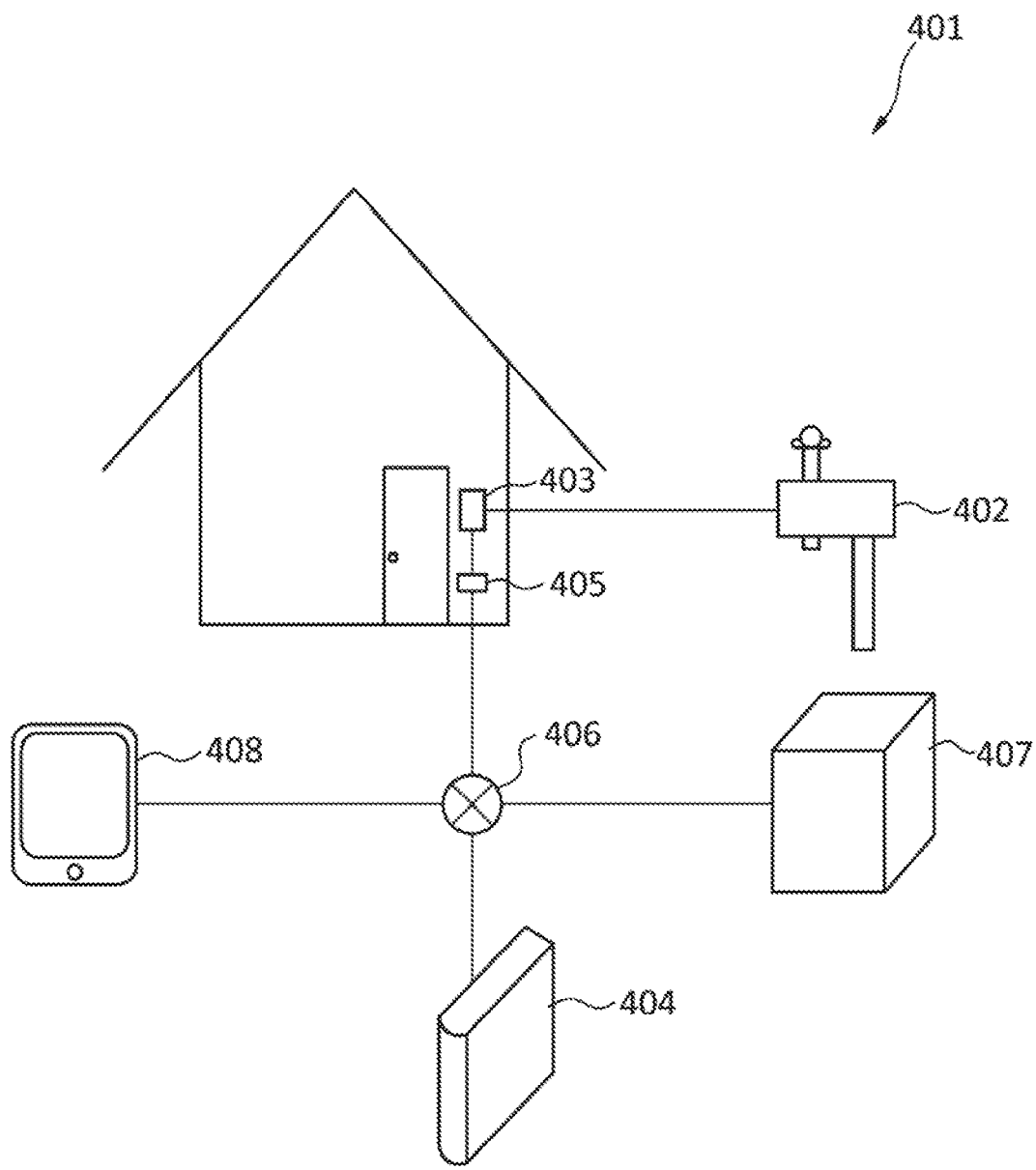
FIG. 35 depicts a meteorological information providing system in accordance with one embodiment of the present invention.

FIG. 35 depicts a meteorological information providing system 401 in accordance with one embodiment of the present invention. As shown in FIG. 35, a meteorological information providing system 401 includes a meteorological information measuring device 402, a doorbell 403, a server 404, a router 405, a meteorological information analysis device 407, and a mobile communication terminal 408.

The meteorological information measuring device 402 and the doorbell 403 each have a near field communication function (not shown) and can perform communication with each other. The meteorological information measuring device 402 and the doorbell 403 can perform near field data communication. As wireless communication technology that is used for near field data communication, for example, communication standards such as Bluetooth (registered trademark) and Wi-Fi can be used. The doorbell 403 can perform communication with the server 404, the meteorological information analysis device 407, the mobile communication terminal 408 via the router 405 and the network 406.

In the meantime, the meteorological information providing system 401 may include a plurality of the meteorological information measuring devices 402 and the doorbell 403. The meteorological information analysis device 407 can acquire meteorological information measured from the plurality of meteorological information measuring devices 402, and analyze the meteorological information.

Figure 36:
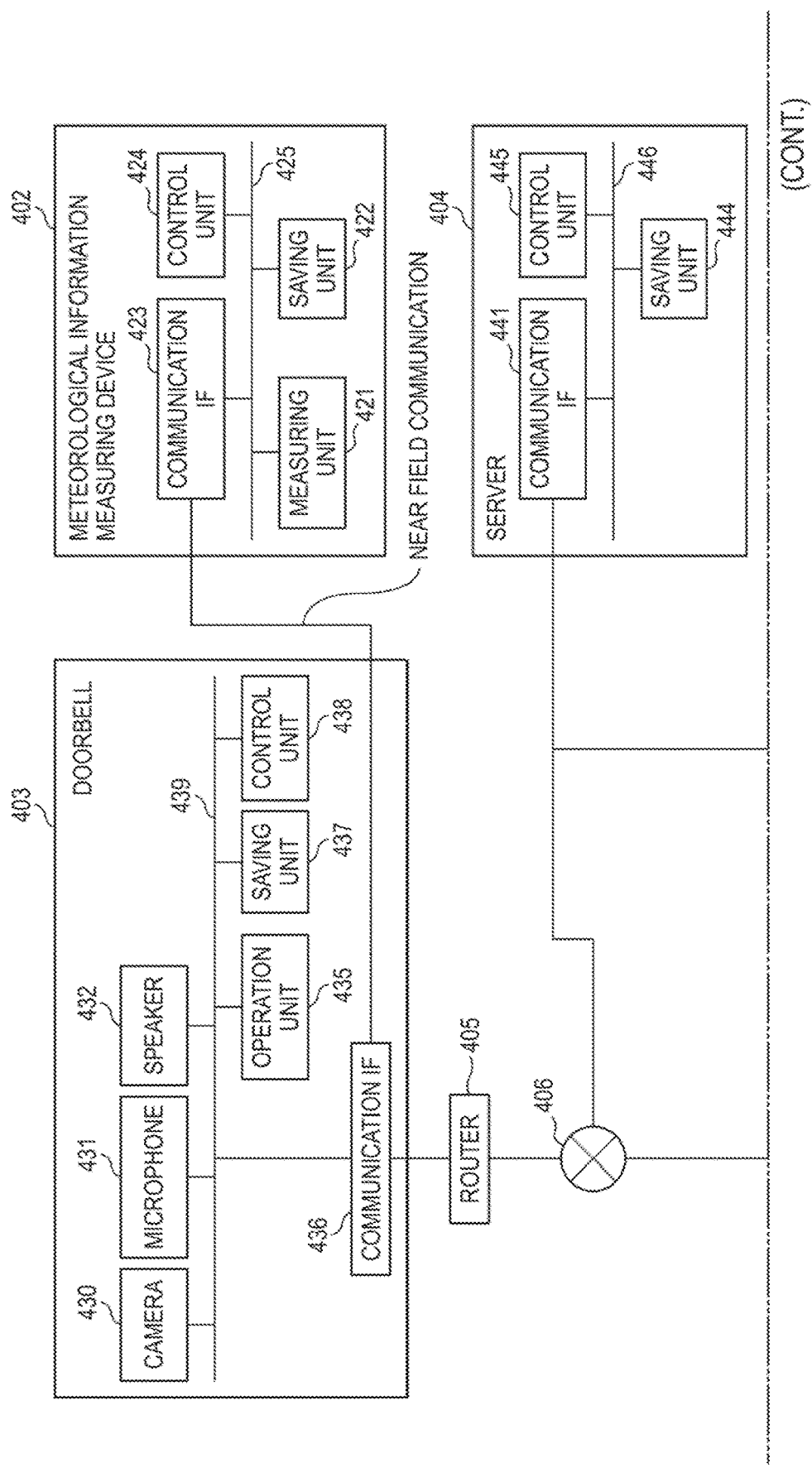
FIG. 36 is a functional block diagram of a doorbell, a meteorological information measuring device, a server, a mobile communication terminal, and a meteorological information analysis device.

FIG. 36 is a functional block diagram of the meteorological information measuring device 402, the doorbell 403, the server 404, the meteorological information analysis device 407, the mobile communication terminal 408. As shown in FIG. 36, the meteorological information measuring device 402 includes a measuring unit 421, a saving unit 422, a communication IF (interface) 423, and a control unit 424, which are communicatively connected to each other via a bus 425.

The measuring unit 421 is configured to measure and collect surrounding meteorological information at regular intervals. The measuring unit 421 is configured by measuring devices such as a thermometer, a hygrometer, an anemometer, a rain gauge, an illuminance meter, a noise meter, a pollen sensor, an ultraviolet intensity meter, a barometer, a cloud meter and the like, for example. The measuring unit 421 is configured to transmit the measured and collected meteorological information to the saving unit 422.

The saving unit 422 has a storage area in which the meteorological information measured and collected by the measuring unit 421 can be saved.

The communication IF 423 is a device or interface enabling communication with the communication IF 436 of the doorbell 403. The meteorological information measuring device 402 can appropriately perform communication with the doorbell 403 by near field communication, via the communication IF 423.

The communication IF 423 has transmission and receiving functions. The communication IF 423 is configured to transmit the meteorological information saved in the saving unit 422 to the doorbell 403 by near field communication, for example.

Also, the communication IF 423 is configured to receive an instruction signal relating to a measuring operation, for example, from the doorbell 403 by near field communication.

The control unit 424 is a control unit for controlling operations of each unit of the meteorological information measuring device 402, and may include at least one microcontroller including one or more processors and one or more memories, and other electronic circuit including an active element such as a transistor and a passive element. For example, the control unit 424 controls operations of each unit of the meteorological information measuring device 402, based on an instruction relating to a measuring operation transmitted from the server 404 and the mobile communication terminal 408 via the doorbell 403.

As shown in FIG. 36, the doorbell 403 includes a camera 430, a microphone 431, a speaker 432, an operation unit 435, a communication IF (interface) 436, a saving unit 437, a control unit 438, and a GPS (Global Positioning System)(not shown), which are communicatively connected to each other via a bus 439.

The camera 430 is configured to capture a surrounding including the front of the doorbell 403. When there is a visitor within a capturing range of the camera 430, the camera 430 can capture the visitor. The camera 430 can also read a two-dimensional code. The microphone 431 is to capture a voice such as a voice of the visitor and the like around the doorbell 403. The speaker 432 is to output a voice such as a voice of the resident and the like captured by the microphone of the mobile communication terminal 408.

The communication IF 436 is a device or interface enabling connection to the router 405. The communication IF 436 is connected to the router 405 by near field communication such as Wi-Fi or wired communication. The doorbell 403 is connected to the network 406 via the router 405. As a result, the doorbell 403 can appropriately perform communication with the server 404, the meteorological information analysis device 407, and the mobile communication terminal 408 connected to the network 406. Also, the communication IF 436 is a device or interface enabling communication with the communication IF 423 of the meteorological information measuring device 402. The doorbell 403 can appropriately perform communication with the meteorological information measuring device 402 by near field communication, via the communication IF 436.

The communication IF 436 has transmission and receiving functions. The communication IF 436 is configured to transmit the meteorological information received from the meteorological information measuring device 402 to the server 404 via the network 406, for example.

Also, the communication IF 436 is configured to receive the meteorological information transmitted from the meteorological information measuring device 402 and an instruction signal relating to a measuring operation transmitted from the server 404 or the mobile communication terminal 408, for example.

The operation unit 435 is configured by a calling button, for example. The operation unit 435 is configured to receive a variety of input operations of a visitor. The diverse input operations include, for example, a calling to a resident.

The saving unit 437 has a storage area in which the meteorological information transmitted from the meteorological information measuring device 402, the position information of the doorbell 403 acquired by the GPS of the doorbell 403, and the like can be saved.

The control unit 438 is a control unit for controlling operations of each unit of the doorbell 403, and may include at least one microcontroller including one or more processors and one or more memories, and other electronic circuit including an active element such as a transistor and a passive element. For example, the control unit 438 is configured to control an operation of transmitting the meteorological information to the server 404 and operations of the microphone 431 and the speaker 432, in response to a calling from a visitor.

As shown in FIG. 36, the server 404 includes a communication IF (interface) 441, a saving unit 444, and a control unit 445, which are communicatively connected to each other via a bus 446.

The communication IF 441 is communicatively connected to the doorbell 403 via the router 405 and the network 406. Also, the communication IF 441 is communicatively connected to the meteorological information analysis device 407 and the mobile communication terminal 408 via the network 406.

The communication IF 441 has transmission and receiving functions. The communication IF 441 is configured to transmit the meteorological information and the like saved in the saving unit 444 to the mobile communication terminal 408 via the network 406, for example.

Also, the communication IF 441 is configured to receive the meteorological information transmitted from the doorbell 403, the analysis data transmitted from the meteorological information analysis device and an instruction signal from the mobile communication terminal 408, for example.

The saving unit 444 has a storage area in which the position information of the doorbell 403, the meteorological information measured and collected by the measuring unit 421, the analysis data analyzed by the meteorological information analysis device 407, and the identification information of the mobile communication terminal 408 can be saved with being associated with each other.

The control unit 445 is a control unit for controlling operations of each unit of the server 404, and may include at least one microcontroller including one or more processors and one or more memories, and other electronic circuit including an active element such as a transistor and a passive element. For example, the control unit 445 is configured to control the saving unit 444 to save therein the meteorological information sent from the doorbell 403 and the analysis data sent from the meteorological information analysis device 407. Also, the control unit 445 is configured to control the saving unit 444 to output the saved analysis data, based on an instruction signal from the mobile communication terminal 408.

As shown in FIG. 36, the meteorological information analysis device 407 includes a communication IF (interface) 471, an analysis unit 473, a saving unit 475, and a control unit 476, which are communicatively connected to each other via a bus 477.

The communication IF 471 is communicatively connected to the doorbell 403 via the router 405 and the network 406. Also, the communication IF 471 is communicatively connected to the server 404 and the mobile communication terminal 408 via the network 406.

The communication IF 471 has transmission and receiving functions. The communication IF 471 is configured to transmit the analysis data saved in the saving unit 475 (which will be described later) to the server 404 via the network 406, for example.

Also, the communication IF 471 is configured to receive the meteorological information transmitted from the server 404, for example.

The analysis unit 473 is configured to perform meteorological analysis, based on the meteorological information acquired from the server 404. As the analysis method, there are a method of combining each of the meteorological information, a method of predicting weather on a certain day from each of the meteorological information, and the like. The analysis data obtained by the analysis is data about a weather forecast, a weather history, a heat stroke alert, a pollen alert, a sunburn alert, hurricane route information, a lightning alert, a hail alert and the like, for example. In the analysis data, not only the data obtained by the analysis but also combined data thereof can also be included. For example, the analysis data may include not only data about a weather forecast, an alert and the like on a certain day but also data about a weather forecast, an alert and the like for next one week.

The analysis unit 473 can also analyze the meteorological information such as the weather forecast, based on the meteorological information acquired from a plurality of meteorological information measuring devices 402. For example, the analysis unit 473 may generate highly accurate analysis data by using big data of the meteorological information acquired from a plurality of meteorological information measuring devices 402 installed in a wide region.

The analysis unit 473 may include at least one microcontroller including one or more processors and one or more memories, and other electronic circuit including an active element such as a transistor and a passive element. The processor is, for example, a CPI (Central Processing Unit), an MPU (Micro Processing Unit), a GPU (Graphics Processing Unit) and/or a TPU (Tensor Processing Unit). The CPU may include a plurality of CPU cores. The GPU may include a plurality of GPU cores. The memory includes a ROM (Read Only Memory) and a RAM (Random Access Memory). In the ROM, a program for meteorological information analysis may be stored. In the RAM, the program for meteorological information analysis may be temporarily stored. The processor may be configured to develop a program designated from the program for meteorological information analysis stored in a storage device or the ROM onto the RAM, and to execute a variety of processing in cooperation with the RAM.

Also, the analysis unit 473 may be configured by an integrated circuit (hardware resource) such as an ASIC (Application Specific Integrated Circuit), FPGA (Field-Programmable Gate Array) and the like. Also, the analysis unit 473 may be configured by a combination of at least one microcontroller and an integrated circuit.

The control unit 476 is a control unit for controlling operations of each unit of the meteorological information analysis device 407, and may include at least one microcontroller including one or more processors and one or more memories, and other electronic circuit including an active element such as a transistor and a passive element. For example, the control unit 476 is configured to control the analysis unit 473 to analyze the meteorological information, based on the meteorological information received from the server 404, and to generate the analysis data.

The saving unit 475 has a storage area in which the meteorological information transmitted from the server 404 and the analysis data generated by the analysis unit 473 can be saved.

As shown in FIG. 36, the mobile communication terminal 408 includes a communication IF (interface) 481, a display unit 482, an input unit 483, and a control unit 485, which are communicatively connected to each other via a bus 486. As the mobile communication terminal 408, for example, an electronic device such as a laptop computer, a tablet terminal, a smartphone and the like can be used.

The communication IF 481 is communicatively connected to the doorbell 403 via the router 405 and the network 406. Also, the communication IF 481 is communicatively connected to the server 404 and the meteorological information analysis device 407.

The display unit 482 is a display such as a liquid crystal monitor, an organic EL display or the like, and is configured to display an image (an operation image, diverse application images and the like).

The input unit 483 is configured to receive an input operation of the user who operates the mobile communication terminal 408, and is a touch display disposed with being superimposed on the display unit 482, an operation button provided separately from the display unit 482, and the like, for example.

The control unit 485 is a control unit for controlling operations of each unit of the mobile communication terminal 408, and may include at least one microcontroller including one or more processors and one or more memories, and other electronic circuit including an active element such as a transistor and a passive element. For example, the control unit 485 is configured to control processing of displaying desired analysis data on the display unit 482, based on an instruction signal relating to an instruction input via the input unit 483 by the user.

Figure 37:
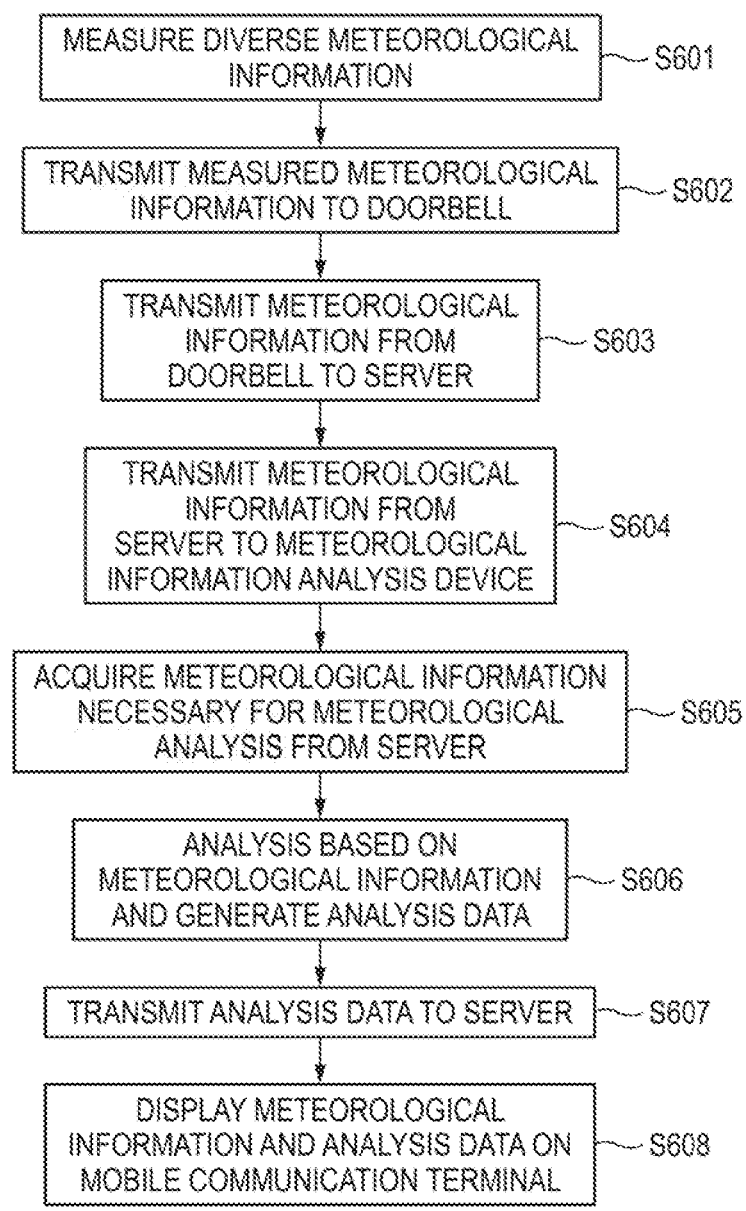
FIG. 37 is a flowchart depicting a flow after meteorological information is measured by the meteorological information measuring device until a user browses the meteorological information and analysis data.
Figure 38:
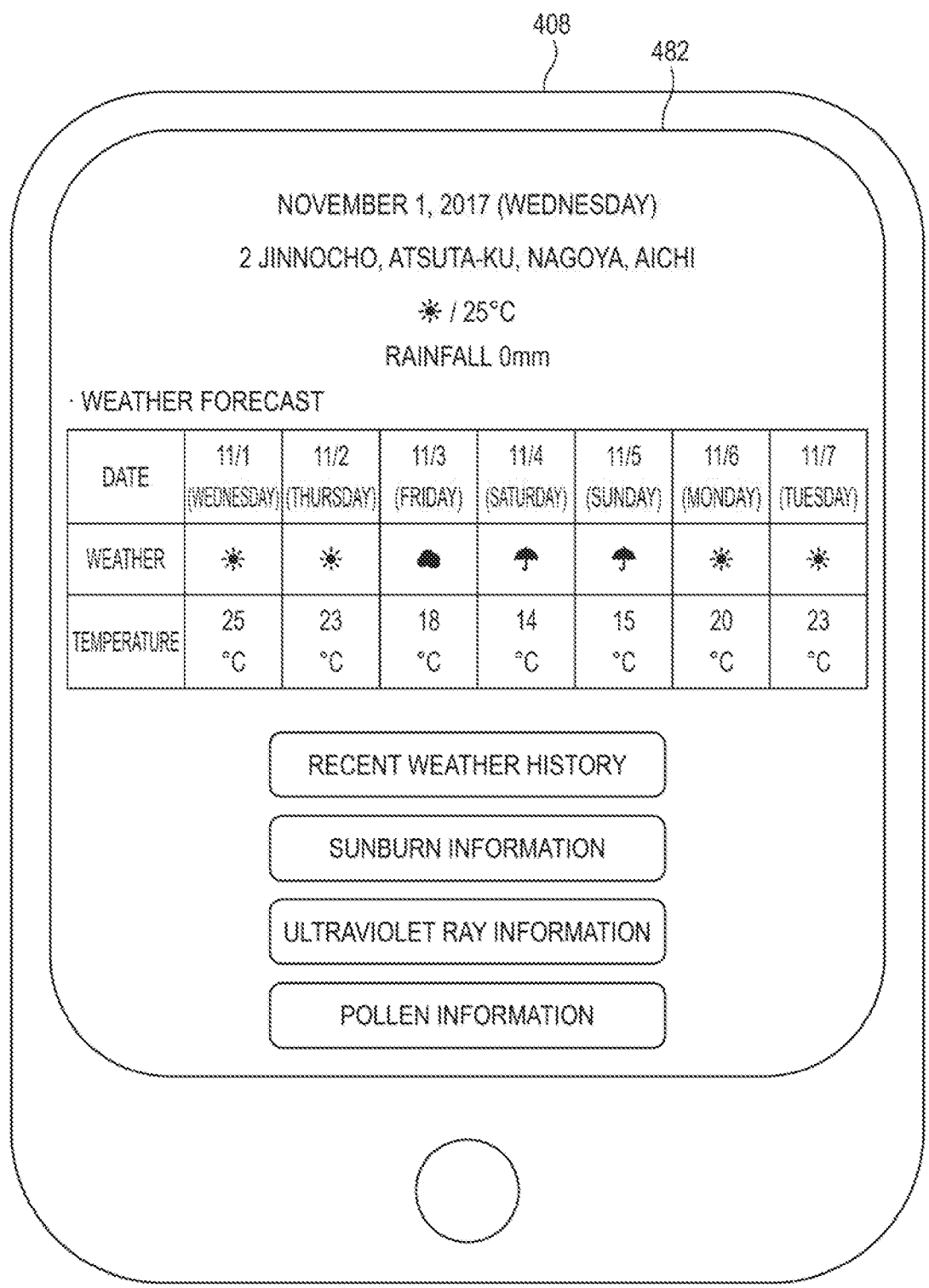
FIG. 38 depicts a state where the meteorological information and the analysis data (weather forecast) are displayed on a display unit of a mobile communication terminal.
Figure 39:
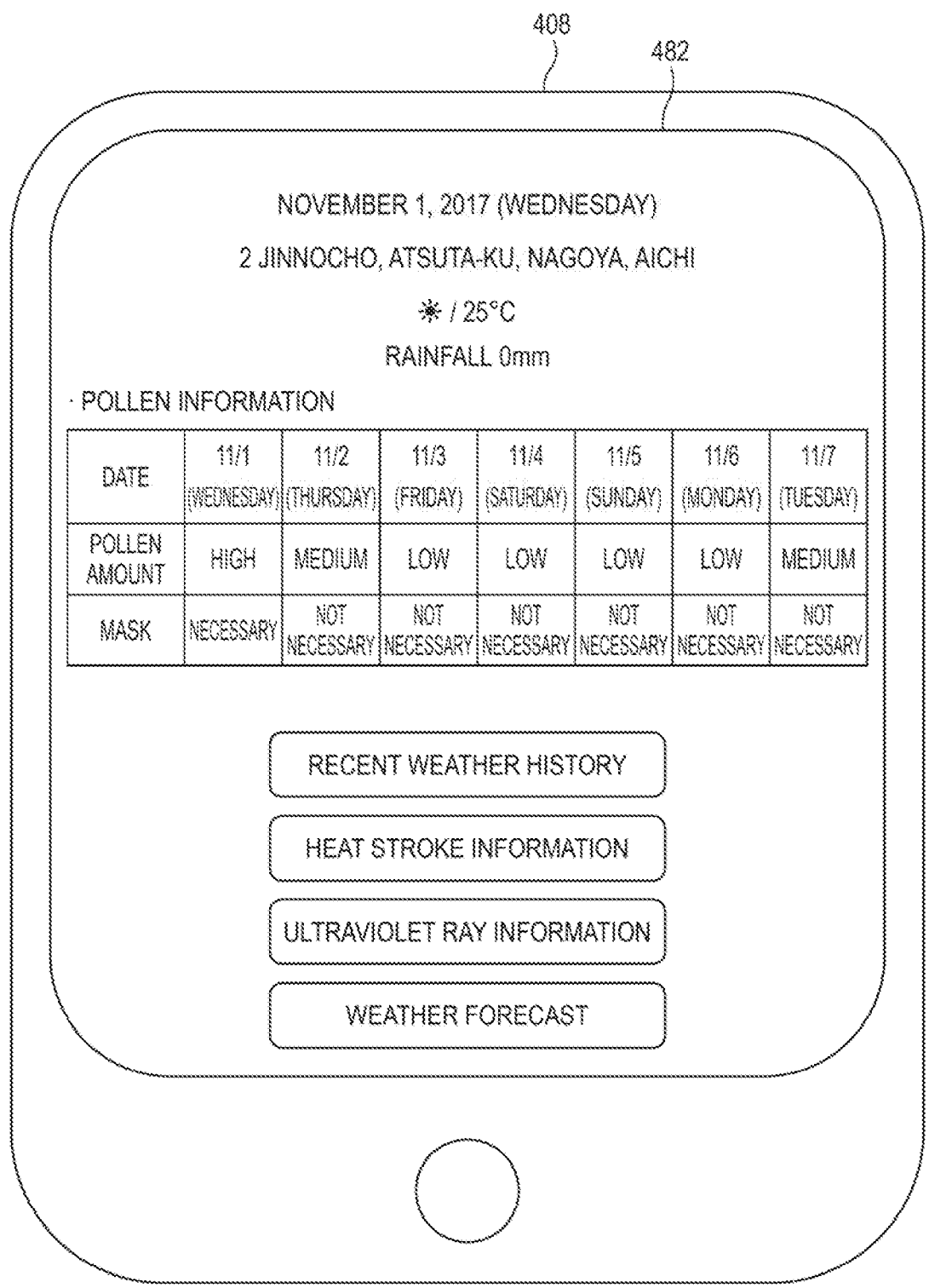
FIG. 39 depicts a state where the meteorological information and the analysis data (pollen information) are displayed on the display unit of the mobile communication terminal.

Subsequently, a flow after meteorological information is measured by the meteorological information measuring device 402 until the user browses the meteorological information and the analysis data is described with reference to FIGS. 37 to 39. FIG. 37 is a flowchart depicting a flow after meteorological information is measured by the meteorological information measuring device 402 until the user browses the meteorological information and analysis data. FIG. 38 depicts a state where the meteorological information and the analysis data (weather forecast) are displayed on the display unit 482 of the mobile communication terminal 408. FIG. 39 depicts a state where the meteorological information and the analysis data (pollen information) are displayed on the display unit 482 of the mobile communication terminal 408.

The meteorological information measuring device 402 measures a variety of meteorological information. As used herein, the diverse meteorological information includes, for example, a temperature, a humidity, a rainfall, an atmospheric pressure, a wind speed, a wind direction, an illuminance, a noise, an ultraviolet ray amount, a carbon dioxide concentration, a pollen amount and the like. The measured meteorological information is saved in the saving unit 422 (step S601).

The diverse meteorological information saved in the saving unit 422 is transmitted to the doorbell 403 by near field communication, via the communication IF 423 and the communication IF 436 (step S602). The doorbell 403 saves the variety of meteorological information in the saving unit 437.

The doorbell 403 transmits the variety of meteorological information saved in the saving unit 437 to the server 404 via the router 405 and the network 406. The server 404 saves the variety of meteorological information received from the doorbell 403 in the saving unit 444 (step S603).

The server 404 transmits the meteorological information saved in the saving unit 444 to the meteorological information analysis device 407 via the network 406 (step S604). The meteorological information analysis device 407 acquires from the server 404 the meteorological information necessary for the analysis unit 473 to perform the meteorological analysis (step S605).

The analysis unit 473 performs a variety of meteorological analyses, based on the meteorological information received from the server 404, and generates analysis data (step S606). The generated analysis data is saved in the saving unit 475.

The meteorological information analysis device 407 transmits the analysis data saved in the saving unit 475 to the server 404 via the network 406 (step S607). The server 404 saves the analysis data sent from the meteorological information analysis device 407 in the saving unit 444.

The user browses the meteorological information and analysis data saved in the server 404 by using the mobile communication terminal 408. For example, when the user wants to browse the information about the weather forecast, the user inputs an instruction to browse the information about the weather forecast to the input unit 483 of the mobile communication terminal 408. The control unit 485 generates an instruction signal, based on the instruction, and transmits the same to the server 404. At this time, the identification information of the mobile communication terminal 408 may also be transmitted to the server 404. The server 404 transmits the meteorological information and the analysis data to the control unit 485, based on the instruction signal. When the identification information of the mobile communication terminal 408 is transmitted to the server 404, the server 404 transmits the meteorological information of a location of the doorbell 403 and the analysis data to the control unit 485, based on the position information of the doorbell 403 associated with the identification information. The control unit 485 generates image data for displaying the meteorological information and the analysis data on the display unit 482. The control unit 485 transmits the image data to the display unit 482, and the display unit 482 displays an image based on the image data. Thereby, the user can browse the information about the weather forecast on the mobile communication terminal 408 (step S608).

For example, as shown in FIG. 38, a date of the day of browsing, a place where the doorbell 403 is located, and weather/temperature/rainfall at a place (place of residence) where the doorbell 403 is located may be displayed at an upper part of the display unit 482. In the example of FIG. 38, the weather forecast for one week including the day of browsing is displayed at a central part of the display unit 482. In the example of FIG. 38, a weather and a temperature of the day are displayed at an upper part of the display unit 482. However, the present invention is not limited. For example, a humidity, a rainfall, an atmospheric pressure, a wind speed, a wind direction, an illuminance, a noise, an ultraviolet ray amount, a carbon dioxide concentration, a pollen amount and the like may also be displayed at an upper part of the display unit 482. A touch tap (an example of the input unit 483) for switching to a display screen of other analysis data is disposed at a lower part of the display unit 482.

For example, when the user touches a tap of pollen information, the mobile communication terminal 408 acquires the meteorological information and analysis data about the pollen information from the server 404. In this case, a screen of the display unit 482 is switched to a screen shown in FIG. 39. The display screen shown in FIG. 39 is different from the display screen shown in FIG. 38, in that the information about pollen is displayed at a central part of the display unit 482. In the display screen shown in FIG. 39, as a content of the pollen information, information about a pollen amount and as to whether it is necessary to wear a mask is displayed. However, the present invention is not limited thereto.

According to the above configuration, after the meteorological information acquired by the meteorological information measuring device 402 is sent to the doorbell 403 the doorbell 403 transmits the received meteorological information to the server 404. The meteorological information analysis device 407 analyzes the local meteorological information, based on the meteorological information transmitted to the server 404, and transmits the analysis data to the server 404. For this reason, the user of the doorbell 403 can receive a meteorological information service without installing devices such as an antenna, a satellite tuner and the like.

Like this, according to the above configuration, the doorbell 403 in which the position information of the residence is saved and to which power is stably supplied is used instead of devices such as an antenna, a satellite tuner and the like, so that it is possible to provide the meteorological information providing system 401 capable of providing the user (resident) with the meteorological information service.

Also, according to the above configuration, since the server 404 can perform communication with the mobile communication terminal 408 via the network 406, the acquired meteorological information and analysis data can be browsed on the mobile communication terminal 408. For this reason, the user can conveniently browse the meteorological information of a place of residence and the analysis data on the mobile communication terminal 408 even when the user is in a remote place, for example.

Like this, according to the above configuration, it is possible to provide the meteorological information providing system 401 by which the meteorological information and the analysis data can be browsed on the mobile communication terminal 408.

In the above embodiment, the analysis unit 473 generates the analysis data, based on the meteorological information measured by the meteorological information measuring device 402. However, the present invention is not limited thereto. For example, data about the meteorological information outside the meteorological information providing system 401 may be saved in the server 404, and the analysis unit 473 may generate the analysis data, based on the data and the meteorological information data measured by the meteorological information measuring device 402.

In the meantime, the meteorological information measured by the meteorological information measuring device 402 and the data generated by the analysis unit 47 may also be provided to an outside of the meteorological information providing system 401.

The doorbell 403, the server 404, the meteorological information analysis device 407 and the mobile communication terminal 408 may be connected to each other in a wired or wireless manner.

In the meantime, the present invention is not limited to the above embodiments, and can be appropriately changed and modified. In addition, the materials, shapes, sizes, values, forms, numbers, arrangement places and the like of the constitutional elements in the above embodiments are arbitrary and are not particularly limited inasmuch as the present invention can be achieved.

The subject application is based on Japanese Patent Application Nos. 2018-025234, 2018-025235, 2018-025236, 2018-025237, and 20184125238 filed on Feb. 15, 2018, and Japanese Patent Application Nos. 2018-028717, 2018-028718 and 2018-028719 filed on Feb. 21, 2018, the contents of which are incorporated as appropriate.

The invention claimed is:

1. A setting method of a Wi-Fi doorbell, in which a Wi-Fi doorbell comprising a camera capable of reading a two-dimensional code and a mobile communication terminal comprising a display unit capable of displaying the two-dimensional code are used, the setting method comprising:
generating password information, for enabling the Wi-Fi doorbell to connect to a network via a Wi-Fi router, by inputting to the mobile communication terminal position information of the doorbell upon an initial installation of the Wi-Fi doorbell;
causing the display unit to display a two-dimensional code in which the password information for enabling the Wi-Fi doorbell to connect to the network via the Wi-Fi router is embedded;
reading the two-dimensional code by the camera of the Wi-Fi doorbell; and
setting the Wi-Fi doorbell to a state where the Wi-Fi doorbell can perform communication with a remotely disposed server via the Wi-Fi router, based on the read two-dimensional code.

2. The method according to claim 1, wherein the position information upon the initial installation of the Wi-Fi doorbell is embedded in the two-dimensional code.

3. The method according to claim 1, wherein the Wi-Fi doorbell is configured to store a specific person in the server by reading a person image by the camera of the Wi-Fi doorbell upon initial setting, and
wherein the Wi-Fi doorbell is configured to determine whether or not to call, based on the person image stored in the server.

* * * * *